United States Patent
Ding et al.

(10) Patent No.: US 12,460,133 B2
(45) Date of Patent: Nov. 4, 2025

(54) LIQUID CRYSTAL COMPOUND, LIQUID CRYSTAL COMPOSITION THEREOF, AND LIQUID CRYSTAL DISPLAY DEVICE

(71) Applicant: Jiangsu Hecheng Display Technology Co., Ltd., Nanjing (CN)

(72) Inventors: Wenquan Ding, Nanjing (CN); Panpan Wang, Nanjing (CN); Yafei Yang, Nanjing (CN); Di He, Nanjing (CN); Shuang Xu, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 0 days.

(21) Appl. No.: 18/706,104

(22) PCT Filed: Sep. 26, 2022

(86) PCT No.: PCT/CN2022/121288
§ 371 (c)(1),
(2) Date: Apr. 30, 2024

(87) PCT Pub. No.: WO2023/071657
PCT Pub. Date: May 4, 2023

(65) Prior Publication Data
US 2025/0171690 A1  May 29, 2025

(30) Foreign Application Priority Data
Nov. 1, 2021 (CN) .......................... 202111283471.4

(51) Int. Cl.
G02F 1/1333 (2006.01)
C09K 19/12 (2006.01)
C09K 19/18 (2006.01)
C09K 19/20 (2006.01)
C09K 19/30 (2006.01)
C09K 19/32 (2006.01)
C09K 19/34 (2006.01)

(52) U.S. Cl.
CPC .......... *C09K 19/3405* (2013.01); *C09K 19/12* (2013.01); *C09K 19/18* (2013.01); *C09K 19/2007* (2013.01); *C09K 19/3003* (2013.01); *C09K 19/3028* (2013.01); *C09K 19/3048* (2013.01); *C09K 19/3059* (2013.01); *C09K 19/3068* (2013.01); *C09K 19/322* (2013.01); *C09K 19/3402* (2013.01); *C09K 19/3491* (2013.01); *C09K 2019/122* (2013.01); *C09K 2019/123* (2013.01); *C09K 2019/181* (2013.01); *C09K 2019/2035* (2013.01); *C09K 2019/3004* (2013.01); *C09K 2019/3009* (2013.01); *C09K 2019/301* (2013.01); *C09K 2019/3013* (2013.01); *C09K 2019/3016* (2013.01); *C09K 2019/3019* (2013.01); *C09K 2019/3021* (2013.01); *C09K 2019/3025* (2013.01); *C09K 2019/3036* (2013.01); *C09K 2019/305* (2013.01); *C09K 2019/3051* (2013.01); *C09K 2019/3056* (2013.01); *C09K 2019/3063* (2013.01); *C09K 2019/3074* (2013.01); *C09K 2019/3075* (2013.01); *C09K 2019/3078* (2013.01); *C09K 2019/3408* (2013.01); *C09K 2019/3422* (2013.01)

(58) Field of Classification Search
CPC ........ C09K 19/12; C09K 19/18; C09K 19/34; C09K 2019/181; C09K 2019/122; C09K 2019/123; C09K 2019/301; G02F 1/1333
See application file for complete search history.

(56) References Cited

U.S. PATENT DOCUMENTS

| | | | |
|---|---|---|---|
| 7,514,127 B2 | 4/2009 | Lietzau et al. | |
| 9,512,102 B2 | 12/2016 | Reiffenrath et al. | |
| 10,351,773 B2 | 7/2019 | Li et al. | |
| 10,662,378 B2 | 5/2020 | Mori et al. | |

(Continued)

FOREIGN PATENT DOCUMENTS

| | | | |
|---|---|---|---|
| CN | 1942461 A | 4/2007 | |
| CN | 104926765 A | 9/2015 | |

(Continued)

*Primary Examiner* — Geraldina Visconti

(74) *Attorney, Agent, or Firm* — Hoffmann & Baron, LLP

(57) ABSTRACT

A liquid crystal compound represented by general formula F is useful as a liquid crystal composition and as a liquid crystal display device that contains the liquid crystal composition. The liquid crystal compound has a large clearing point, large optical anisotropy and sizable or large dielectric anisotropy absolute value under the condition of maintaining a suitable rotary viscosity, enabling the liquid crystal composition that contains the compound represented by general formula F has a large optical anisotropy, small rotational viscosity, high VHR (UV) and long low-temperature storage duration under the condition of maintaining proper clearing point, proper dielectric anisotropy absolute value and proper VHR (initial), and the liquid crystal display device that contains the liquid crystal composition of the present invention has good contrast, high response speed, high reliability and good low-temperature storage stability.

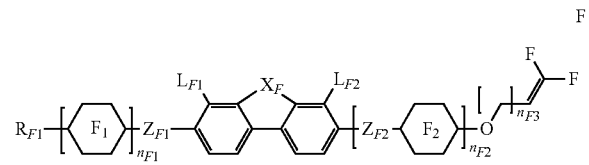

14 Claims, 6 Drawing Sheets

(56) References Cited

U.S. PATENT DOCUMENTS

Figure 1:
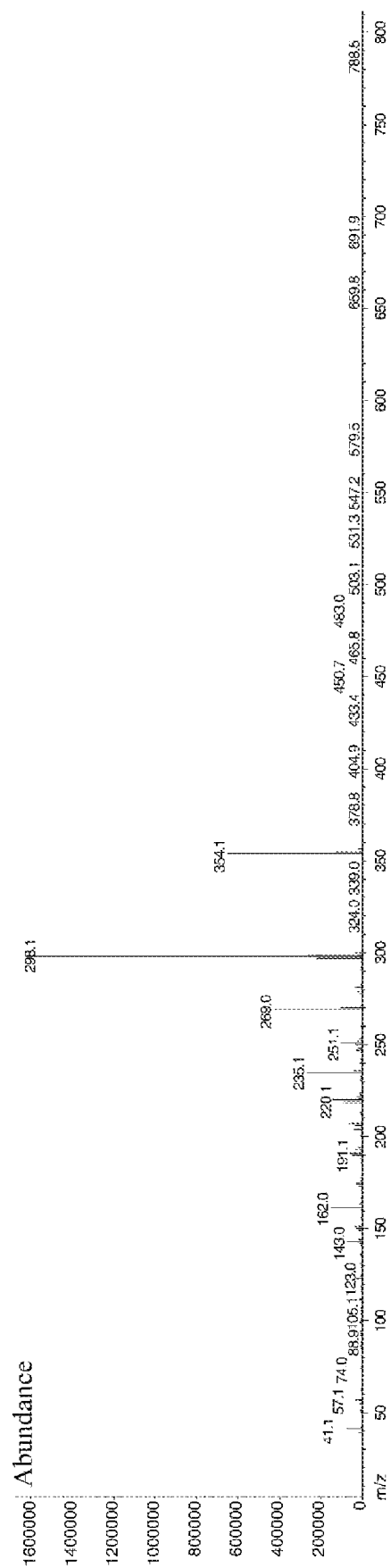

| | | | |
|---|---|---|---|
| 11,060,029 B2 | 7/2021 | Manabe et al. | |
| 2004/0124399 A1 | 7/2004 | Schmidt et al. | |
| 2008/0199635 A1 | 8/2008 | Hirschmann et al. | |
| 2015/0259602 A1 | 9/2015 | Reiffenrath et al. | |
| 2020/0032143 A1 | 1/2020 | Takata | |
| 2021/0222067 A1 | 7/2021 | Hirschmann et al. | |

FOREIGN PATENT DOCUMENTS

| | | | | |
|---|---|---|---|---|
| CN | 105153112 A | | 12/2015 | |
| CN | 107434973 A | | 12/2017 | |
| CN | 107973766 A | | 5/2018 | |
| CN | 110023457 A | | 7/2019 | |
| CN | 110396411 A | | 11/2019 | |
| CN | 112779025 A | | 5/2021 | |
| CN | 116064050 A | * | 5/2023 | ............. C09K 19/44 |
| DE | 101 01 022 A1 | | 7/2002 | |
| JP | 2008-189927 A | | 8/2008 | |
| JP | 2013-112682 A | | 6/2013 | |
| JP | 2018-150294 A | | 9/2018 | |
| WO | 2018/155340 A1 | | 8/2018 | |
| WO | WO-2024120149 A1 | * | 6/2024 | ............. C09K 19/34 |

\* cited by examiner

LIQUID CRYSTAL COMPOUND, LIQUID CRYSTAL COMPOSITION THEREOF, AND LIQUID CRYSTAL DISPLAY DEVICE

CROSS-REFERENCE TO RELATED APPLICATIONS

This application is the National Stage of International Application No. PCT/CN2022/121288, filed Sep. 26, 2022, which claims the benefit of Chinese Application No. 202111283471.4, filed Nov. 1, 2021, the contents of which is incorporated by reference herein.

TECHNICAL FIELD

The present invention relates to the field of liquid crystal, specifically to a liquid crystal compound, a liquid crystal composition comprising said liquid crystal compound and a liquid crystal display device comprising said liquid crystal composition.

BACKGROUND ARTS

Liquid crystal display elements can be used in all kinds of domestic electrical apparatuses, measuring apparatuses, automotive panels, word processors, computers, printers, televisions and so forth, such as clocks and calculators. According to the types of display mode, liquid crystal display elements can be classified into PC (phase change), TN (twisted nematic), STN (super twisted nematic), ECB (electrically controlled birefringence), OCB (optically compensated bend), IPS (in-plane switching), VA (vertical alignment) and so forth. According to the driving ways of elements, liquid crystal display elements can be classified into PM (passive matrix) type and AM (active matrix) type. PM is classified into the static type, multiplex type and so forth. AM is classified into TFT (thin film transistor) type, MIM (metal insulator metal) type and so forth. The types of TFT comprise amorphous silicon and polycrystal silicon. The latter is classified into a high-temperature type and a low-temperature type according to the manufacturing process. According to the types of light source, liquid crystal display elements can be classified into a reflection type utilizing a natural light, a transmission type utilizing a backlight, and a semi-transmission type utilizing both the natural light and the backlight.

A liquid crystal display device includes a liquid crystal composition having a nematic phase. The liquid crystal composition has appropriate characteristics. An AM device having good characteristics can be obtained via improving the characteristics of the liquid crystal composition. The correlation between the characteristics of liquid crystal composition and characteristics of AM device is summarized in Table 1 below.

TABLE 1

Characteristics of liquid crystal composition and AM device of

| No. | Characteristics of liquid crystal composition | Characteristics of AM device |
|---|---|---|
| 1 | Wide temperature range of a nematic phase | Wide workable temperature range |
| 2 | Small viscosity | Short response time |
| 3 | Appropriate optical anisotropy | Large contrast |

TABLE 1-continued

Characteristics of liquid crystal composition and AM device of

| No. | Characteristics of liquid crystal composition | Characteristics of AM device |
|---|---|---|
| 4 | Large absolute value of positive or negative dielectric anisotropy | Low threshold voltage, small electric power consumption, large contrast |
| 5 | Large specific resistance | Large voltage holding ratio, large contrast |
| 6 | Ultraviolet ray and heat stabilities | Long service life |
| 7 | Large elastic constant | Large contrast, short response time |

In the application of liquid crystal display devices, the impact of contrast on the visual effect is very critical. Generally speaking, the larger the contrast, the clearer and more eye-catching the image, and the more vibrant and gorgeous the colors. And if the contrast is small, the whole picture becomes gray and dull. High contrast is of great help for image clarity, detail performance, gray level performance. High contrast products have advantages in black and white contrast, clarity, integrity and so forth. Contrast also has a great impact on the display effect of dynamic video. The light-dark conversion in the dynamic image is fast, therefore, the higher the contrast, the easier it is for the human eyes to distinguish such a conversion process.

With the improvement of the resolution of the liquid crystal display, liquid crystal displays with 4K and 8K type resolution are gradually emerging, which then require liquid crystal display panel to have smaller opening rate and higher transmittance. Negative liquid crystal compositions have higher transmittance and the advantage of high transmittance is more remarkable, especially in PSA mode and NFFS mode. However, the structure of negative liquid crystal determines that it has larger rotational viscosity and lower voltage hold rate. Thus, there is an urgent need to develop a negative liquid crystal compound with smaller rotational viscosity and higher voltage hold rate to overcome the deficiencies of existing negative liquid crystals and to provide liquid crystal compositions that meet the market requirements.

Chinese patent application CN1942461A and German patent application DE10101022A1 disclose a liquid crystal compound that can solve the above problems to a certain extent. On the basis of the prior art, Chinese patent application CN107973766A conducts ring substitution on the end group structure of such compounds. However, the currently disclosed compounds of this type have problems of small absolute value of dielectric anisotropy, large rotational viscosity, and poor solubility at low temperature. More seriously, benzofuran and benzothiophene type compounds have lower stability under UV. However, it is well known that the liquid crystal display panel needs to be exposed to a certain degree of UV light irradiation during manufacturing process, and the photometry of UV light with a wavelength of 365 nm is generally about 6000~1000 MJ. The conventional benzofuran and benzothiophene compounds have a lower VHR (UV) after UV light irradiation, which makes the reliability of the display reduced and produces residual image.

Therefore, how to obtain a liquid crystal compound and a liquid crystal composition comprising the same so that the above problem can be solved or partially solved remains an urgent problem to be solved in this field.

SUMMARY OF THE INVENTION

Objects: In view of the deficiencies in the prior art, it is an object of the present invention to provide a liquid crystal compound which has a larger clearing point, a larger optical anisotropy, and a comparable or larger absolute value of dielectric anisotropy while maintaining an appropriate rotational viscosity.

It is a further object of the present invention to provide a liquid crystal composition comprising the above liquid crystal compound, the liquid crystal composition has a larger optical anisotropy, a smaller rotational viscosity, a higher VHR(UV), and a longer low temperature storage time while maintaining an appropriate clearing point, an appropriate absolute value of dielectric anisotropy, and an appropriate VHR(initial).

It is a further object of the present invention to provide a liquid crystal display device comprising the above liquid crystal composition.

Technical solutions: To realize the above invention objects, the present invention provides a liquid crystal compound of general formula F

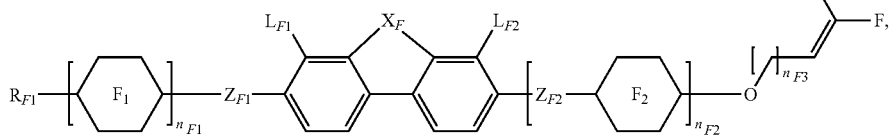

wherein, $R_{F1}$ represents —H, halogen, $C_{1-12}$ (for example, $C_1$, $C_2$, $C_3$, $C_4$, $C_5$, $C_6$, $C_7$, $C_8$, $C_9$, $C_{10}$, $C_{11}$, or $C_{12}$) linear or branched alkyl,

wherein one or more nonadjacent —$CH_2$— in the $C_{1-12}$ linear or branched alkyl can each be independently replaced by —C≡C—, —O—, —CO—, —CO—O— or —O—CO—, and one or more —H in the $C_{1-12}$ linear or branched alkyl can each be independently substituted by —F or —Cl;

ring

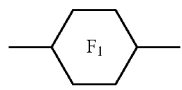

and ring

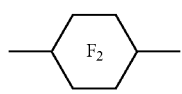

each independently represents

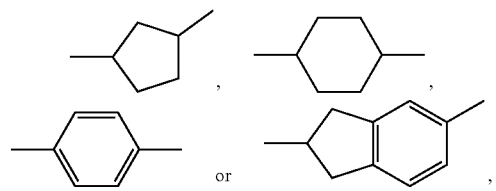

wherein one or more —$CH_2$— in

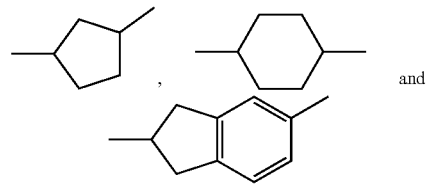

can be replaced by —O—, one or more single bond in the rings can be replaced by double bond, wherein one or more —H on

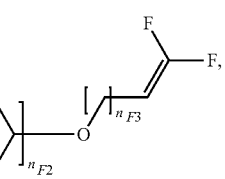

can each be independently substituted by —CN, —F or —Cl, and one or more —CH= in the rings can be replaced by —N=;

$X_F$ represents —O—, —S— or —CO—;

$L_{F1}$ and $L_{F2}$ each independently represents —H, —F, —Cl, —$CF_3$ or —$OCF_3$;

$Z_{F1}$ and $Z_{F2}$ each independently represents single bond, —O—, —CO—O—, —O—CO—, —$CH_2O$—, —$OCH_2$—, —CH=CH—, —C≡C—, —$CH_2CH_2$—, —$CF_2CF_2$—, —$(CH_2)_4$—, —$CF_2O$— or —$OCF_2$—;

$n_{F1}$ and $n_{F2}$ each independently represents 0, 1 or 2, wherein, when $n_{F1}$ represents 2, ring

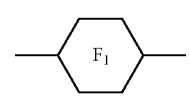

can be the same or different, wherein, when $n_{F2}$ represents 2, ring

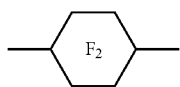
can be the same or different, and $Z_{F2}$ can be the same or different; and
$n_{F3}$ represents an integer of 0-4.
In some embodiments of the present invention, preferably, $L_{F1}$ and $L_{F2}$ each independently represents —F or —Cl.
In some embodiments of the present invention, the compound of general formula F is selected from a group consisting of the following compounds:
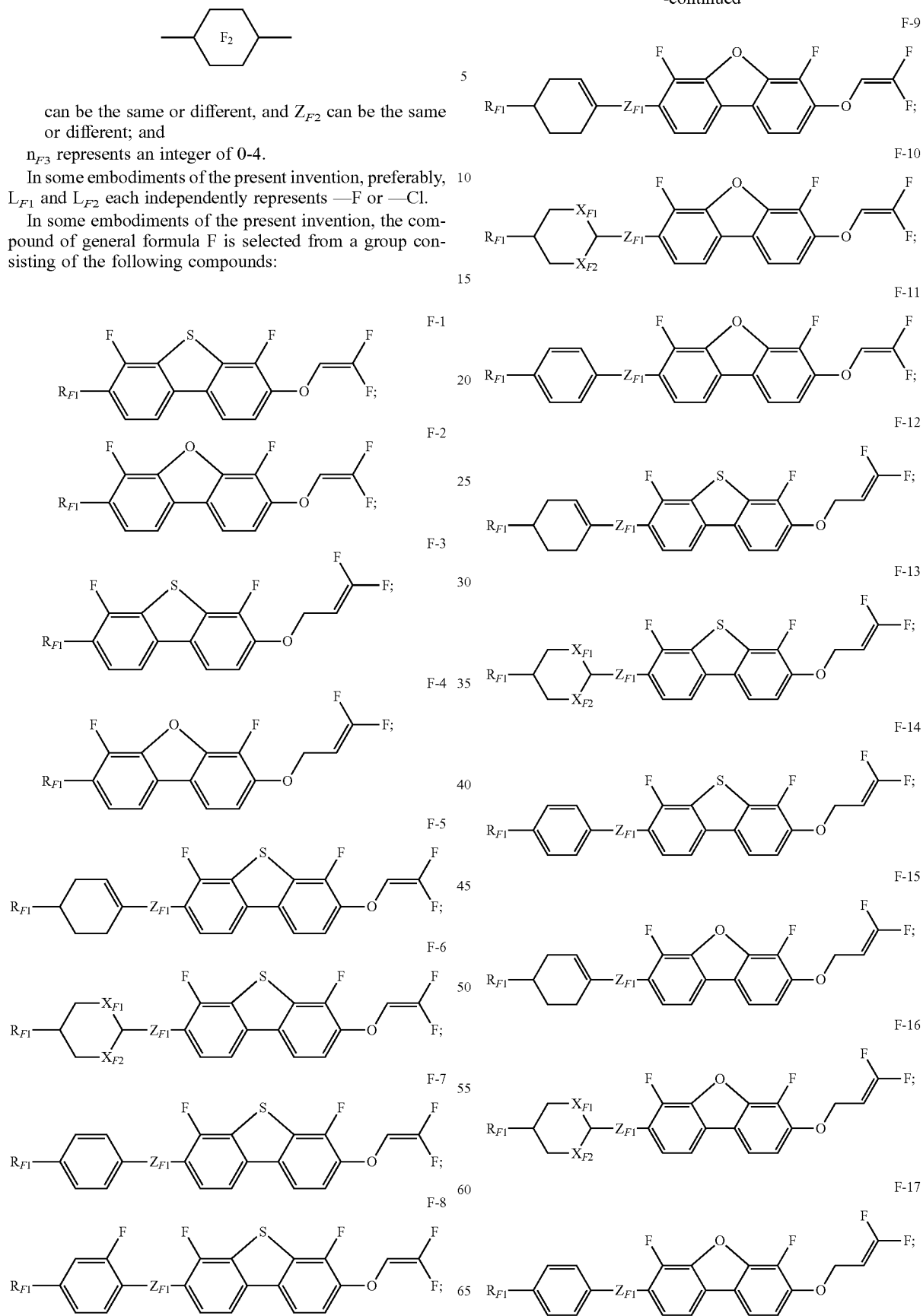

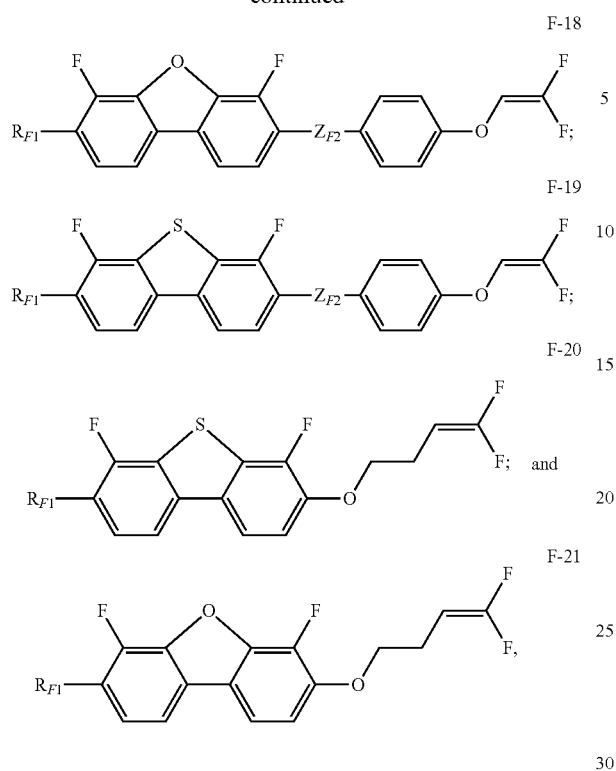

wherein, $X_{F1}$ and $X_{F2}$ each independently represents —CH$_2$— or —O—.

In some embodiments of the present invention, in order to obtain a larger absolute value of dielectric anisotropy while maintaining an appropriate clearing point, an appropriate optical anisotropy, and an appropriate rotational viscosity, preferably, $X_F$ represents —S—.

In some embodiments of the present invention, preferably, $n_{F3}$ represents 0 or 1; further preferably, $n_{F3}$ represents 0.

In some embodiments of the present invention, preferably, $Z_{F1}$ and $Z_{F2}$ each independently represents single bond, —CH$_2$O— or —OCH$_2$—; further preferably, both of $Z_{F1}$ and $Z_{F2}$ represent single bond.

In some embodiments of the present invention, at least one of $n_{F1}$ and $n_{F2}$ represents 0; further preferably, both of $n_{F1}$ and $n_{F2}$ represent 0.

In some embodiments of the present invention, preferably, $R_{F1}$ represents C$_{1-10}$ linear or branched alkyl, C$_{1-9}$ linear or branched alkoxy, or C$_{2-10}$ linear or branched alkenyl; further preferably, $R_{F1}$ represents C$_{1-8}$ linear or branched alkyl, C$_{1-7}$ linear or branched alkoxy, or C$_{2-8}$ linear or branched alkenyl.

In some embodiments of the present invention, in the compound of general formula F-1, the compound of general formula F-2, the compound of general formula F-3, the compound of general formula F-4, the compound of general formula F-5, the compound of general formula F-6, the compound of general formula F-26 and the compound of general formula F-27, $R_{F1}$ represents C$_{1-7}$ linear or branched alkoxy.

In some embodiments of the present invention, the compound of general formula F-1 is selected from a group consisting of the following compounds:

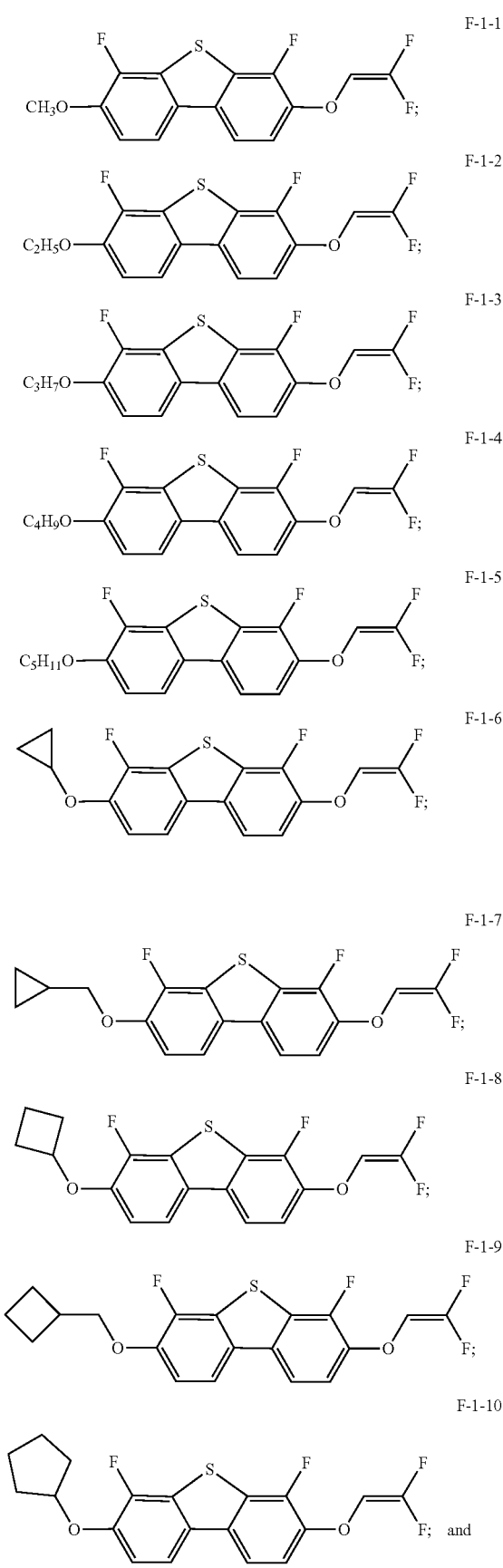

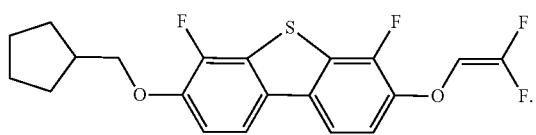

F-1-11

In some embodiments of the present invention, the compound of general formula F-2 is selected from a group consisting of the following compounds:

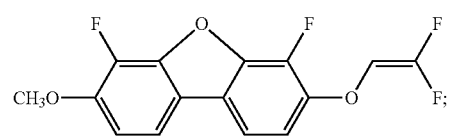

F-2-1

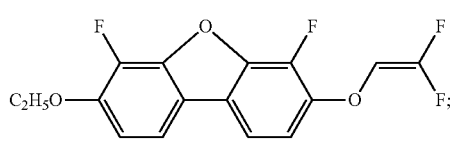

F-2-2

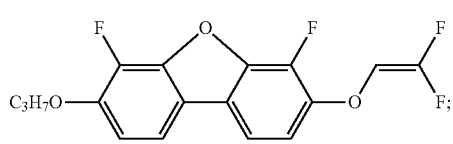

F-2-3

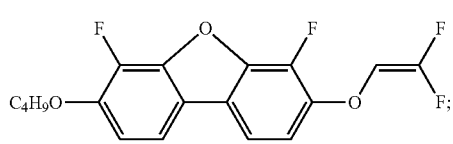

F-2-4

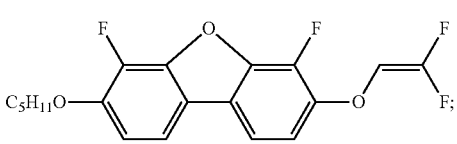

F-2-5

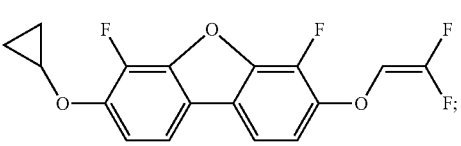

F-2-6

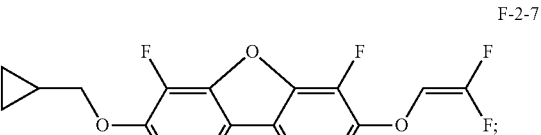

F-2-7

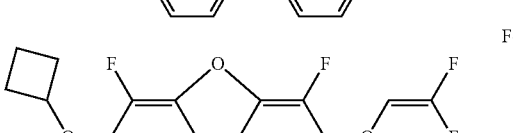

F-2-8

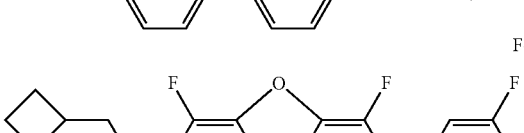

F-2-9

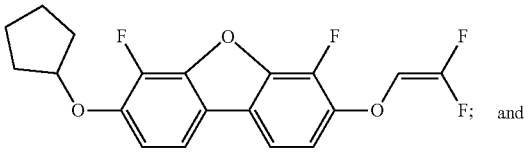

F-2-10

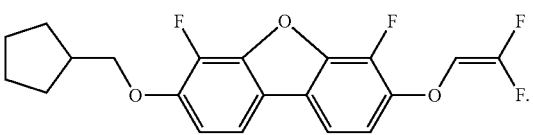

F-2-11

In some embodiments of the present invention, the compound of general formula F-5 is selected from a group consisting of the following compounds:

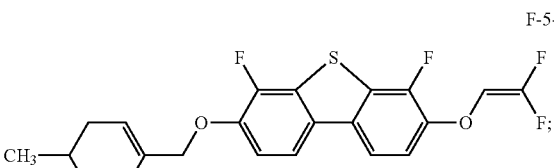

F-5-1

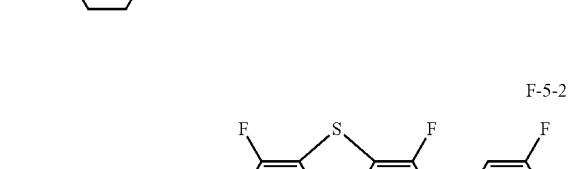

F-5-2

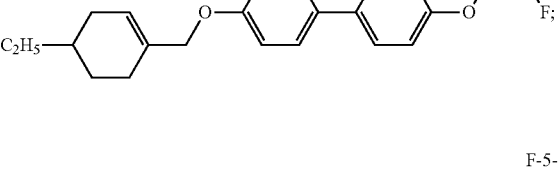

F-5-3

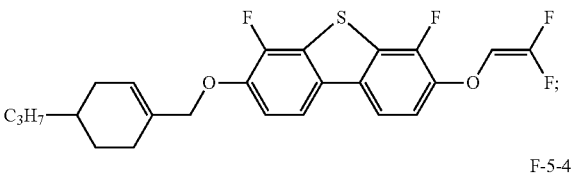

F-5-4

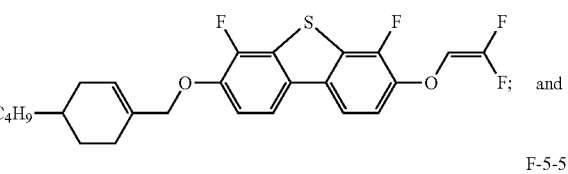

F-5-5

In some embodiments of the present invention, the compound of general formula F-6 is selected from a group consisting of the following compounds:

In some embodiments of the present invention, the compound of general formula F-9 is selected from a group consisting of the following compounds

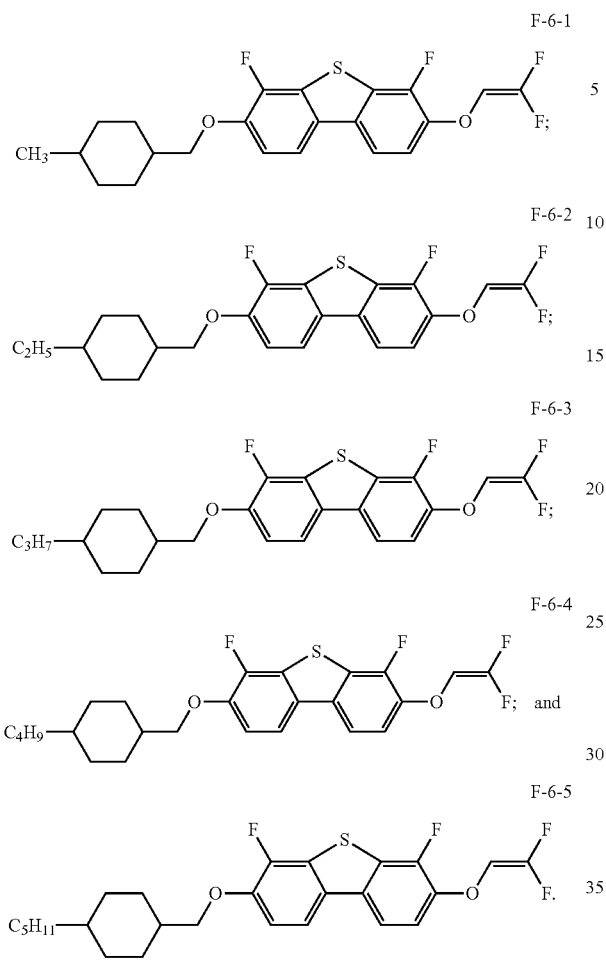

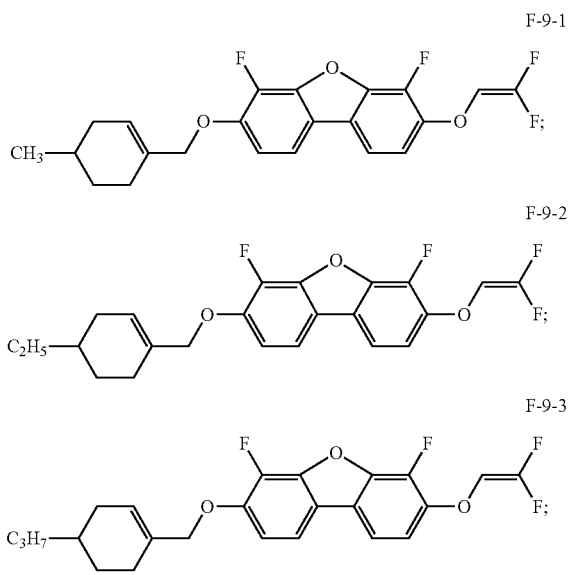

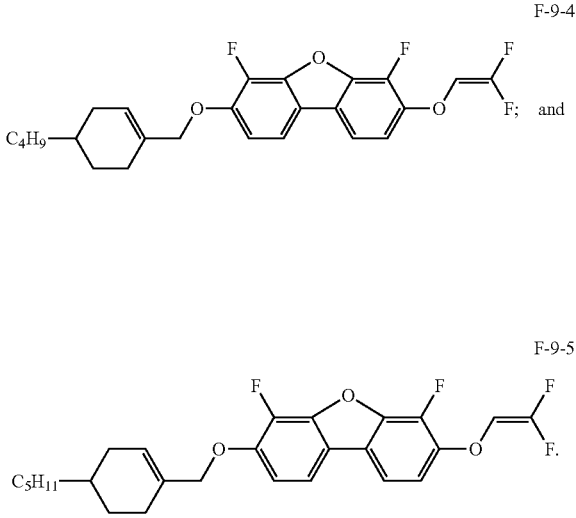

The liquid crystal compound of the present invention has a larger absolute value of dielectric anisotropy, and is particularly suitable for use in VA-TFT, IPS, or FFS display devices. The absolute value of dielectric anisotropy is 10 or larger (for example, 10.5), preferably is 12 or larger (for example, 13, 14), preferably is 15 or larger (for example, 15.8, 16, 16.4), which is suitable for use in liquid crystal compositions having higher requirements on absolute value of dielectric anisotropy. In addition, when applied the compound of this type of the present invention into a liquid crystal composition, the liquid crystal composition will have a better miscibility, better low-temperature storage stability, a lower rotational viscosity, and a higher VHR(UV), and a better reliability even after ultraviolet ray treatment.

In another aspect, the present invention provides a liquid crystal composition comprising at least one of the above liquid crystal compounds of general formula F.

In some embodiments of the present invention, adjusting the content of compound of general formula F is preferred such that the liquid crystal composition of the present invention has a larger optical anisotropy, a smaller rotational viscosity, a higher VHR(UV), and a longer low temperature storage time while maintaining an appropriate clearing point, an appropriate absolute value of dielectric anisotropy and an appropriate VHR(initial).

In some embodiments of the present invention, the compound of general formula F provides 0.1-30 wt. % of the total weight of the liquid crystal composition (including all of the numerical values therebetween), for example, 0.1 wt. %, 0.5 wt. %, 1 wt. %, 2 wt. %, 3 wt. %, 4 wt. %, 5 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, or a numerical range between any two of these.

In some embodiments of the present invention, in order to obtain a larger optical anisotropy, a smaller rotational viscosity, a higher VHR(UV), and a longer low temperature storage time, preferably, the liquid crystal composition comprises at least two (for example, two, three) compounds of general formula F.

In some embodiments of the present invention, the liquid crystal composition further comprises at least one compound of general formula N:

N

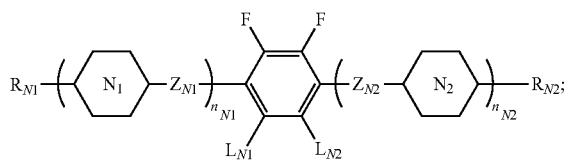

wherein,
$R_{N1}$ and $R_{N2}$ each independently represents $C_{1-12}$ (for example, $C_1$, $C_2$, $C_3$, $C_4$, $C_5$, $C_6$, $C_7$, $C_8$, $C_9$, $C_{10}$, $C_{11}$, or $C_{12}$) linear or branched alkyl,

wherein one or more nonadjacent —CH$_2$— in the $C_{1-12}$ linear or branched alkyl can each be independently replaced by —CH=CH—, —C≡C—, —O—, —CO—, —CO—O— or —O—CO—;
ring

and ring

each independently represents

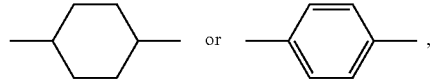

wherein one or more —CH$_2$— in

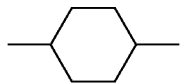

can be replaced by —O—, one or more single bond in the rings can be replaced by double bond, wherein one or more —H on

can each be independently substituted by —F, —Cl or —CN, and one or more —CH= in the rings can be replaced by —N=;

$Z_{N1}$ and $Z_{N2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;
$L_{N1}$ and $L_{N2}$ each independently represents —H, $C_{1-3}$ alkyl, or halogen; and
$n_{N1}$ represents 0, 1, 2 or 3, $n_{N2}$ represents 0 or 1, and $0 \leq n_{N1}+n_{N2} \leq 3$, wherein, when $n_{N1}=2$ or 3, ring

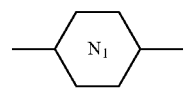

can be the same or different, and $Z_{N1}$ can be the same or different.

In some embodiments of the present invention, both $L_{N1}$ and $L_{N2}$ represent —H.

In some embodiments of the present invention, the compound of general formula N is selected from a group consisting of the following compounds:

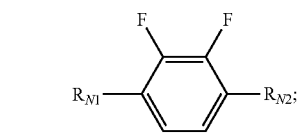

N-1

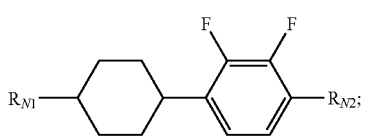

N-2

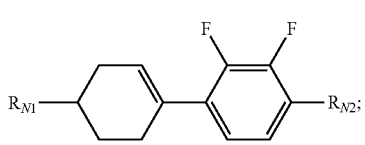

N-3

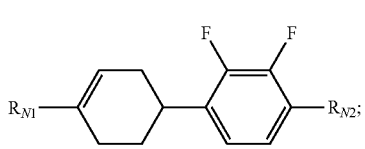

N-4

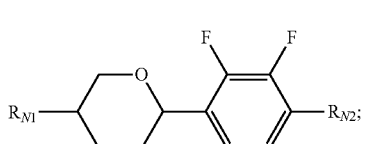

N-5

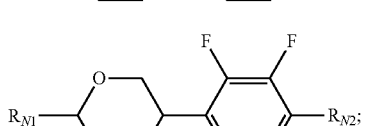

N-6

N-7

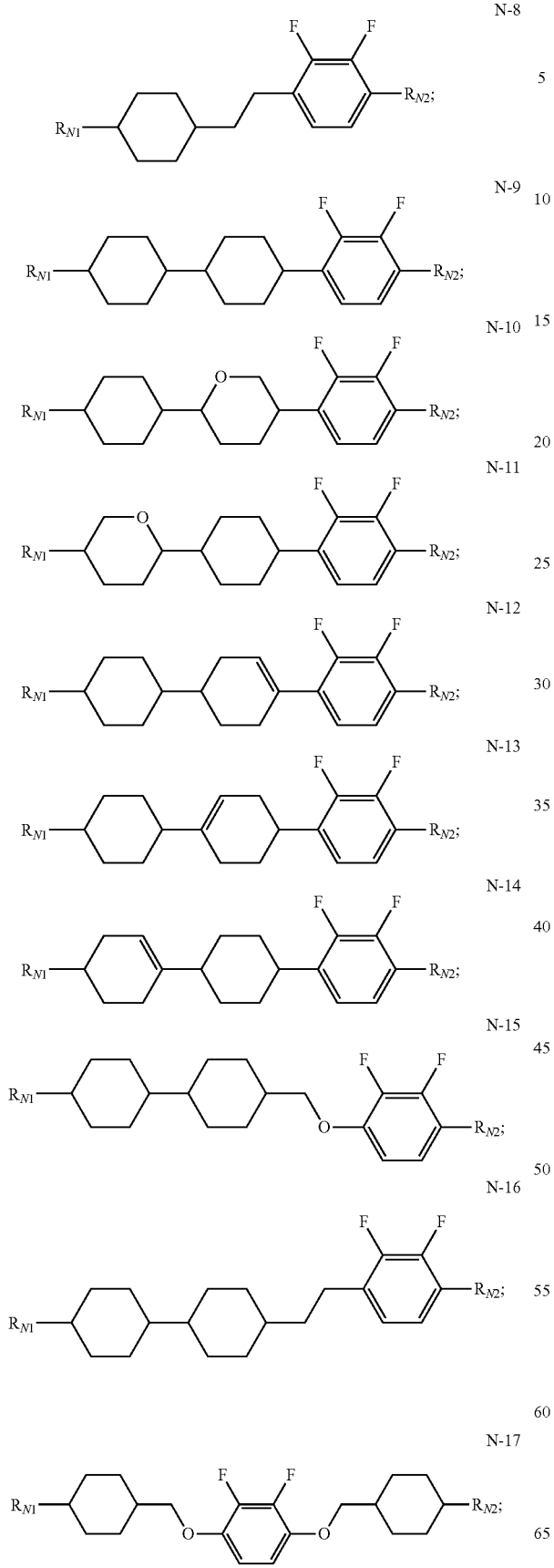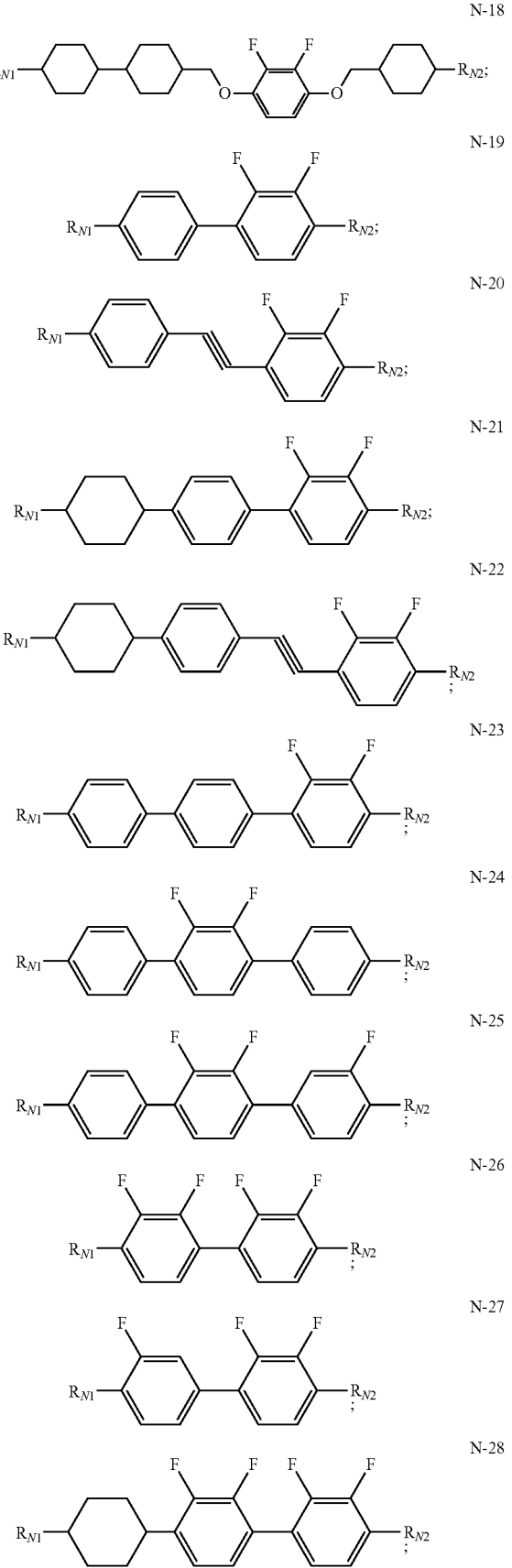

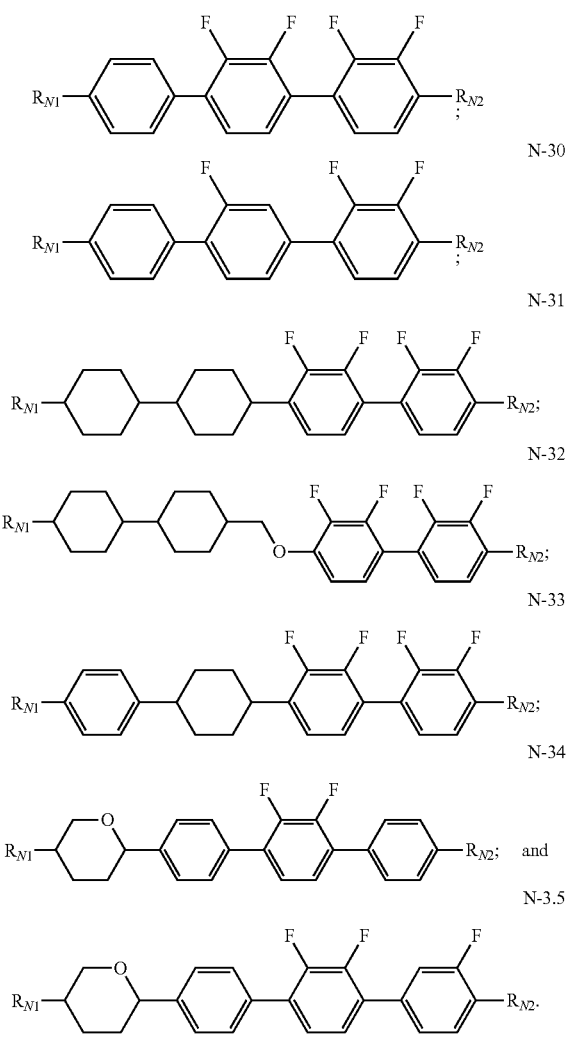

In some embodiments of the present invention, preferably, $R_{N1}$ and $R_{N2}$ each independently represents $C_{1-10}$ linear or branched alkyl, $C_{1-9}$ linear or branched alkoxy, or $C_{2-10}$ linear or branched alkenyl; further preferably, $R_{N1}$ and $R_{N2}$ each independently represents $C_{1-8}$ linear or branched alkyl, $C_{1-7}$ linear or branched alkoxy, or $C_{2-8}$ linear or branched alkenyl.

In some embodiments of the present invention, preferably, the compound of general formula N is selected from a group consisting of the compound of general formula N-1, the compound of general formula N-2, the compound of general formula N-3, the compound of general formula N-9, the compound of general formula N-12, the compound of general formula N-13, the compound of general formula N-19, the compound of general formula N-21, the compound of general formula N-24, the compound of general formula N-27, and the compound of general formula N-30.

In some embodiments of the present invention, in order to obtain a larger optical anisotropy, a larger clearing point, a smaller rotational viscosity, an appropriate VHR(initial), a higher VHR(UV), and a longer low temperature storage time, preferably, the compound of general formula N is selected from a group consisting of the compound of general formula N-2, the compound of general formula N-3, the compound of general formula N-9, the compound of general formula N-12 and the compound of general formula N-13.

In some embodiments of the present invention, in order to obtain a larger optical anisotropy, a smaller rotational viscosity, a higher VHR(UV), and a longer low temperature storage time, preferably, the compound of general formula N is selected from a group consisting of the compound of general formula N-1, the compound of general formula N-19, the compound of general formula N-21, the compound of general formula N-24, the compound of general formula N-27 and the compound of general formula N-30.

In some embodiments of the present invention, adjusting the content of compound of general formula N is preferred such that the liquid crystal composition of the present invention has an appropriate clearing point, an appropriate absolute value of dielectric anisotropy, an appropriate VHR (initial), a larger optical anisotropy, a smaller rotational viscosity, a higher VHR(UV), and a longer low temperature storage time.

In some embodiments of the present invention, the compound of general formula N provides 0.1-70 wt. % (including all of the numerical values therebetween) of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 37 wt. %, 38 wt. %, 40 wt. %, 42 wt. %, 44 wt. %, 46 wt. %, 48 wt. %, 49 wt. %, 50 wt. %, 52 wt. %, 53 wt. %, 54 wt. %, 56 wt. %, 57 wt. %, 58 wt. %, 59 wt. %, 60% wt. %, 61 wt. %, 62 wt. %, 64 wt. %, 66 wt. %, 68 wt. %, 70 wt. % or a numerical range between any two of these.

In some embodiments of the present invention, the liquid crystal composition further comprises at least one compound of general formula M:

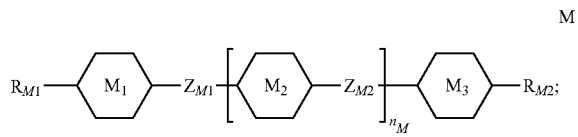

wherein,
$R_{M1}$ and $R_{M2}$ each independently represents $C_{1-12}$ (for example, $C_1$, $C_2$, $C_3$, $C_4$, $C_5$, $C_6$, $C_7$, $C_8$, $C_9$, $C_{10}$, $C_{11}$, or $C_{12}$) linear or branched alkyl,

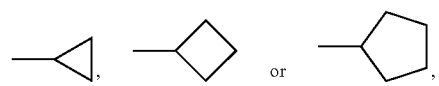

wherein one or more nonadjacent —$CH_2$— in the $C_{1-12}$ linear or branched alkyl can each be independently replaced by —CH=CH—, —C≡C—, —O—, —CO—, —CO—O— or —O—CO—;
ring

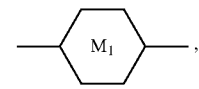

ring

and ring

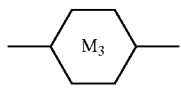

each independently represents

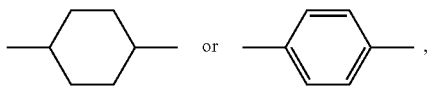

wherein one or more —CH$_2$— in

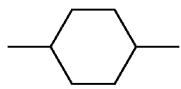

can be replaced by —O—, one or more single bond in the rings can be replaced by double bond, wherein at most one —H on

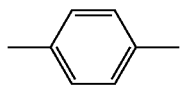

can be substituted by halogen;
$Z_{M1}$ and $Z_{M2}$ each independently represents single bond, —CO—O—, —O—CO—, —CH$_2$O—, —OCH$_2$—, —C≡C—, —CH=CH—, —CH$_2$CH$_2$— or —(CH$_2$)$_4$—; and
$n_M$ represents 0, 1 or 2, wherein when $n_{M=2}$, ring

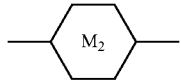

can be the same or different, and $Z_{M2}$ can be the same or different.

In some embodiments of the present invention, preferably, $R_{M1}$ and $R_{M2}$ each independently represents C$_{1-10}$ linear or branched alkyl, C$_{1-9}$ linear or branched alkoxy, or C$_{2-10}$ linear or branched alkenyl; further preferably, $R_{M1}$ and $R_{M2}$ each independently represents C$_{1-8}$ linear or branched alkyl, C$_{1-7}$ linear or branched alkoxy, or C$_{2-8}$ linear or branched alkenyl.

In some embodiments of the present invention, preferably, $R_{M1}$ and $R_{M2}$ each independently represents C$_{2-8}$ linear alkenyl; more preferably, $R_{M1}$ and $R_{M2}$ each independently represents C$_{2-5}$ linear alkenyl.

In some embodiments of the present invention, preferably, one of $R_{M1}$ and $R_{M2}$ is C$_{2-5}$ linear alkenyl and the other is C$_{1-5}$ linear alkyl.

In some embodiments of the present invention, preferably, $R_{M1}$ and $R_{M2}$ each independently represents C$_{1-8}$ linear alkoxy; further preferably, $R_{M1}$ and $R_{M2}$ each independently represents C$_{1-5}$ linear alkoxy.

In some embodiments of the present invention, preferably, one of $R_{M1}$ and $R_{M2}$ is C$_{1-5}$ linear alkoxy and the other is C$_{1-5}$ linear alkyl.

In some embodiments of the present invention, with emphasis in reliability, both $R_{M1}$ and $R_{M2}$ are preferably alkyl; with emphasis in reducing the volatility of the compound, both $R_{M1}$ and $R_{M2}$ are preferably alkoxy; and with emphasis in reducing the viscosity, at least one of $R_{M1}$ and $R_{M2}$ is preferably alkenyl.

As used herein, the term "C$_{1-r}$" (wherein r represents an integer greater than 1) can be carbon atoms of any integer between 1 and r (including end values 1 and r), for example, C$_2$, C$_{r-1}$ or C$_r$. For instance, "C$_{1-12}$" can be C$_1$, C$_2$, C$_3$, C$_4$, C$_5$, C$_6$, C$_7$, C$_8$, C$_9$, C$_{10}$, C$_{11}$ or C$_{12}$.

As used herein, the term "an integer of y$_1$-y$_2$" can be any integer between the range (including end values y$_1$ and y$_2$). For example, "an integer of 0-12" can be such as 0, 1, 2, 3, 4, 5, 6, 7, 8, 9, 10, 11 or 12.

The alkenyl group in the present invention is preferably selected from the groups represented by any one of formula (V1) to formula (V9), particularly formula (V1), formula (V2), formula (V8) or formula (V9). The groups represented by formula (V1) to formula (V9) are as follows:

 (V1)

 (V2)

 (V3)

 (V4)

 (V5)

 (V6)

 (V7)

 (V8)

 (V9)

in which, * represents linking site that is bound in the ring structure.

The alkenoxy group in the present invention is preferably selected from the groups represented by any one of formula (OV1) to formula (OV9), particularly formula (OV1), formula (OV2), formula (OV8) or formula (OV9). The groups represented by formula (OV1) to formula (OV9) are as follows:

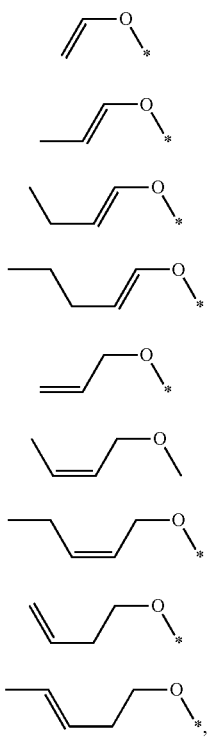
in which, * represents linking site that is bound in the ring structure.
In some embodiments of the present invention, the compound of general formula M is selected from a group consisting of the following compounds:
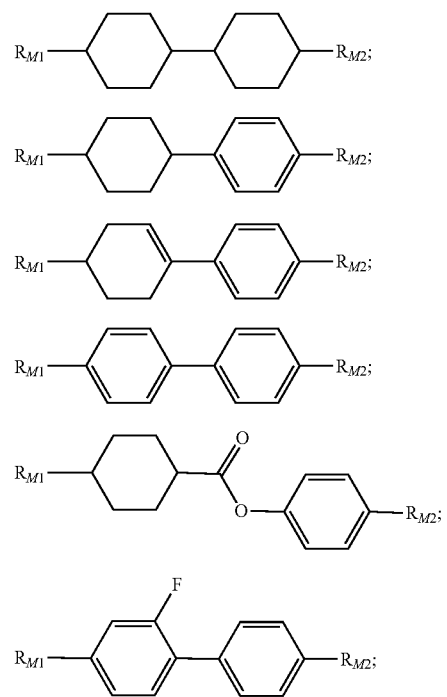
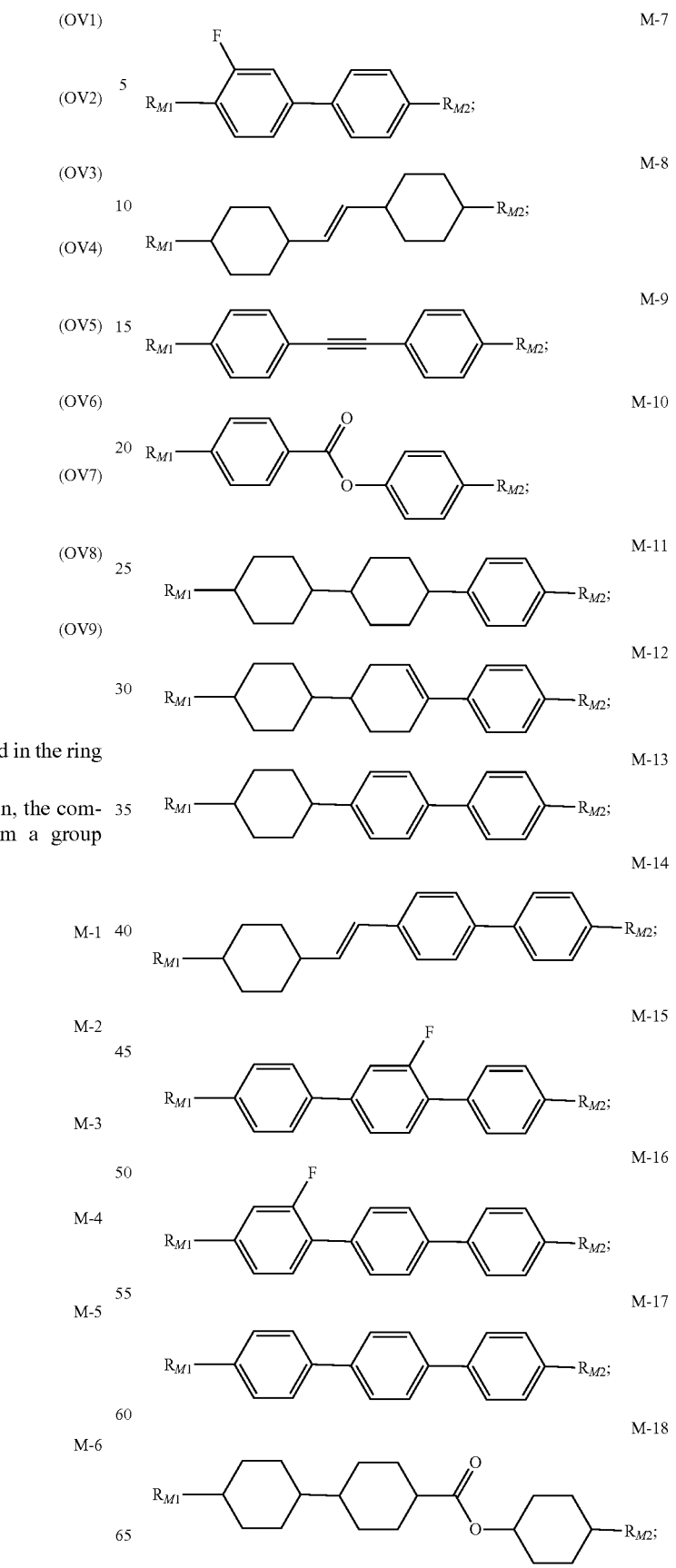

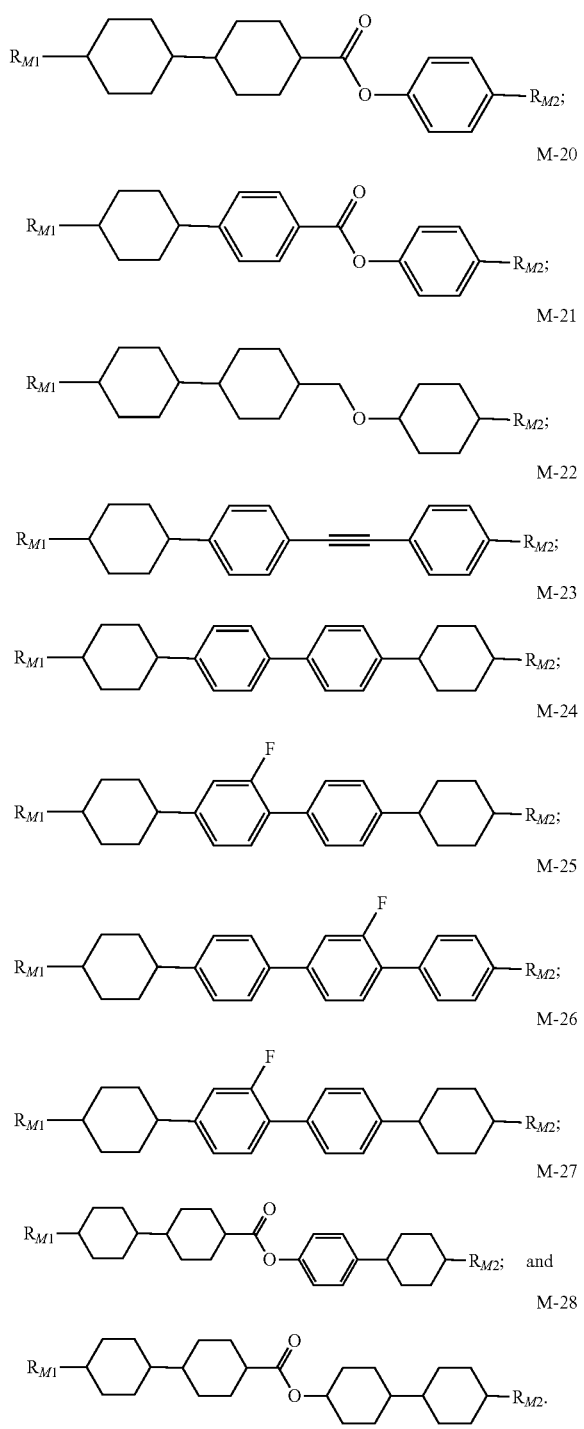

M-19
M-20
M-21
M-22
M-23
M-24
M-25
M-26
M-27
M-28

In some embodiments of the present invention, in order to obtain a larger optical anisotropy, an appropriate clearing point, a smaller rotational viscosity, an appropriate VHR (initial), a higher VHR(UV), and a longer low temperature storage time, preferably, the compound of general formula M is selected from a group consisting of the compound of general formula M-1, the compound of general formula M-4, the compound of general formula M-11 and the compound of general formula M-13.

In some embodiments of the present invention, the content of the compound of general formula M must be appropriately adjusted depending on the required performance such as low temperature solubility, transition temperature, electrical reliability, birefringence index, process adaptability, drop trace, "burn-in", dielectric anisotropy and so on.

Regarding the content of the compound of general formula M, the lower limit and the upper limit thereof are preferably higher when it is desired to maintain the liquid crystal composition of the present invention with a lower viscosity and a shorter response time; further, the lower limit and the upper limit thereof are preferably higher when it is desired to maintain the liquid crystal composition of the present invention with a higher clearing point and a good temperature stability; the lower limit and the upper limit thereof are preferably decreased in order to maintain the driving voltage lower and make the absolute value of the dielectric anisotropy larger.

In some embodiments of the present invention, adjusting the content of compound of general formula M is preferred such that the liquid crystal composition of the present invention has an appropriate clearing point, an appropriate absolute value of dielectric anisotropy, an appropriate VHR (initial), a larger optical anisotropy, a smaller rotational viscosity, a higher VHR(UV), and a longer low temperature storage time.

In some embodiments of the present invention, the compound of general formula M provides 0.1-70 wt. % (including all of the numerical values therebetween) of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 35 wt. %, 36 wt. %, 37 wt. %, 38 wt. %, 40 wt. %, 42 wt. %, 44 wt. %, 46 wt. %, 47 wt. %, 48 wt. %, 49 wt. %, 50 wt. %, 52 wt. %, 54 wt. %, 56 wt. %, 58 wt. %, 60% wt. %, 62 wt. %, 64 wt. %, 66 wt. %, 68 wt. %, 70 wt. % or a numerical range between any two of these.

In some embodiments of the present invention, in order to apply the liquid crystal composition of the present invention into high-transmission liquid crystal display, the liquid crystal composition of the present invention further comprises at least one compound selected from a group consisting of compounds of general formula A-1 and general formula A-2:

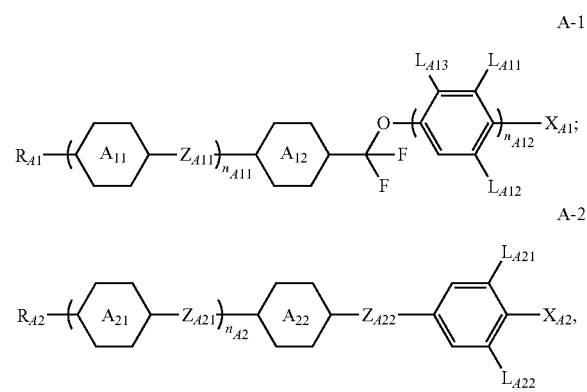

wherein, $R_{A1}$ and $R_{A2}$ each independently represents $C_{1-12}$ (for example, $C_1$, $C_2$, $C_3$, $C_4$, $C_5$, $C_6$, $C_7$, $C_8$, $C_9$, $C_{10}$, $C_{11}$, or $C_{12}$) linear or branched alkyl,

wherein one or more nonadjacent —CH$_2$— in the C$_{1-12}$ linear or branched alkyl can each be independently replaced by —CH=CH—, —C≡C—, —O—, —CO—, —CO—O— or —O—CO—, and one or more —H in the C$_{1-12}$ linear or branched alkyl,

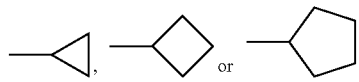

can each be independently substituted by —F or —Cl; ring

ring

ring

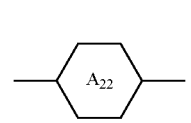

and ring

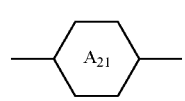

each independently represents

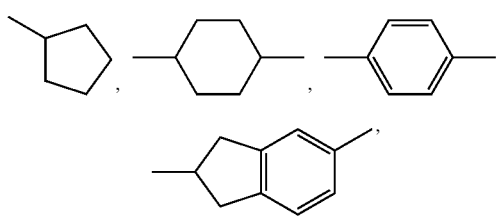

wherein one or more —CH$_2$— in

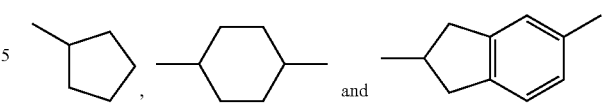

and can be replaced by —O—, one or more single bond in the rings can be replaced by double bond, wherein one or more —H on

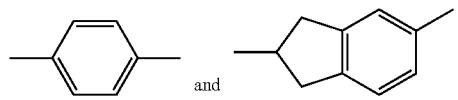

can each be independently substituted by —F, —Cl or —CN, one or more —CH= in the rings can be replaced by —N=;

$Z_{A11}$, $Z_{A21}$ and $Z_{A22}$ each independently represents single bond, —CH$_2$CH$_2$—, —CF$_2$CF$_2$—, —CO—O—, —O—CO—, —O—CO—O—, —CH=CH—, —CF=CF—, —CH$_2$O— or —OCH$_2$—;

$L_{A11}$, $L_{A12}$, $L_{A13}$, $L_{A21}$ and $L_{A22}$ each independently represents —H, C$_{1-3}$ alkyl, or halogen;

$X_{A1}$ and $X_{A2}$ each independently represents halogen, C$_{1-5}$ linear or branched halogenated alkyl or halogenated alkoxy, C$_{2-5}$ linear or branched halogenated alkenyl or halogenated alkenoxy;

$n_{A11}$ represents 0, 1, 2 or 3, wherein, when $n_{A11}$=2 or 3, ring

can be the same or different, and $Z_{A11}$ can be the same or different;

$n_{A12}$ represents 1 or 2, wherein when $n_{A12}$=2, ring can be the same or different; and $n_{A2}$ represents 0, 1, 2 or 3, wherein when $n_{A2}$=2 or 3, ring can be the same or different, and $Z_{A21}$ can be the same or different.

In some embodiments of the present invention, the compound of general formula A-1 is selected from a group consisting of the following compounds:

A-1-1
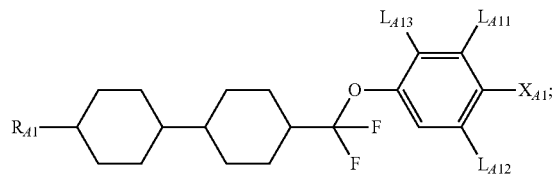
A-1-2
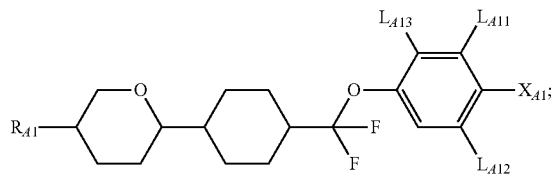
A-1-3
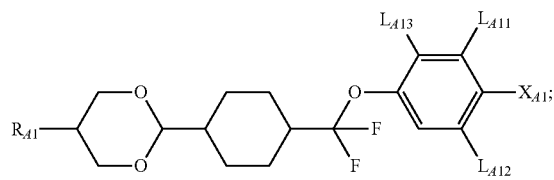
A-1-4
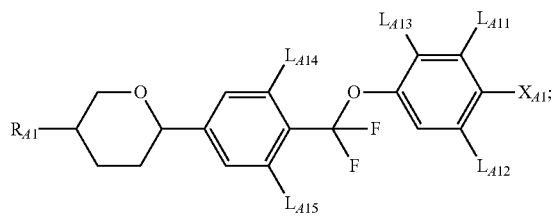
A-1-5
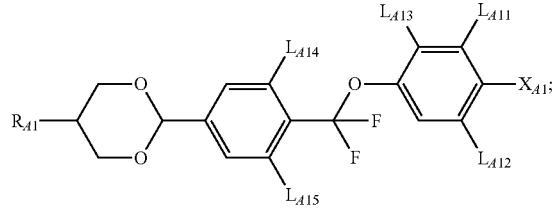
A-1-6
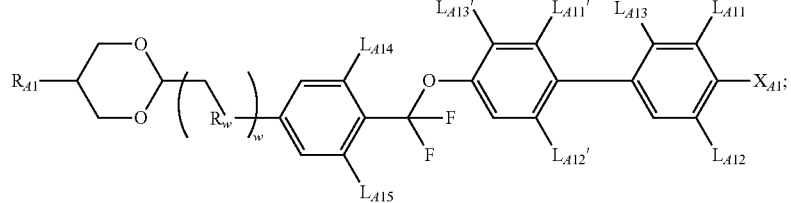
A-1-7
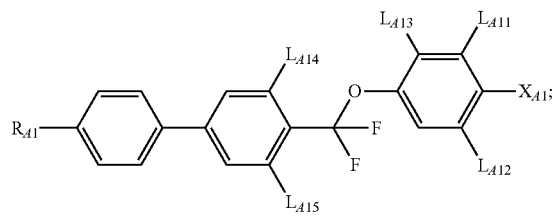
A-1-8
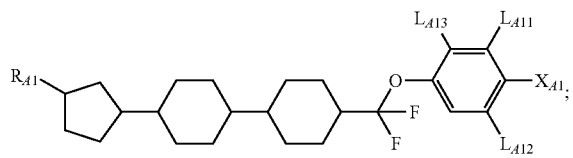
A-1-9
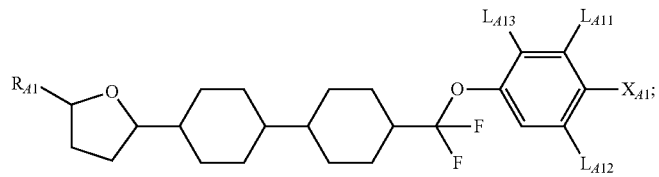
A-1-10
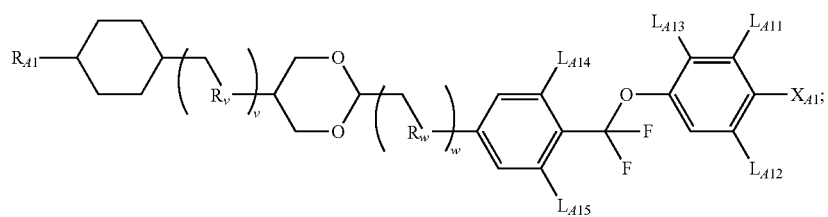

-continued

A-1-11
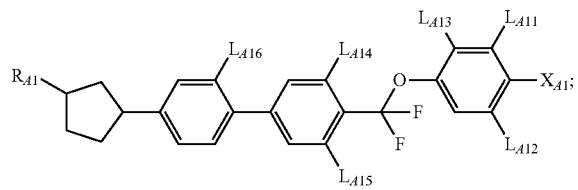

A-1-12
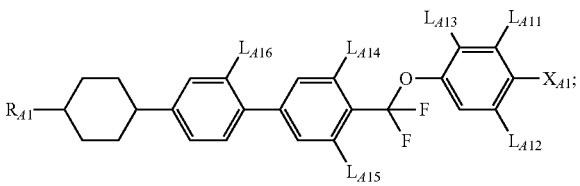

A-1-13
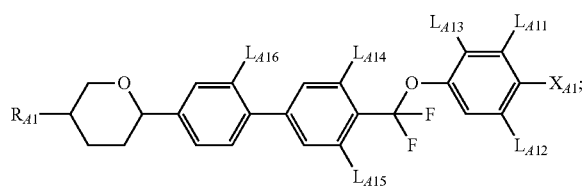

A-1-14
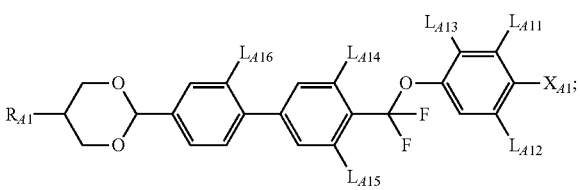

A-1-15
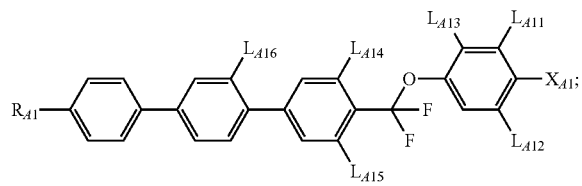

A-1-16

A-1-17

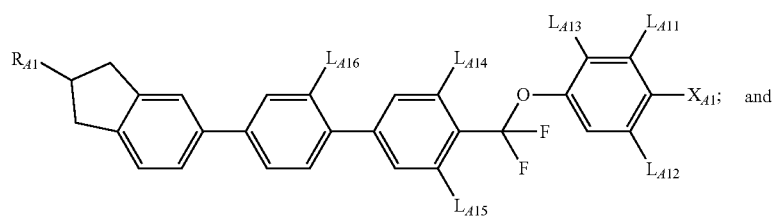

A-1-18 wherein, $R_{A1}$ represents $C_{1-8}$ linear or branched alkyl,

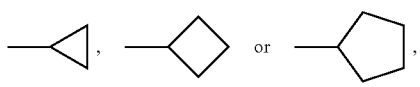

wherein one or more nonadjacent —$CH_2$— in the $C_{1-8}$ linear or branched alkyl can each be independently replaced by —CH=CH—, —C≡C—, —O—, —CO—, —CO—O— or —O—CO—, and one or more —H existing in these groups can each be independently substituted by —F or —Cl;

$R_v$ and $R_w$ each independently represents —$CH_2$— or —O—;

$L_{A11}$, $L_{A12}$, $L_{A11}'$, $L_{A12}'$, $L_{A14}$, $L_{A15}$ and $L_{A16}$ each independently represents —H or —F;

$L_{A13}$ and $L_{A13}'$ each independently represents —H or —$CH_3$;

$X_{A1}$ represents —F, —$CF_3$ or —$OCF_3$; and v and w each independently represents 0 or 1.

In some embodiments of the present invention, the compound of general formula A-1 provides 0.1-50 wt. % (including all of the numerical values therebetween) of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %, or a numerical range between any two of these.

Regarding the content of the compound of general formula A-1, it is preferred that the lower limit and the upper limit thereof are slightly lower when it is desired to maintain the liquid crystal composition of the present invention with a lower viscosity and a faster response speed; further, it is preferred that the lower limit and the upper limit thereof are slightly lower when it is desired to maintain the liquid crystal composition of the present invention with a higher clearing point and a good temperature stability; in addition, it is preferred that the lower limit and the upper limit thereof are slightly higher in order to maintain the driving voltage lower and increase the absolute value of the dielectric anisotropy.

In some embodiments of the present invention, the compound of general formula A-2 is selected from a group consisting of the following compounds:

A-2-1
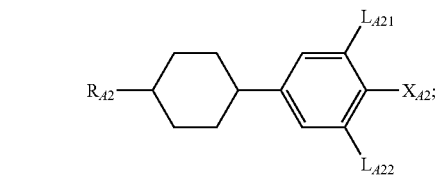

A-2-2
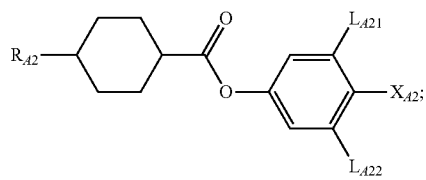

A-2-3
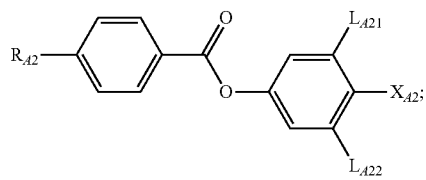

A-2-4
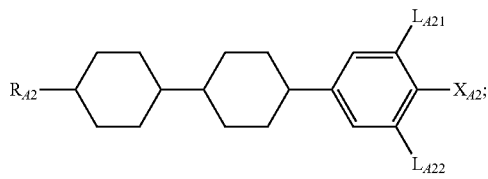

A-2-5
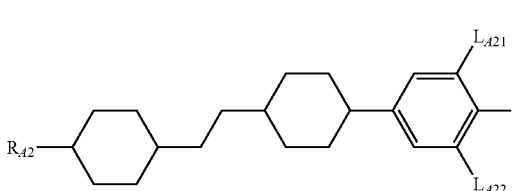

A-2-6
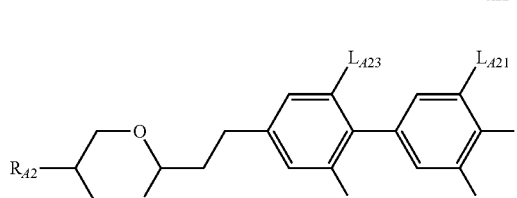

A-2-7
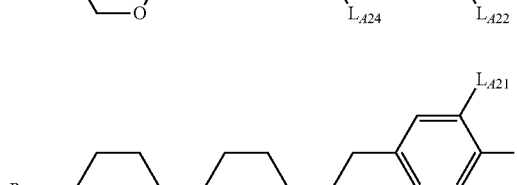

-continued

A-2-8
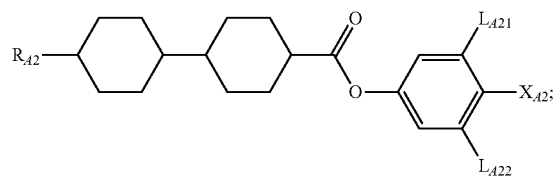

A-2-9
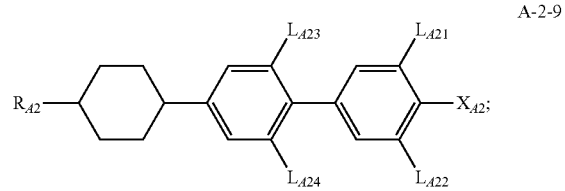

A-2-10
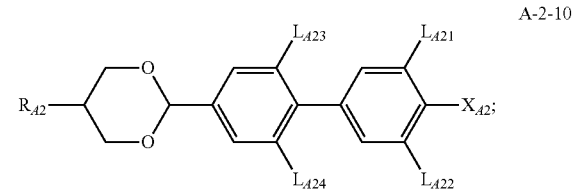

A-2-11
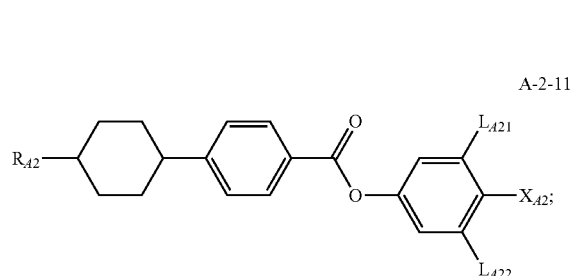

A-2-12
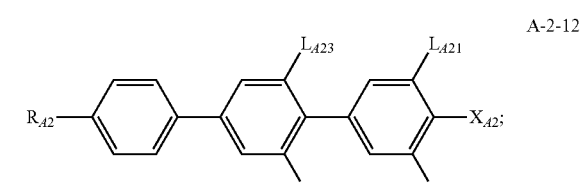

A-2-13
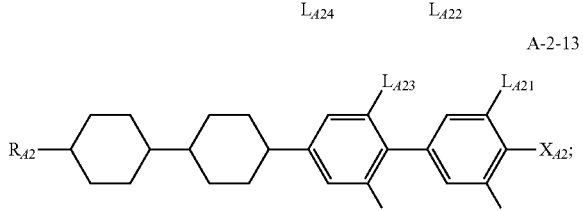

A-2-14
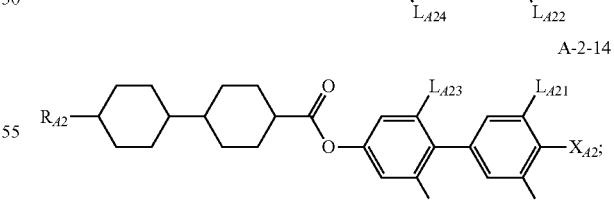

A-2-15
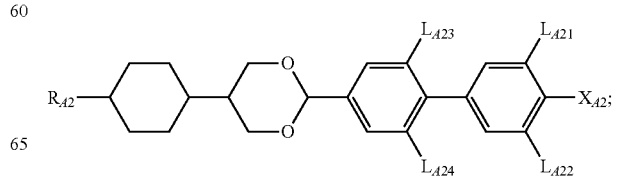

A-2-16

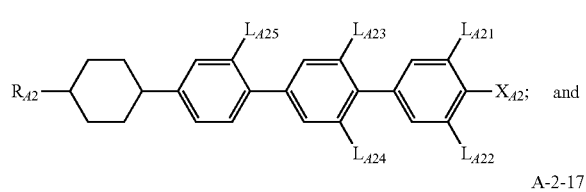

and

A-2-17

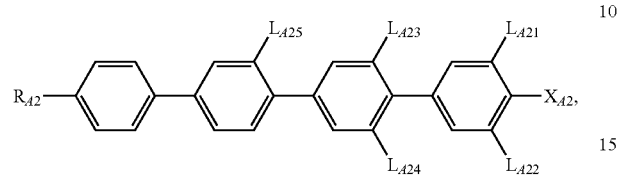

wherein, $R_{A2}$ represents $C_{1-8}$ linear or branched alkyl, wherein one or more nonadjacent —$CH_2$— in the $C_{1-8}$ linear or branched alkyl can each be independently replaced by —CH=CH—, —C≡C—, —O—, —CO—, —CO—O— or —O—CO—, and one or more —H existing in these groups can each be independently substituted by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH=CF_2$.

In some embodiments of the present invention, the compound of general formula A-2 provides 0.1-50 wt. % (including all of the numerical values therebetween) of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %, or a numerical range between any two of these.

Regarding the content of the compound of general formula A-2, it is preferred that the lower limit and the upper limit thereof are slightly lower when it is desired to maintain the liquid crystal composition of the present invention with a lower viscosity and a faster response speed; further, it is preferred that the lower limit and the upper limit thereof are slightly lower when it is desired to maintain the liquid crystal composition of the present invention with a higher clearing point and a good temperature stability; in addition, it is preferred that the lower limit and the upper limit thereof are slightly higher in order to maintain the driving voltage lower and increase the absolute value of the dielectric anisotropy.

In some embodiments of the present invention, the compound selected from the group consisting of the compounds of general formula A-1 and general formula A-2 provides 0.1-60 wt. % (including all of the numerical values therebetween) of the total weight of the liquid crystal composition, for example, 0.1 wt. %, 1 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %, 52 wt. %, 54 wt. %, 56 wt. %, 58 wt. %, 60 wt. %, or a numerical range between any two of these.

In some embodiments of the present invention, the liquid crystal composition further comprises at least one polymerizable compound of general formula RM:

RM

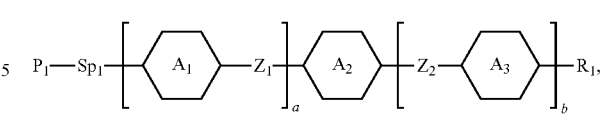

wherein, $R_1$ represents —H, halogen, —CN, -$Sp_2$-$P_2$, $C_{1-12}$ (for example, $C_1$, $C_2$, $C_3$, $C_4$, $C_5$, $C_6$, $C_7$, $C_8$, $C_9$, $C_{10}$, $C_{11}$, or $C_{12}$) linear or branched alkyl,

wherein one or more nonadjacent —$CH_2$— in the $C_{1-12}$ linear or branched alkyl,

can each be independently replaced by —CH=CH—, —C≡C—, —O—, —CO—, —CO—O— or —O—CO—, and one or more —H can each be independently substituted by —F or —Cl;

ring

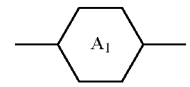

and ring

each independently represents

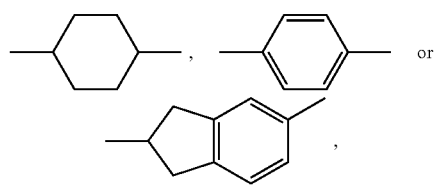

wherein one or more —$CH_2$— in

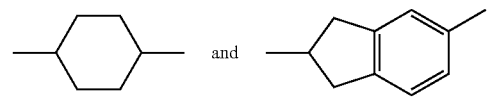

can be replaced by —O—, and one or more single bond in the rings can be replaced by double bond, wherein one or more —H on

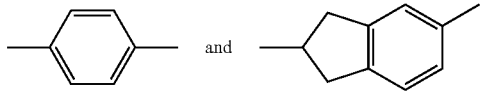

can each be independently substituted by —F, —Cl, —CN, -Sp$_3$-P$_3$, C$_{1-12}$ (for example, C$_1$, C$_2$, C$_3$, C$_4$, C$_5$, C$_6$, C$_7$, C$_8$, C$_9$, C$_{10}$, C$_{11}$, or C$_{12}$) halogenated or unhalogenated linear alkyl, C$_{1-11}$ halogenated or unhalogenated linear alkoxy,

and one or more —CH= in the rings can be replaced by —N=;
ring

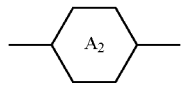

represents

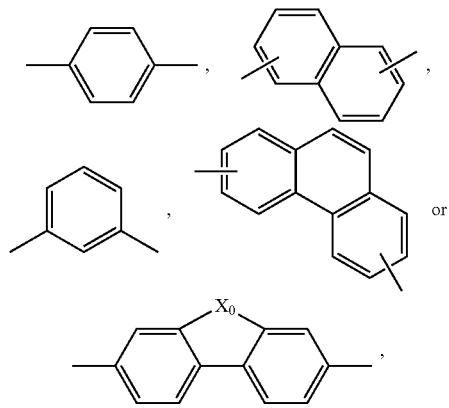

wherein one or more —H on

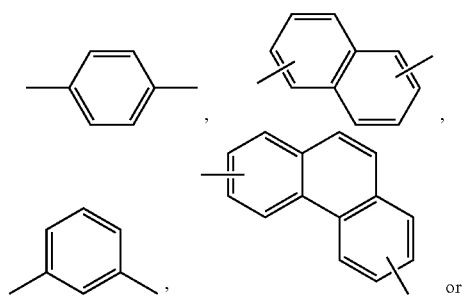

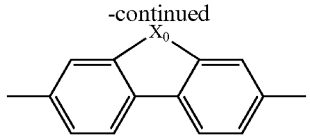

or can each be independently substituted by —F, —Cl, —CN, -Sp$_3$-P$_3$, C$_{1-12}$ (for example, C$_1$, C$_2$, C$_3$, C$_4$, C$_5$, C$_6$, C$_7$, C$_8$, C$_9$, C$_{10}$, C$_{11}$, or C$_{12}$) halogenated or unhalogenated linear alkyl, C$_{1-11}$ (for example, C$_1$, C$_2$, C$_3$, C$_4$, C$_5$, C$_6$, C$_7$, C$_8$, C$_9$, C$_{10}$, or C$_{11}$) halogenated or unhalogenated linear alkoxy,

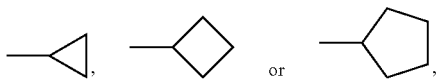

and one or more —CH= in the rings can be replaced by —N=;
P$_1$, P$_2$ and P$_3$ each independently represents a polymerizable group;
Sp$_1$, Sp$_2$ and Sp$_3$ each independently represents a spacer group or a single bond;
Z$_1$ and Z$_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_d$—, —CF$_2$CH$_2$—, —CH$_2$CF$_2$—, —(CF$_2$)$_d$—, —CH=CH—, —CF=CF—, —CH=CF—, —CF=CH—, —C≡C—, —CH=CH—CO—O—, —O—CO—CH=CH—, —CH$_2$CH$_2$—CO—O—, —O—CO—CH$_2$CH$_2$—, —CHR$^1$—, —CR$^1$R$^2$— or single bond, wherein R$^1$ and R$^2$ each independently represents C$_{1-12}$ (for example, C$_1$, C$_2$, C$_3$, C$_4$, C$_5$, C$_6$, C$_7$, C$_8$, C$_9$, C$_{10}$, C$_{11}$, or C$_{12}$) linear or branched alkyl, and d represents an integer of 1-4; X$_0$ represents —O—, —S—, —CO— —CF$_2$—, —NH— or —NF—;
a represents 0, 1 or 2, b represents 0 or 1, wherein when a represents 2, ring

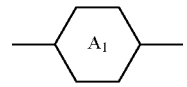

can be the same or different, and Z$_1$ can be the same or different.

In some embodiments of the present invention, the compound of general formula RM is selected from a group consisting of the following compounds:

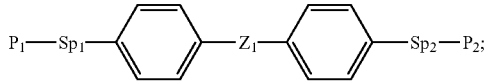

RM-1

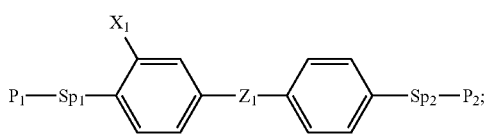

RM-2

-continued
RM-3
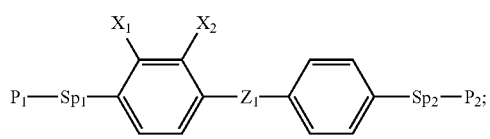
RM-4
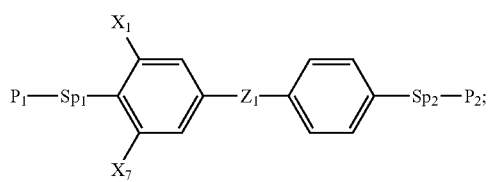
RM-5
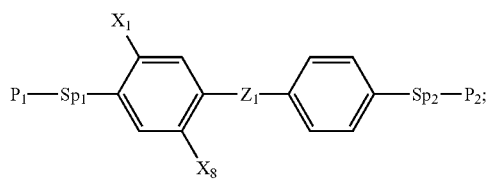
RM-6
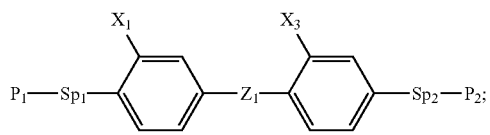
RM-7
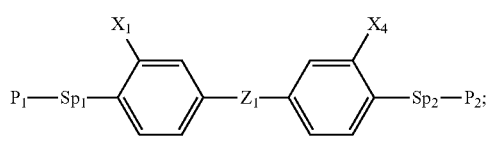
RM-8
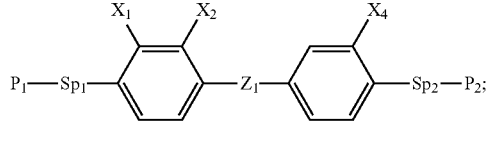
RM-9
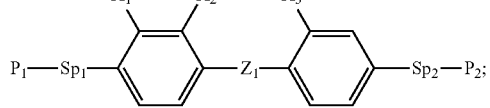
RM-10
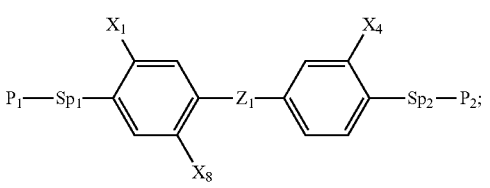
RM-11
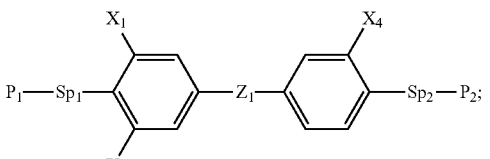
RM-12
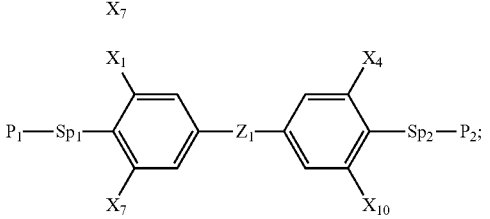
-continued
RM-13
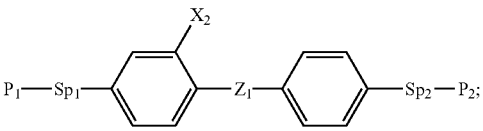
RM-14
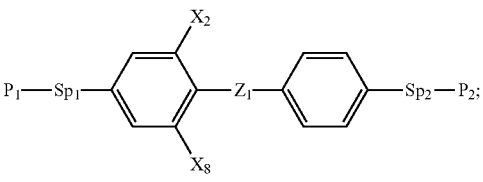
RM-15
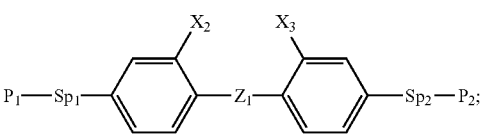
RM-16
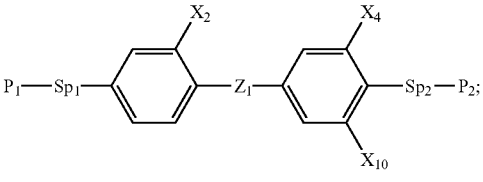
RM-17
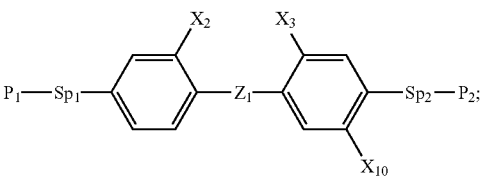
RM-18
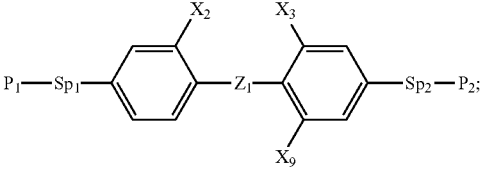
RM-19
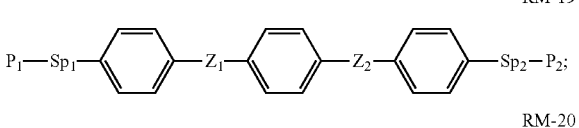
RM-20
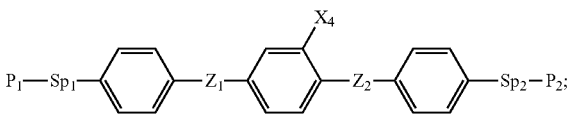
RM-21
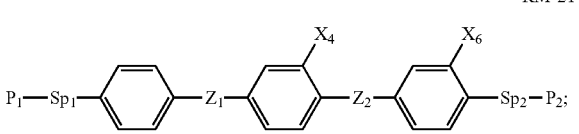
RM-22
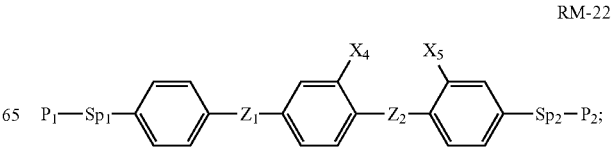

-continued

RM-23
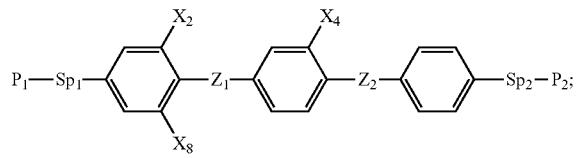

RM-24
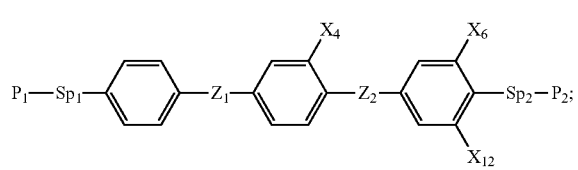

RM-25
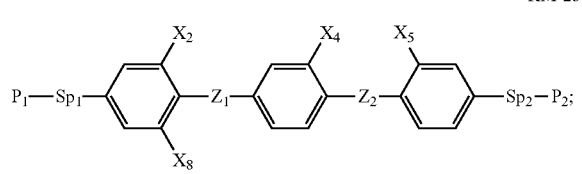

RM-26
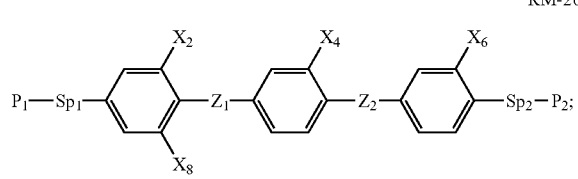

RM-27
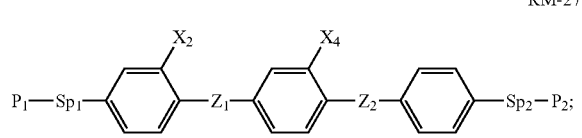

RM-28
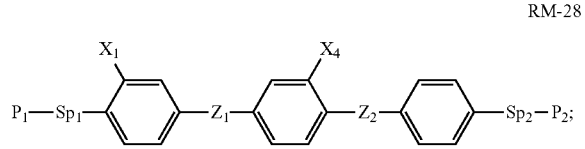

RM-29
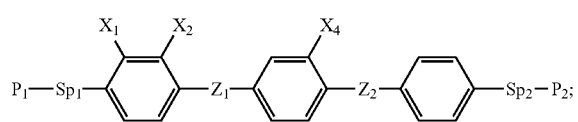

RM-30
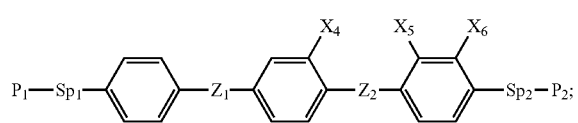

RM-31
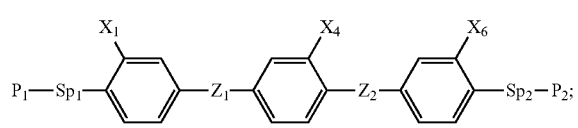

RM-32
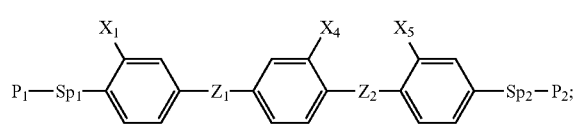

-continued

RM-33
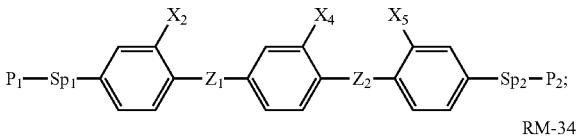

RM-34
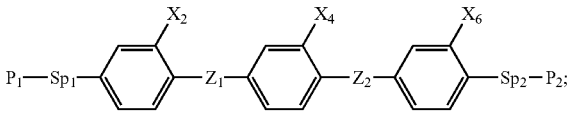

RM-35
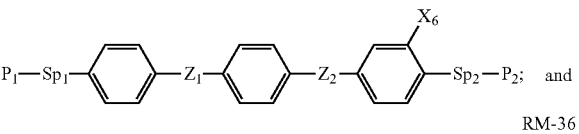

RM-36
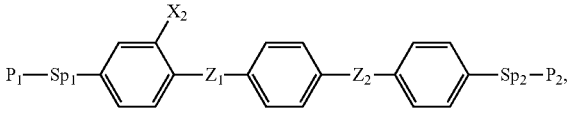

wherein, $X_1$-$X_{10}$ and $X_{12}$ each independently represents —F, —Cl, -Sp$_3$-P$_3$, C$_{1-5}$ linear alkyl or alkoxy,

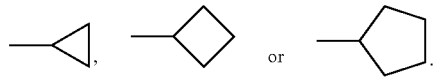

The polymerizable groups involved in the present invention are groups suitable for polymerization reactions (for example, radical or ionic bond polymerization, addition polymerization or condensation polymerization), or groups suitable for addition or condensation on the polymer backbone. For chain polymerization, a polymerizable group containing —CH=CH— or —C≡C— is particularly preferred, and for ring-opening polymerization, for example, an oxetane or epoxy group is particularly preferred.

In some embodiments of the present invention, the polymerizable groups P$_1$, P$_2$ and P$_3$ each independently represents

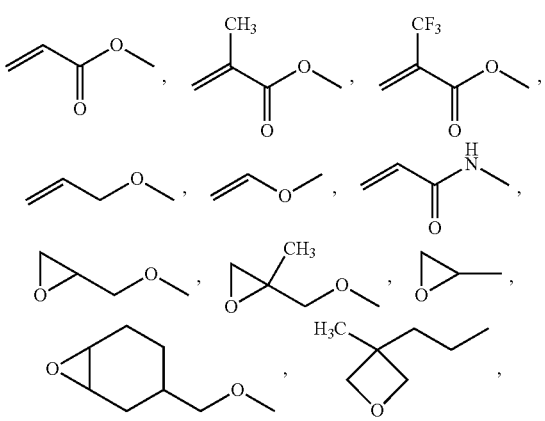

-continued

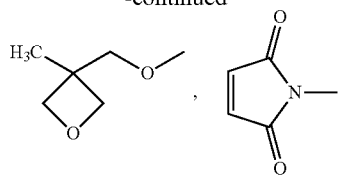

or —SH; preferably, the polymerizable groups $P_1$, $P_2$ and $P_3$ each independently represents

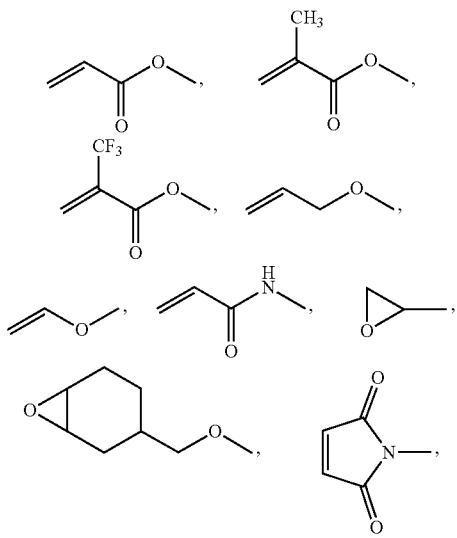

or —SH; further preferably, the polymerizable groups $P_1$, $P_2$ and $P_3$ each independently represents

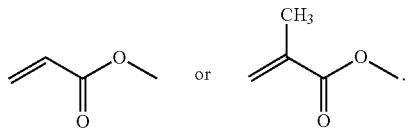

The term "spacer group" as used herein, is known to the person skilled in the art and is described in the references (for example, Pure Appl. Chem. 2001, 73(5), 888 and C. Tschierske, G. Pelzl, S. Diele, Angew. Chem. 2004, 116, 6340-6368). As used herein, the term "spacer group" represents a flexible group which connects the mesogenic group and the polymerizable group in a polymerizable compound. For example, —$(CH_2)p_1$-, —$(CH_2CH_2O)q_1$-$CH_2CH_2$—, —$(CH_2CH_2S)q_1$-$CH_2CH_2$—, —$(CH_2CH_2NH)q_1$-$CH_2CH_2$—, —$CR^OR^{OO}$—$(CH_2)p_1$- or —$(SiR^OR^{OO}$—$O)p_1$- are representative spacer groups, wherein $p_1$ represents an integer of 1-12, $q_1$ represents an integer of 1-3, $R^O$ and $R^{OO}$ each independently represents —H, $C_{1-12}$ linear or branched alkyl, or $C_{3-12}$ cyclic alkyl. The particularly preferred spacer group is —$(CH_2)p_1$-, —$(CH_2)p_1$-O—, —$(CH_2)p_1$-O—CO—, —$(CH_2)p_1$-CO—O—, —$(CH_2)p_1$-O—CO—O— or —$CR^OR^{OO}$—$(CH_2)p_1$-.

In some embodiments of the present invention, the polymerizable compound of general formula RM provides 0.001-5 wt. % (including all of the numerical values therebetween) of the total weight of the liquid crystal composition, for example, 0.001 wt. %, 0.002 wt. %, 0.004 wt. %, 0.005 wt. %, 0.006 wt. %, 0.008 wt. %, 0.01 wt. %, 0.02 wt. %, 0.04 wt. %, 0.06 wt. %, 0.08 wt. %, 0.1 wt. %, 0.2 wt. %, 0.25 wt. %, 0.26 wt. %, 0.27 wt. %, 0.28 wt. %, 0.29 wt. %, 0.3 wt. %, 0.32 wt. %, 0.33 wt. %, 0.34 wt. %, 0.35 wt. %, 0.4 wt. %, 0.5 wt. %, 0.6 wt. %, 0.8 wt. %, 1 wt. %, 1.2 wt. %, 1.6 wt. %, 1.8 wt. %, 2 wt. %, 2.5 wt. %, 3 wt. %, 3.5 wt. %, 4 wt. %, 4.5 wt. %, 5 wt. %, or a numerical range between any two of these.

In some embodiments of the present invention, the liquid crystal composition further comprises at least one additive.

In addition to the above compounds, the liquid crystal composition of the present invention may also contain common nematic liquid crystal, smectic liquid crystal, cholesteric liquid crystal, dopants, antioxidant, ultraviolet absorber, infrared absorber, polymerizable monomer or light stabilizer and so forth.

Dopants which can be preferably added to the liquid crystal composition according to the present invention are shown below:

C 15

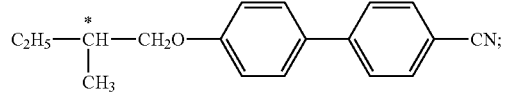

CB 15

CM 21

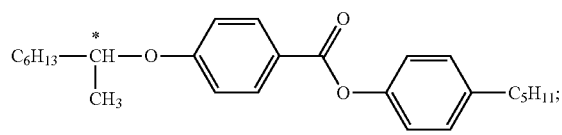

R/S-811

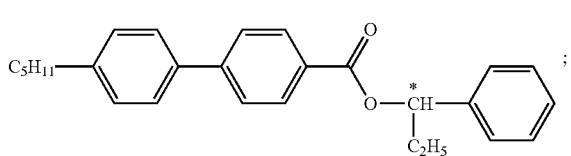

CM 44

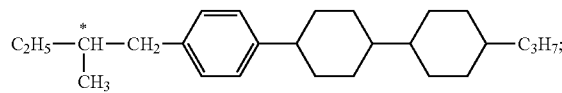

CM 45

-continued

CM 47

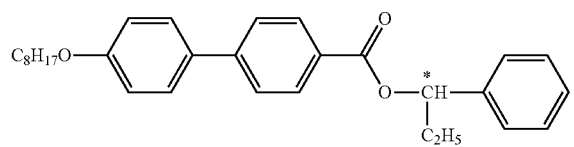

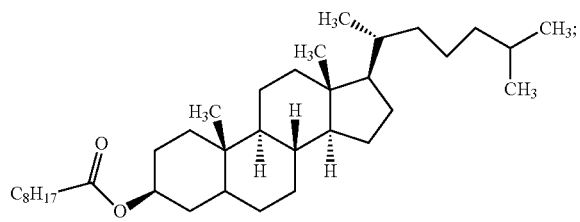
R/S-1011

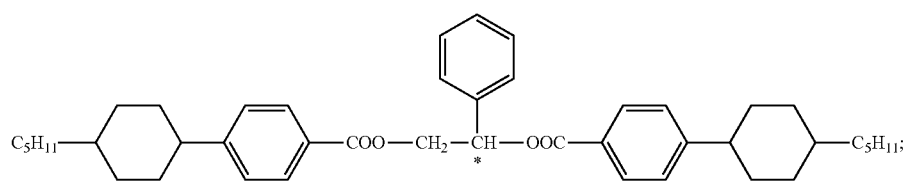
R/S-2011

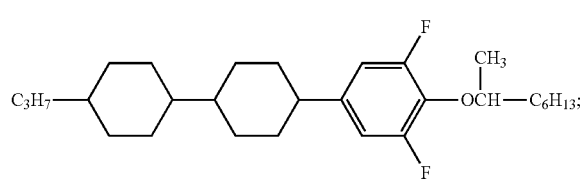
R/S-4011

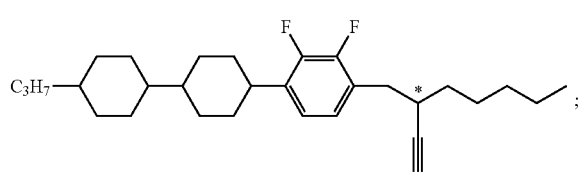
R/S-3011

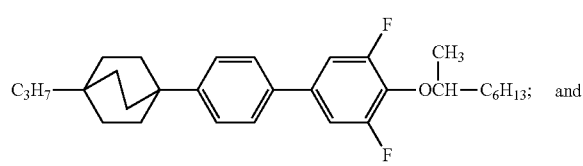
and

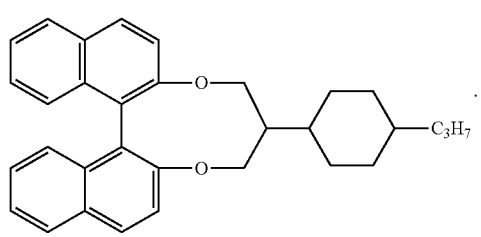

In some embodiments of the present invention, the dopant provides 0-5% by weight of the total weight of the liquid crystal composition; preferably, the dopant provides 0.01-1% by weight of the total weight of the liquid crystal composition.

Further, additives used in the liquid crystal composition of the present invention, such as antioxidant, light stabilizer, ultraviolet absorbers and the forth, are preferably selected from the following substances:

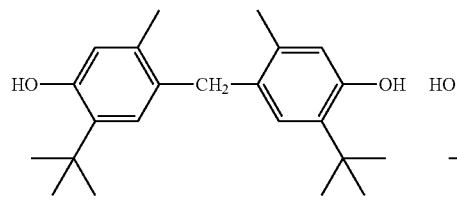 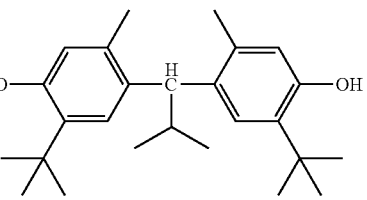

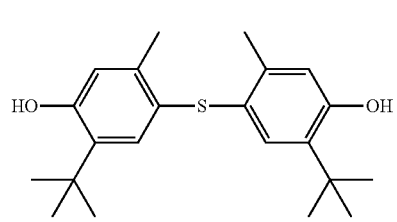 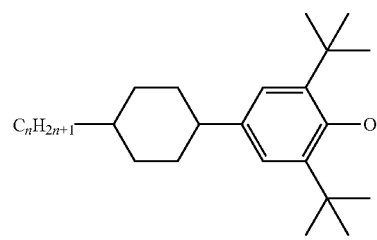 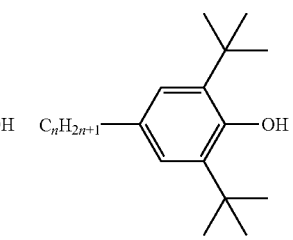

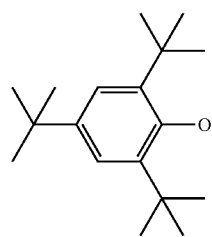
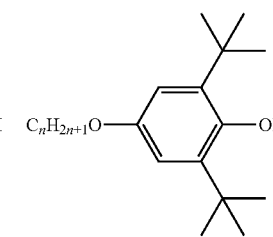
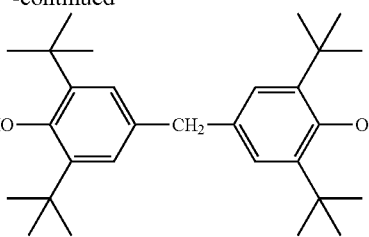
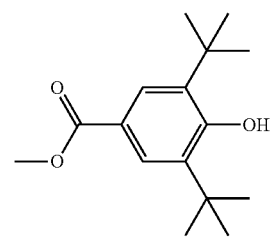
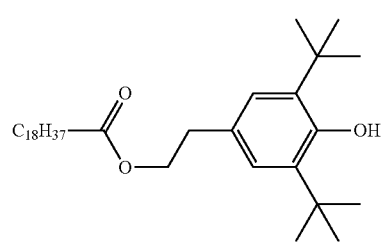
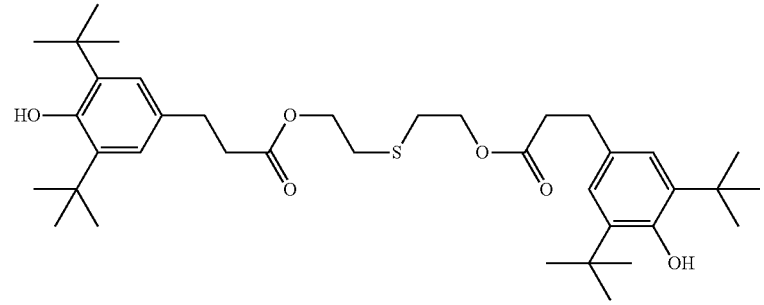
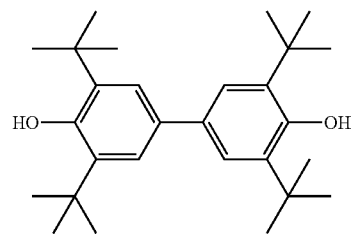
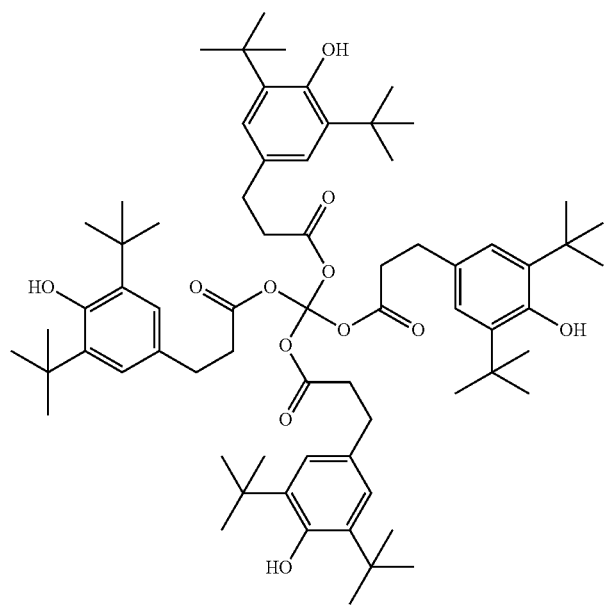
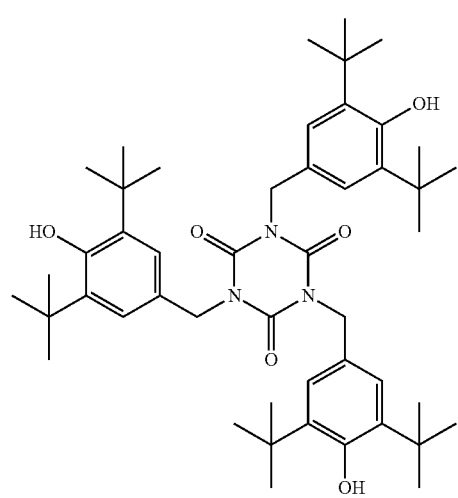

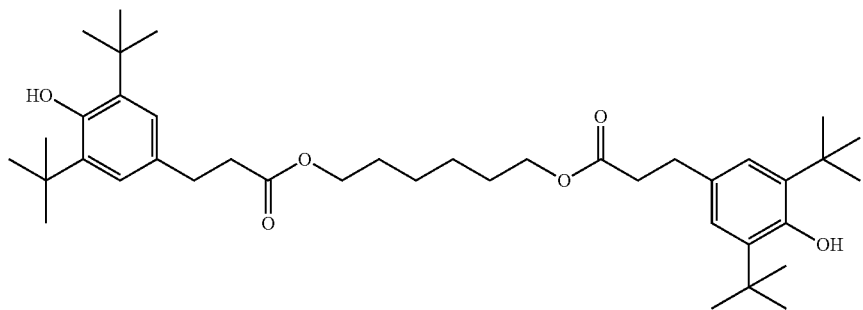
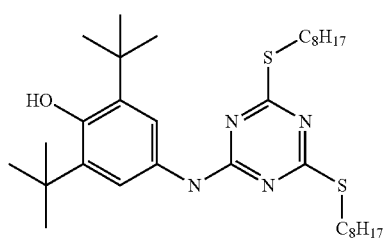
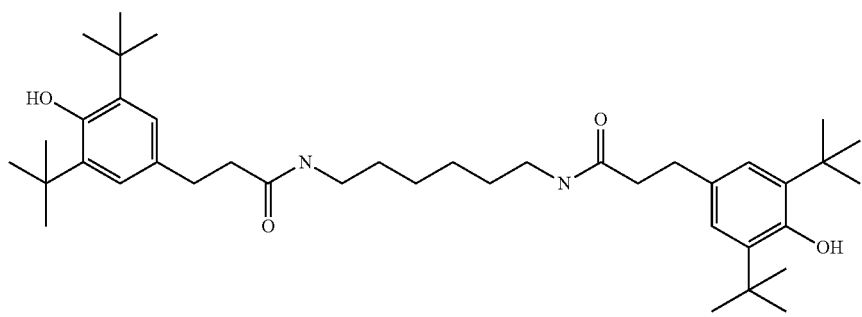
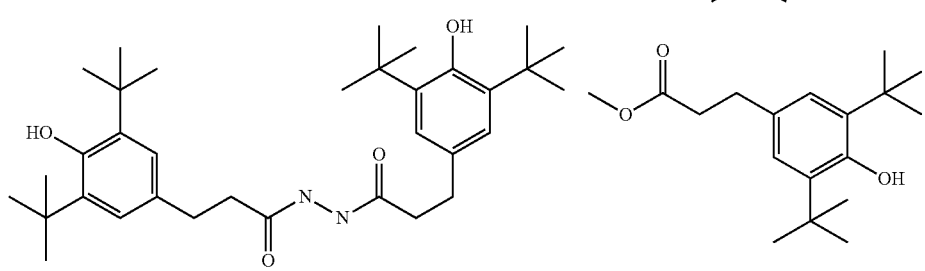
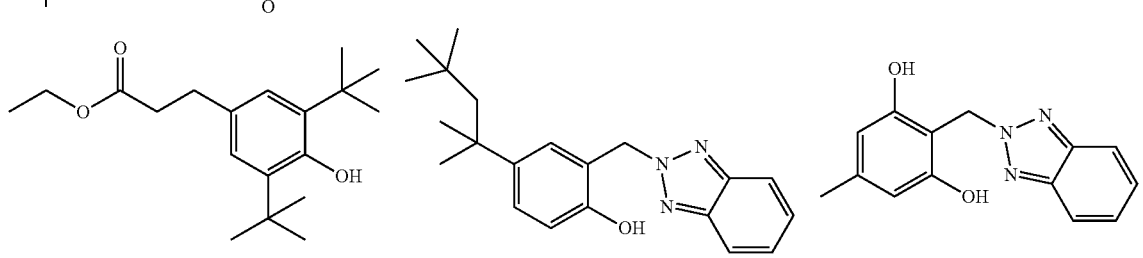
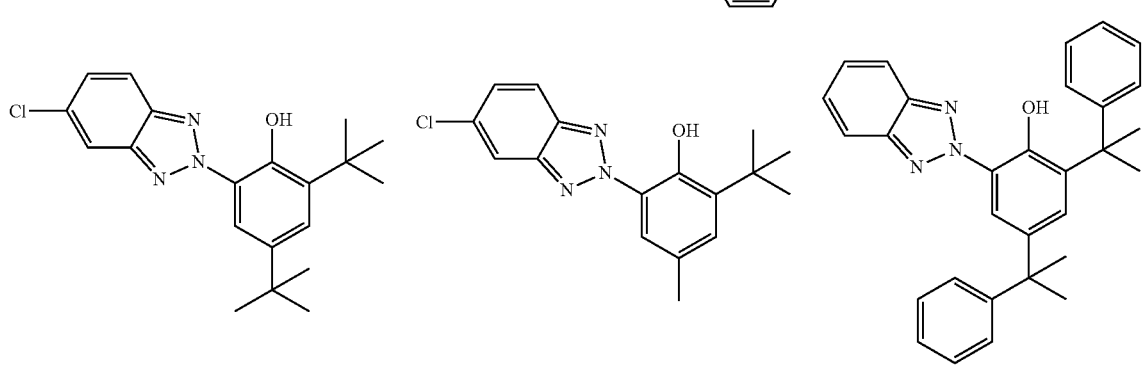

-continued
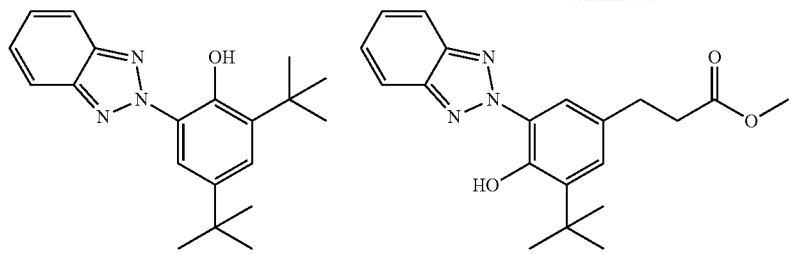
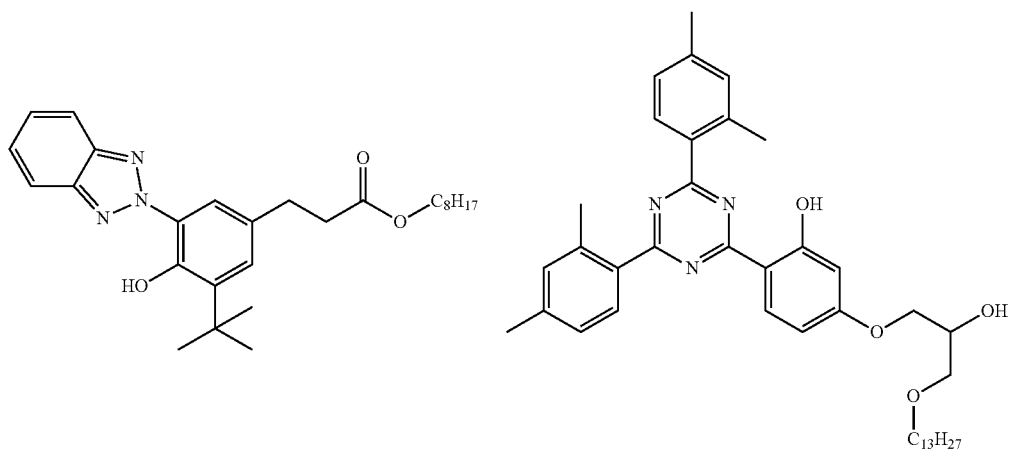
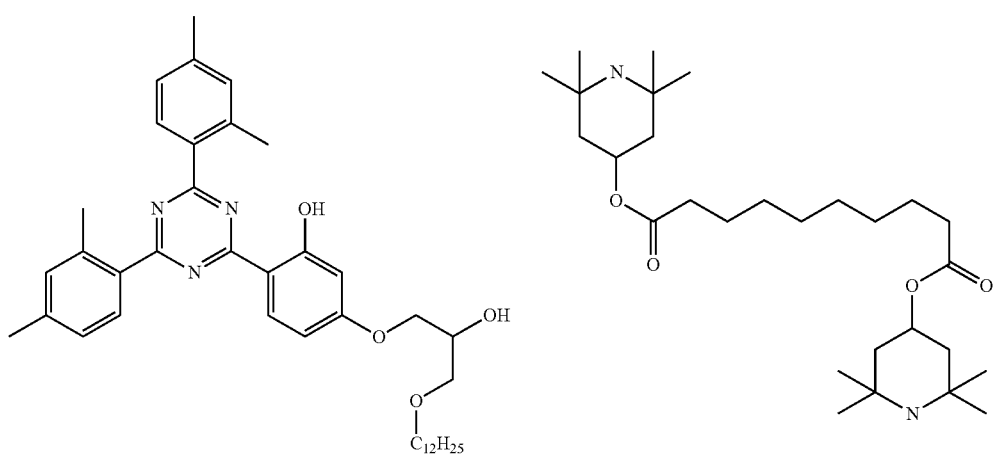
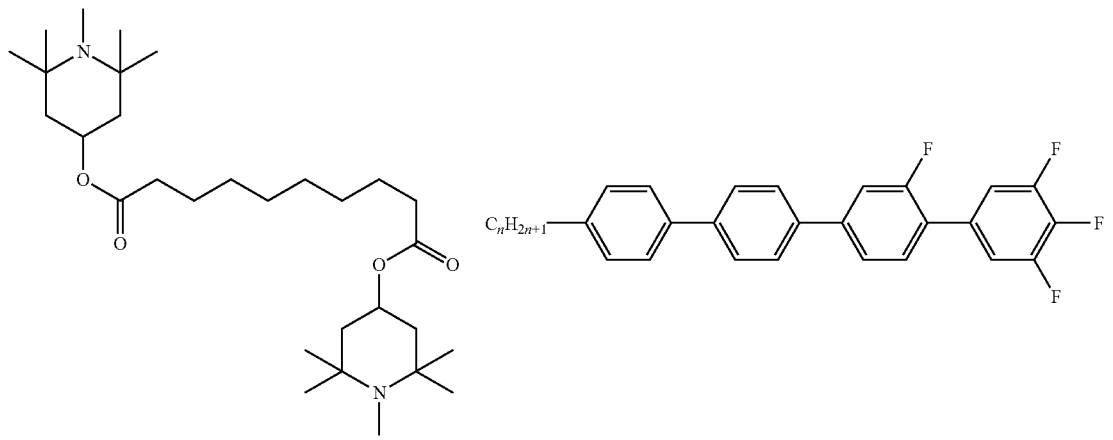

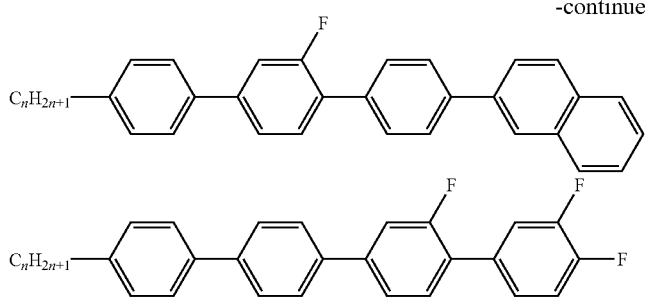

wherein, n represents a positive integer of 1-12.

Preferably, the antioxidant is selected from the compounds as shown below:

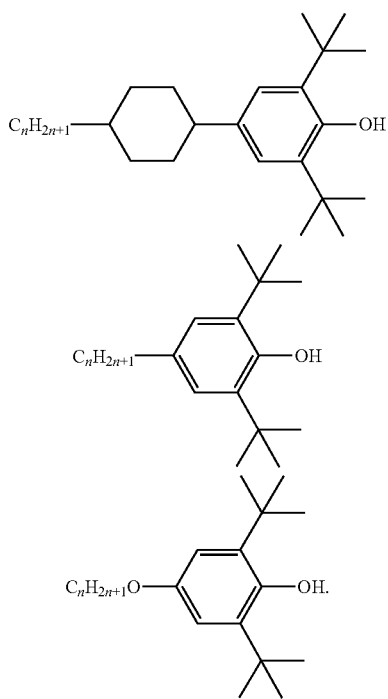

In some embodiments of the present invention, the additive provides 0%-5% by weight of the total weight of the liquid crystal composition; preferably, the additive provides 0.01%-1% by weight of the total weight of the liquid crystal composition.

The liquid crystal composition containing polymerizable compounds of the present invention can be polymerized even in the absence of a polymerization initiator, but a polymerization initiator can also be contained therein to promote polymerization. Regarding the polymerization initiator, a benzoin ether type, a benzophenone type, an acetophenone type, a benzyl ketal type, an acylphosphineoxide type and the like may be enumerated.

For the method of polymerizing the polymerizable compound, since the polymerization is expected to proceed rapidly, a method of polymerizing by irradiating an active energy line such as an ultraviolet ray or an electron beam is preferred. In using the ultraviolet ray, a polarized light source or a non-polarized light source may be used. In addition, when the polymerization of the liquid crystal composition which is in a state of being sandwiched between two substrates is conducted, at least the irradiated side of the substrate must have appropriate transparency with respect to the active energy lines. Additionally, a mask may also be employed during light irradiation, so that only a specific portion is polymerized. Subsequently, the orientation state of the unpolymerized portion is changed by changing conditions such as electric field, magnetic field, or temperature, and the unpolymerized portion is further irradiate with the active energy line for polymerization. In particular, when conducting UV exposure, it is preferred to conduct UV exposure at the same time of applying a voltage to the liquid crystal composition.

The temperature at which the active energy line such as the ultraviolet ray or the electron beam is irradiated is preferably in a temperature range that maintains the liquid crystal state of the liquid crystal composition of the present invention. It is preferred that the polymerization is carried out at a temperature close to room temperature (that is, 15-35° C.). For the lamp that generates the ultraviolet ray, a metal halide lamp, a high-pressure mercury lamp, an ultra-high-pressure mercury lamp, and the like may be used. Furthermore, regarding the wavelength of the irradiated ultraviolet rays, it is preferable to irradiate ultraviolet rays having a wavelength outside the absorption wavelength region of the liquid crystal composition, and preferably it is used with the ultraviolet rays blocked as needed. The intensity of the irradiated ultraviolet rays is preferably 0.1 mW/cm$^2$-50 mW/cm$^2$. When irradiating the ultraviolet rays, the intensity thereof can be varied, and the time for irradiating the ultraviolet rays is appropriately selected in accordance with the intensity of the irradiated ultraviolet rays, and 10 s-600 s is preferred.

In further aspect, the present invention further provides a liquid crystal display device comprising the above liquid crystal composition.

In some embodiments of the present invention, the above liquid crystal composition is particularly suitable for VA, IPS or FFS type display elements.

Beneficial effects: Compared with the prior art, the liquid crystal compound of the present invention has a larger clearing point, a larger optical anisotropy, and a comparable or larger absolute value of dielectric anisotropy while maintaining an appropriate rotational viscosity. The liquid crystal composition comprising the above liquid crystal compound of the present invention has a larger optical anisotropy, a smaller rotational viscosity, a higher VHR(UV), and a longer low temperature storage time while maintaining an appropriate clearing point, an appropriate absolute value of dielectric anisotropy and an appropriate VHR(initial), such that the liquid crystal display device comprising the same has a better contrast, a faster response speed, a higher reliability and a better low-temperature storage stability.

DRAWINGS

Figure 2:
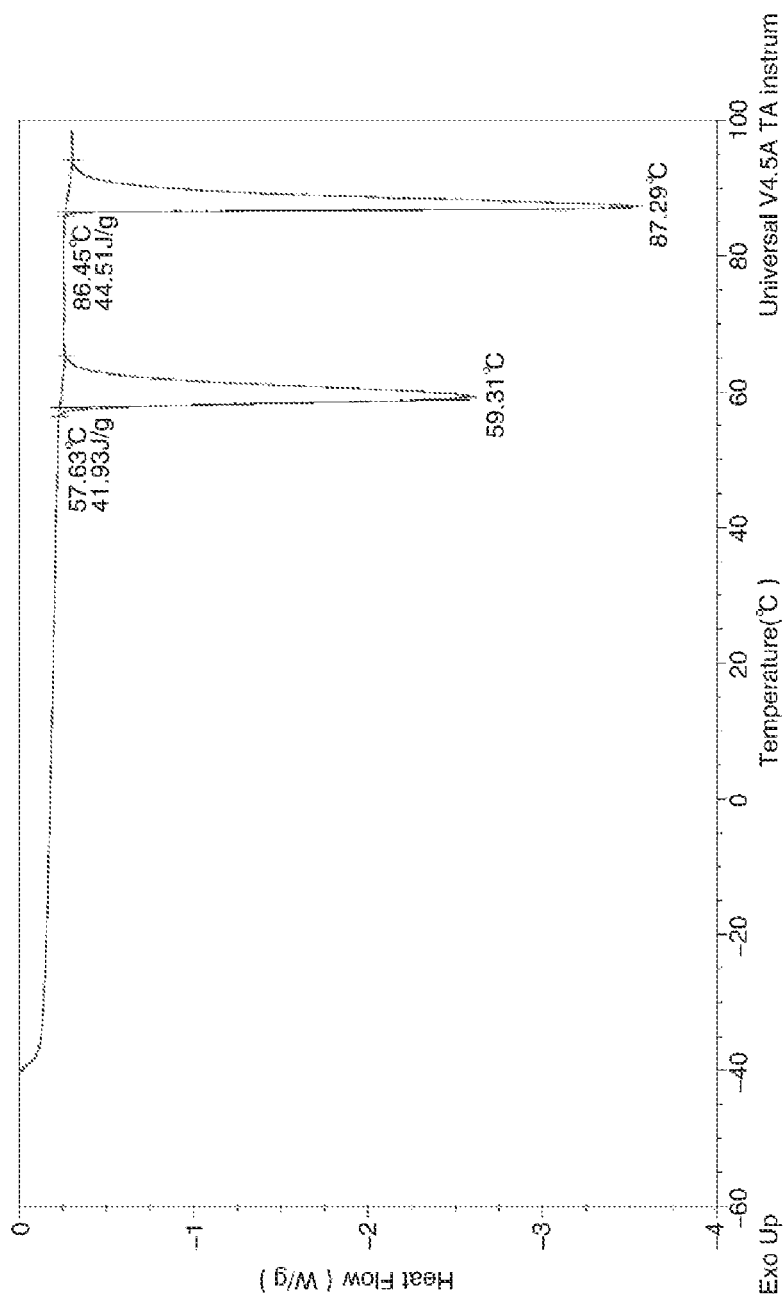
Figure 3:
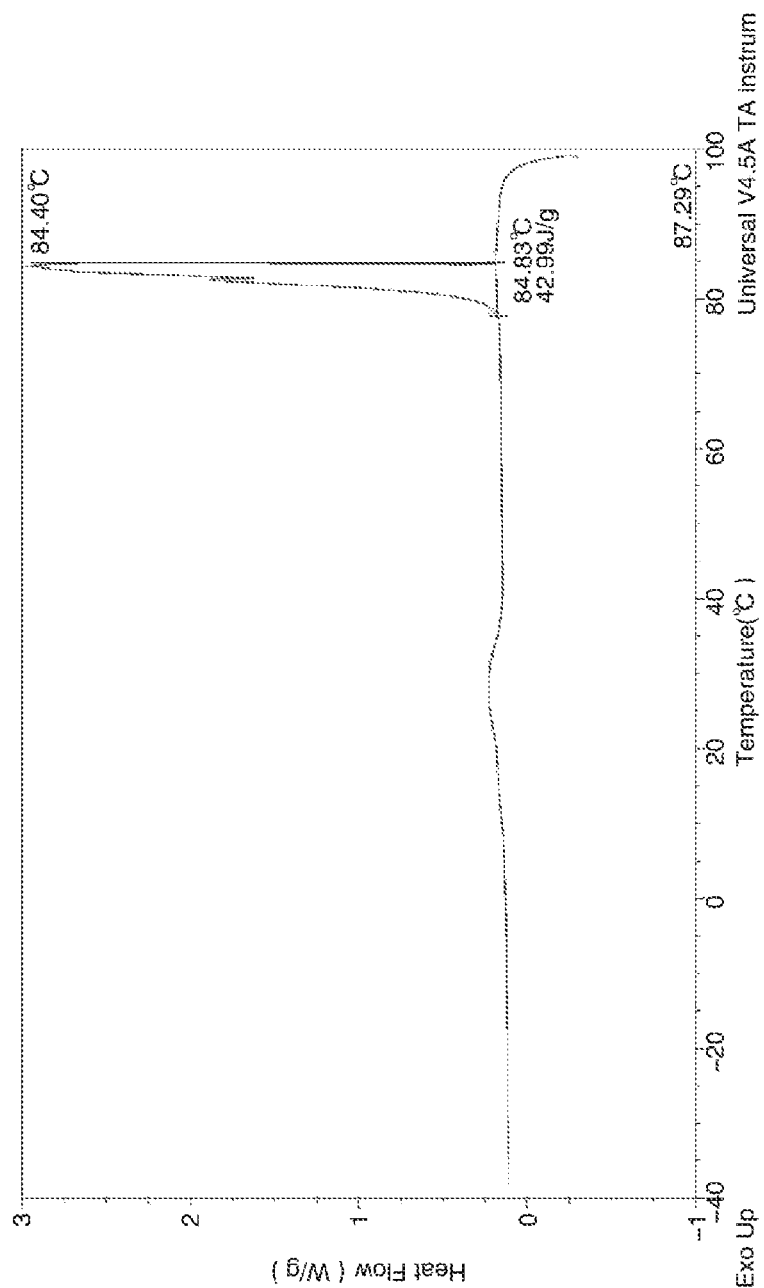
Figure 4:
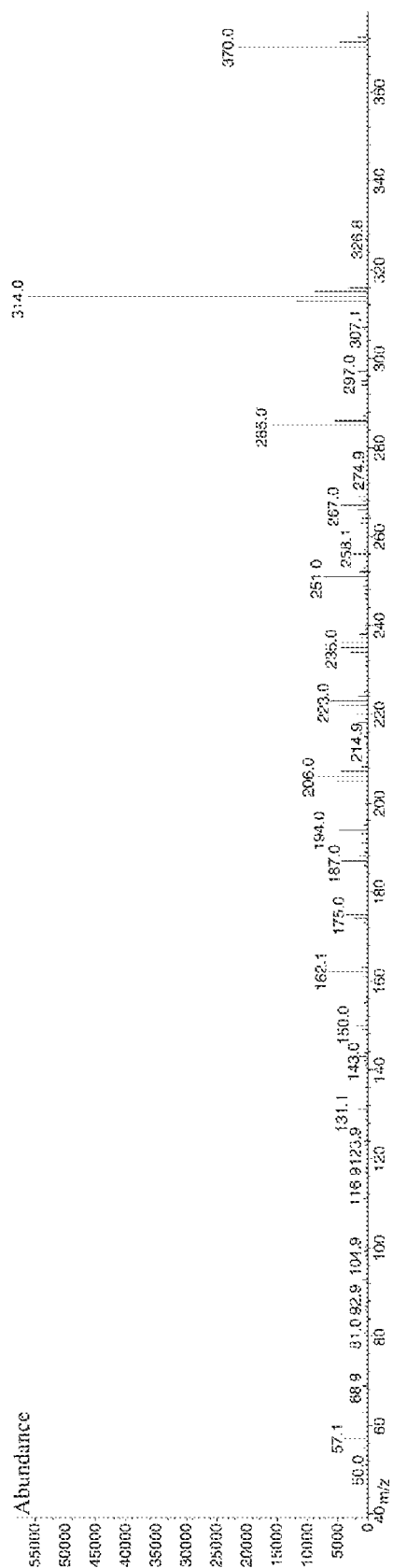
Figure 5:
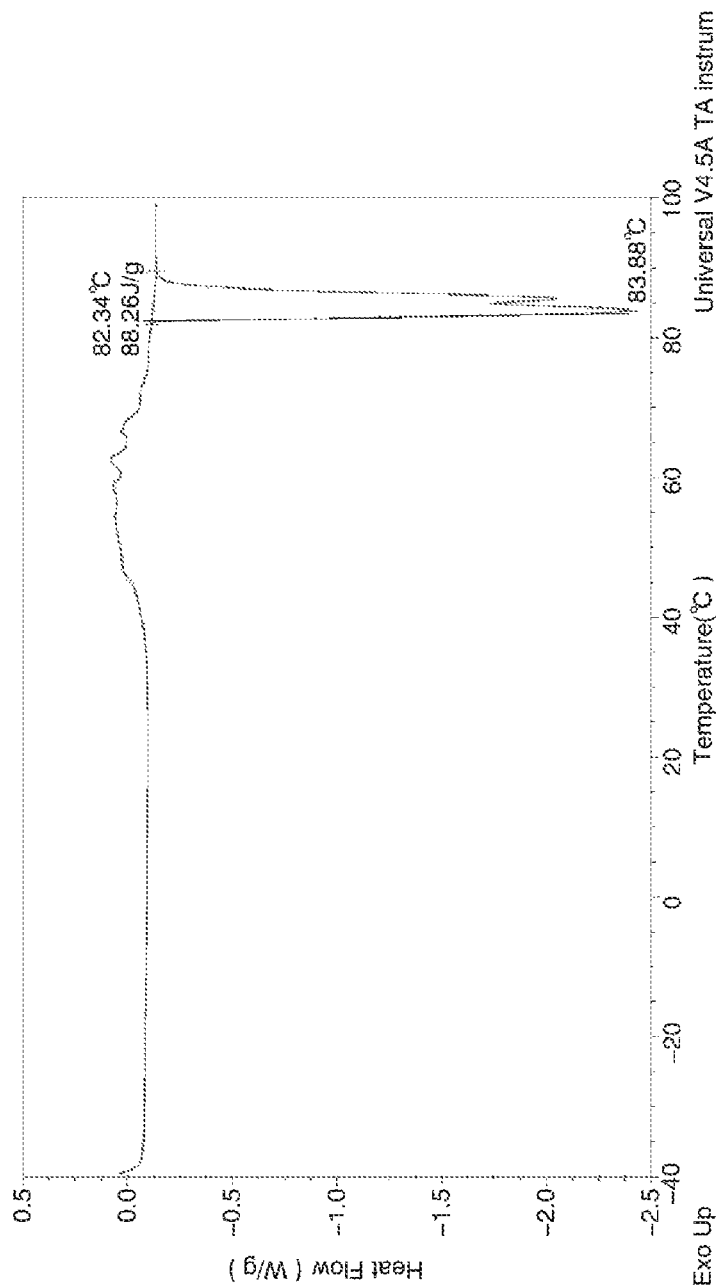
Figure 6:
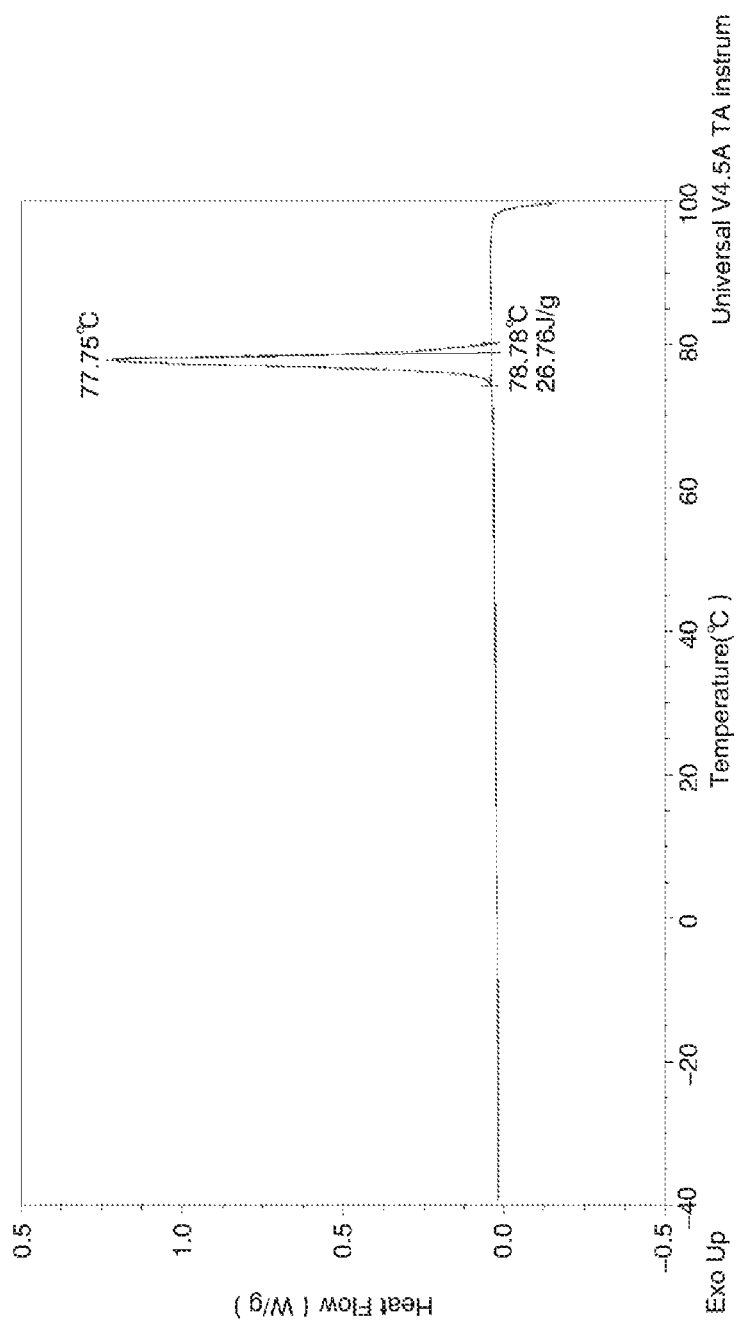

FIG. 1 is a mass spectrogram of compound F-2-4.
FIG. 2 is a DSC cooling thermogram of compound F-2-4.
FIG. 3 is a DSC heating thermogram of compound F-2-4.
FIG. 4 is a mass spectrogram of compound F-1-4.
FIG. 5 is a DSC cooling thermogram of compound F-1-4.
FIG. 6 is a DSC heating thermogram of compound F-1-4.

DETAILED EMBODIMENTS

The present invention will be illustrated by combining the detailed embodiments below. It should be noted that, the following Examples are instances of the present invention, which are only used to illustrate the present invention, not to limit it. Other combinations and various modifications within the conception of the present invention are possible without departing from the subject matter and scope of the present invention.

In the present invention, if not specified otherwise, content refers to weight percent.

For the convenience of the expression, the group structures of the compounds in the following Examples are represented by the codes listed in Table 2:

TABLE 2

| Codes of the group structures of the compounds | | |
|---|---|---|
| Unit structure of group | Code | Name of group |
| | C | 1,4-cyclohexylidene |
| | P | 1,4-phenylene |
| | L | 1,4-cyclohexene |
| | C(5) | cyclopentyl |
| | G | 2-fluoro-1,4-phenylene |
| | G' | 3-fluoro-1,4-phenylene |
| | W | 2,3-difluoro-1,4-phenylene |
| | B(O) | 4,6-difluoro-dibenzo[b,d]furan-3,7-diyl |
| | B(S) | 4,6-difluoro-dibenzo[b,d]thiophene-3,7-diyl |

TABLE 2-continued

| Codes of the group structures of the compounds | | |
|---|---|---|
| Unit structure of group | Code | Name of group |
| ![difluoroalkenyl structure] | V(2F) | difluoroalkenyl |
| —F | F | fluorine substituent |
| —O— | O | oxygen bridge bond |
| —CH=CH— or —CH=CH$_2$ | V | ethenylene or ethenyl |
| —CH$_2$O— | 1O | methyleneoxy |
| —CH$_2$CH$_2$— | 2 | ethyl bridge bond |
| —C$_n$H$_{2n+1}$ or C$_n$H$_{2n}$— | n (n represents an integer of 1-12) | alkyl or alkylene |

Take the compound with following structural formula as an example:

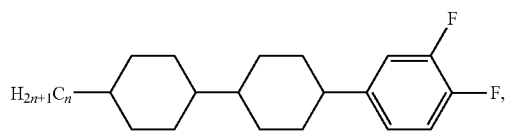

represented by the codes listed in Table 2, this structural formula can be expressed as nCCGF, in which, n in the code represents the number of the carbon atoms of the alkyl on the left, for example, n is "3", meaning that the alkyl is —C$_3$H$_7$; C in the code represents 1,4-cyclohexylidene, G represents 2-fluoro-1,4-phenylene, and F represents fluorine substituent.

The abbreviated codes of the test items in the following Examples are as follows:
Cp clearing point (nematic-isotropy phases transition temperature, ° C.)
Δn optical anisotropy (589 nm, 20° C.)
Δε dielectric anisotropy (1 KHz, 20° C.)
VHR(initial) initial voltage holding ratio (%)
VHR(UV) voltage holding ratio after ultraviolet light (UV) irradiation (%)
t$_{-30°\ C.}$ low-temperature storage time (day, at −30° C.)
γ$_1$ rotational viscosity (mPa·s, at 20° C.)
wherein,
Cp: tested by melting point apparatus.
Δn: tested using an Abbe Refractometer under a sodium lamp (589 nm) light source at 20° C.
Δε: Δε=ε$_∥$−ε$_⊥$, in which, ε$_∥$ is the dielectric constant parallel to the molecular axis, ε$_⊥$ is the dielectric constant perpendicular to the molecular axis, test conditions: 20° C., 1 KHz, VA-type test cell with a cell gap of 6 μm.
VHR (initial): initial voltage holding ratio, tested using a TOY06254 liquid crystal physical property evaluation system; the test temperature is 60° C., the test voltage is 5 V, the test frequency is 6 Hz, TN-type test cell with a cell gap of 9 μm.
VHR (UV): tested using a TOY06254 liquid crystal physical property evaluation system; tested after using UV light with a wavelength of 365 nm and energy of 6000 mJ/cm$^2$ to irradiate the liquid crystal, the test temperature is 60° C., the test voltage is 5 V, the test frequency is 6 Hz, TN-type test cell with a cell gap of 9 μm.

t$_{-30°\ C.}$: the time recorded when precipitation of crystals is observed after the nematic liquid crystal medium being placed in a glass bottle and stored at −30° C.

γ$_1$: tested using a LCM-2 type liquid crystal physical property evaluation system; test conditions: 20° C., 160-260 V, the cell gap is 20 μm.

The liquid crystal compound of the general formula F of the present invention can be prepared by conventional organic synthesis methods, wherein the methods of introducing target terminal groups, ring structures and linking groups into the starting material are documented in the following literatures: Organic Synthesis, John Wiley & Sons Inc., Organic Reactions, John Wiley & Sons Inc., Comprehensive Organic Synthesis, Pergamon Press and so forth.

The method of synthesizing the linking groups Z$_{F1}$ to Z$_{F3}$ in the liquid crystal compound of general formula F can refer to the following process, wherein MSG$^1$ or MSG$^2$ is a monovalent organic group having at least one ring, and a plurality of MSG$^1$ (or MSG$^2$) used in the following process can be the same or different.

(1) Synthesis of Single Bond

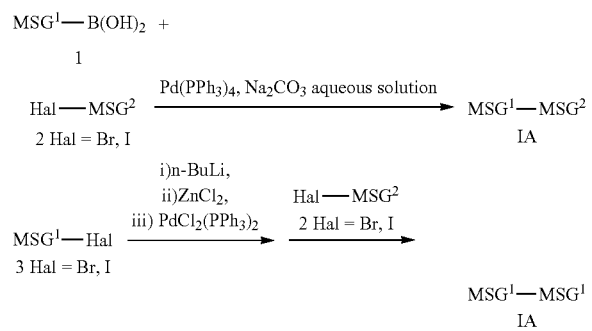

Aryl boronic acid 1 is reacted, in an aqueous solution of sodium carbonate in the presence of a catalyst, such as tetrakis(triphenylphosphine)palladium (Pd(PPh$_3$)$_4$), with Compound 2 synthesized by a well-known method, to obtain a single-bonded Compound IA. Single-bonded Compound IA can also be prepared by reacting Compound 3 synthesized by a well-known method with n-butyllithium (n-BuLi), and then with zinc chloride and after that with Compound 2 in the presence of a catalyst, such as dichlorobis(triphenylphosphine)palladium (PdCl$_2$(PPh$_3$)$_2$) to prepare the single bonded Compound IA.

(2) Synthesis of —CO—O— and —O—CO—

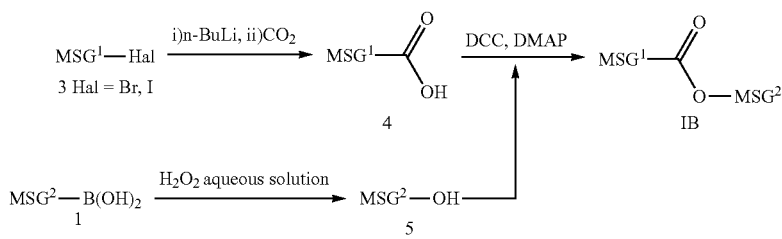

Compound 3 is reacted with n-butyllithium and then with carbon dioxide to obtain carboxylic acid 4. Compound IB with —CO—O— is synthesized by dehydrating Compound 4 in the presence of 1,3-dicyclohexylcarbodiimide (DCC) and 4-dimethylaminopyridine (DMAP) with Compound 5 synthesized by a well-known method. Compounds having —O—CO— can also be synthesized by this method.

(3) Synthesis of —CF$_2$O— and —OCF$_2$—

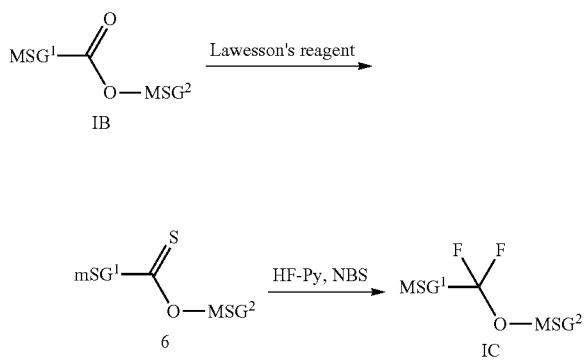

Referring to M. Kuroboshi et al., Chem. Lett., 1992,827, Compound 6 is obtained by treating Compound IB with a sulfiding agent, such as Lawesson's reagent, and then Compound IC with —CF$_2$O— is synthesized by fluorination of Compound 6 by hydrofluoro-pyridine (HF-Py) and N-bromosuccinimide (NBS). Compound IC with —CF$_2$O— can also be prepared by fluorination of Compound 6 with (diethylamino)sulfur trifluoride (DAST) with reference to W. H. Bunnelle et al., J. Org. Chem, 1990, 55, 768. Compounds having —OCF$_2$— can also be synthesized by these methods.

(4) Synthesis of —CH═CH—

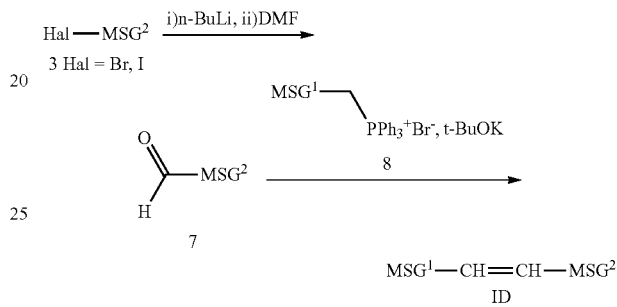

Compound 3 is reacted with n-butyllithium and then with formamide, such as N,N-dimethylformamide (DMF) to obtain Compound 7. Phosphonium generated via reacting potassium tert-butoxide (t-BuOK) with a phosphonium salt 8 synthesized by a well-known method is reacted with Compound 7 to obtain Compound ID. The above method generates a cis-isomer due to the reaction conditions. It would be understood that the cis-isomer can be converted to a trans-isomer by the well-known method as needed.

(5) Synthesis of —CH$_2$CH$_2$—

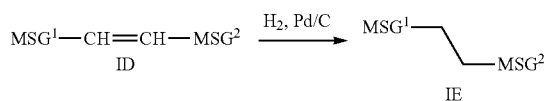

Compound IE can be prepared by conducting hydrogenation of Compound ID by using catalyst, such as, palladium on carbon (Pd/C).

(6) Synthesis of —CH$_2$O— or —OCH$_2$—

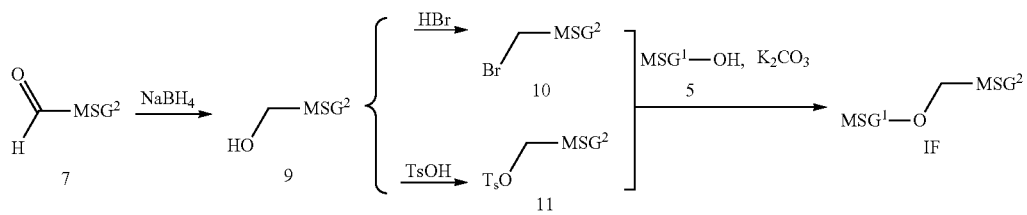

Compound 7 is reduced using sodium borohydride (NaBH$_4$) to obtain Compound 9. Compound 10 is then obtained by halogenating Compound 9 with hydrobromic acid, or, Compound 11 is obtained by protecting the hydroxyl group of Compound 9 with p-toluenesulfonic acid (TsOH). Compound 10 or Compound 11 is then reacted with Compound 5 in the presence of potassium carbonate to obtain Compound IF. Compounds with —OCH$_2$— can also be synthesized by these methods.

(7) Synthesis of —CH═CF$_2$

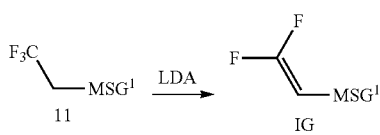

Compound IG can be prepared by removing the hydrofluoric acid from the end group chain of compound 11 using a tetrahydrofuran solution of lithium diisopropylamide (LDA).

With respect to ring structures such as 1,4-cyclohexylidene, 1,3-dioxan-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene and the like, commercially available starting materials already exist, or synthetic methods thereof are known in the art.

Followings clarify preferred synthetic methods of representative compounds.

Synthetic Example 1

Synthetic route of compound F-2-4 is shown as below:

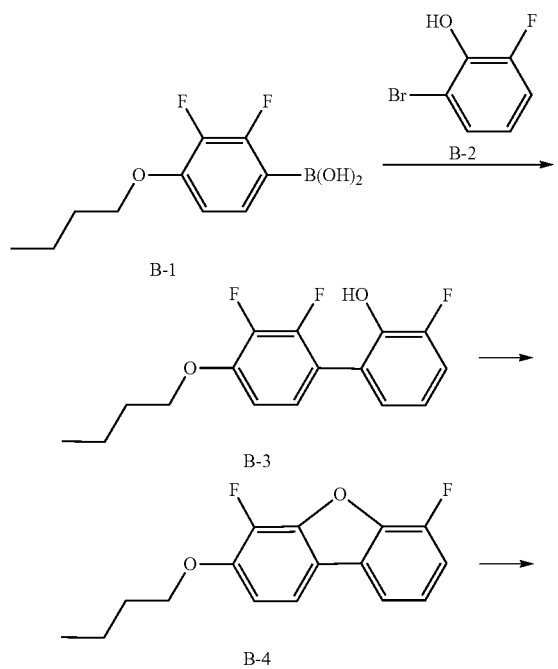

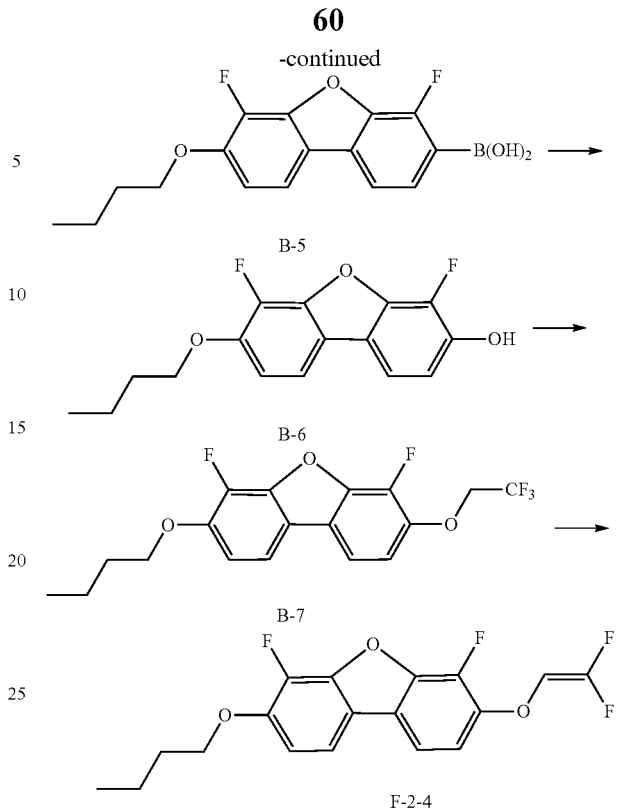

Step 1. Preparation of Compound of Formula B-3

99 g of compound of formula B-1 ((4-butoxy-2,3-difluorophenyl)boronic acid), 100 g of compound of formula B-2 (2-bromo-6-fluorophenol), and 110 g of sodium carbonate are added into a 2 L reaction flask, and fully dissolved with 1.2 L of a mixed solvent consisting of toluene, ethanol, and water (the volume ratio of toluene, ethanol, and water is 2:1:1). Under the condition of being protected with nitrogen atmosphere, 1.8 g Pd(PPh$_3$)$_4$ is added therein and a reflux reaction is conducted at 100° C. for 6 h. The reaction solution is cooled to room temperature, 300 mL water is added for liquid separation, and the aqueous phase is extracted with 20 mL of toluene, and the organic phases are combined, washed with saturated NaCl aqueous solution to pH=7, dried over anhydrous Na$_2$SO$_4$, concentrated, and recrystallized with a mixed solvent consisting of petroleum ether and toluene (the volume ratio of petroleum ether and toluene is 24:1) to obtain 109.5 g of compound of formula B-3 (4'-butoxy-2',3',3-trifluoro-[1,1'-biphenyl]-2-ol) as a white solid (yield: 85%).

Step 2. Preparation of Compound of Formula B-4

110 g of compound of formula B-3 and 72 g of potassium carbonate are added into a 2 L reaction flask and fully dissolved with 700 mL of N,N-dimethylformamide, and reacted at 120° C. for 9 h. The reaction mixture is cooled to room temperature, added with 3.5 L of water, stirred, and filtered to obtain the crude product. After ethanol pulping, filtering, and drying over anhydrous Na$_2$SO$_4$, 88.5 g of compound of formula B-4 (3-butoxy-4,6-difluorodibenzo[b,d]furan) as a gray solid is obtained (yield: 86.3%).

Step 3. Preparation of Compound of Formula B-5

38 g of diisopropylamine is added into a 2 L reaction flask, fully dissolved with 500 mL of tetrahydrofuran, 150 mL of n-butyllithium is added under the condition of being protected with nitrogen atmosphere at a controlled temperature of −20° C., and reaction is carried out at a controlled temperature of −20° C. for 3 h. 90 g of compound of formula B-4 is added therein and reacted at a controlled temperature of −78° C. for 3 h. 70 g of triisopropyl borate is added, and reacted at a controlled temperature of 78° C. for 3 h. The pH is adjusted with dilute hydrochloric acid to 2~3, and the liquid is separated. The aqueous phase is extracted with ethyl acetate, the organic phases are combined, washed with saturated NaCl aqueous solution to pH=7, dried over anhydrous Na$_2$SO$_4$, concentrated, slurried with dichloromethane, and suction filtered. The filter cake is dried to obtain 73 g of compound of formula B-5 ((4,6-difluoro-7-butoxydibenzo[b,d]furan-3-yl)boronic acid) as a white solid (yield: 70%).

Step 4. Preparation of Compound of Formula B-6

70 g of compound of formula B-5 is added into a 2 L reaction flask, fully dissolved with 700 mL of tetrahydrofuran, 68 g of 30% hydrogen peroxide is added at a controlled temperature of 10° C., and the reaction is carried out at 10° C. for 9 h. The reaction is quenched with 500 mL of 5% sodium thiosulfate solution, the liquid is separated, the aqueous phase is extracted with ethyl acetate, and the organic phases are combined, washed with saturated NaCl aqueous solution to pH=7, dried over anhydrous Na$_2$SO$_4$, concentrated, slurried with 25 mL of dichloromethane, and suction filtered. The filter cake is dried to obtain 55.6 g of compound of formula B-6 (4,6-difluoro-7-butoxydibenzo[b,d]furan-3-ol) as a white solid (yield: 90%).

Step 5. Preparation of Compound of Formula B-7

70 g of compound of formula B-6 is added into a 2 L reaction flask, fully dissolved with 700 mL of tetrahydrofuran, and 68 g of trifluoroethanol is added at a controlled temperature of 10° C., and the reaction is carried out at a controlled temperature of 10° C. for 9 h. The aqueous phase is extracted with ethyl acetate, and the organic phases are combined, washed with saturated NaCl aqueous solution to pH=7, dried over anhydrous Na$_2$SO$_4$, concentrated, slurried with 25 mL of dichloromethane, and suction filtered. The filter cake is dried to obtain 53.8 g of compound of formula B-7 (4,6-difluoro-3-butoxy-7-(2,2,2-trifluoroethoxy)dibenzo[b,d]furan) as a white solid (yield: 60%).

Step 6. Preparation of Compound of Formula F-2-4

40 g of compound of formula B-7 is added in a 2 L reaction flask, fully dissolved with 700 mL of tetrahydrofuran, and 40 g of 30% sodium hydroxide solution is added at a controlled temperature of 10° C. The reaction is carried out for 8 h. The reaction is quenched with 500 mL of 5% sodium thiosulfate, and the liquid is separated. The aqueous phase is extracted with ethyl acetate, and the organic phases are combined, washed with saturated NaCl aqueous solution to pH=7, dried over anhydrous Na$_2$SO$_4$, concentrated, slurried with 25 mL of dichloromethane, and filtered. Dried over, concentrated, slurried with 25 mL of dichloromethane, and suction filtered. The filter cake is dried to obtain 28.4 g of compound of formula F-2-4 (3-((2,2-difluorovinyl)oxy)-4,6-difluoro-7-butoxydibenzo[b,d]furan) as a white solid (yield: 75%).

The mass spectrogram of compound F-2-4 is shown in FIG. 1.

The DSC cooling thermogram of compound F-2-4 is shown in FIG. 2.

The DSC heating thermogram of compound F-2-4 is shown in FIG. 3.

Synthetic Example 2

Synthetic route of compound F-1-4 is shown as below:

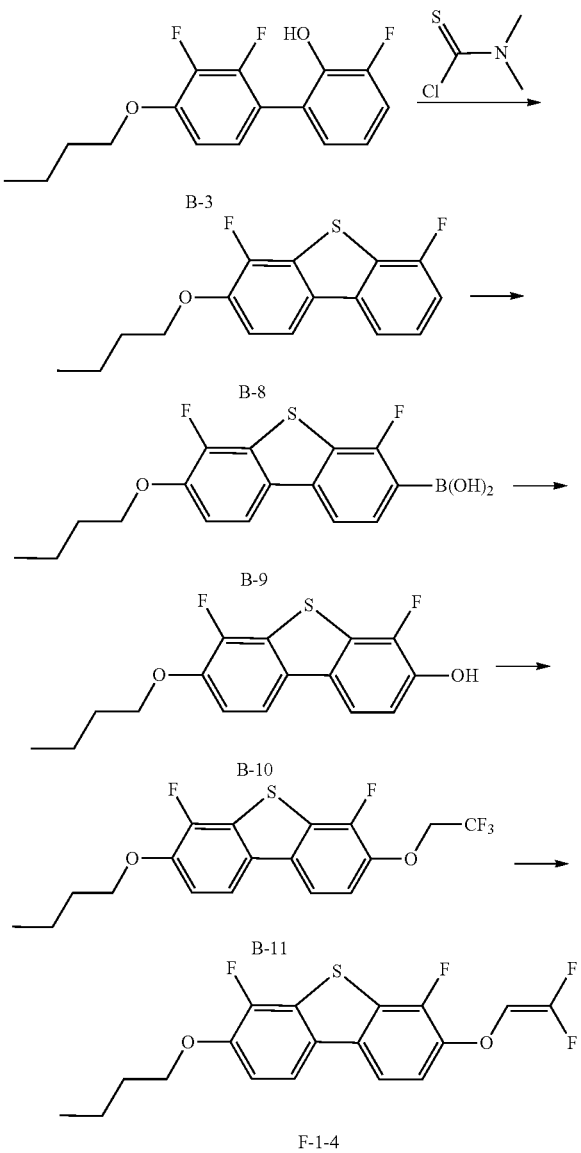

The synthetic method of the compound of formula B-3 is the same as that in Synthetic Example 1.

Step 1. Preparation of Compound of Formula B-8

120 g of compound of formula B-3, 120 g of dimethylamino thioformyl chloride and 90 g of triethylamine are added in a 1 L reaction flask, fully dissolved with 440 mL of isododecane, and the reflux reaction is carried out under the condition of being protected with nitrogen atmosphere at a controlled temperature of 165° C. for 18 h. The reaction is cooled to 25° C., suction filtered, recrystallized with ethanol, and suction filtered. The filter cake is dried to obtain 78.9 g of compound of formula B-8 (3-butoxy-4,6-difluorodibenzo[b,d]thiophene) as a brown solid (yield: 66.667%).

Step 2. Preparation of Compound of Formula B-9

38 g of diisopropylamine is added into a 2 L reaction flask, fully dissolve with 500 mL of tetrahydrofuran, 150 mL n-butyllithium is added under the condition of being protected with nitrogen atmosphere at a controlled temperature of −20° C., and the reaction is carried out at a controlled temperature of −20° C. for 3 h. 80 g of compound of formula B-8 is added, and the reaction is carried out at a controlled temperature of −78° C. for 3 h. 70 g of triisopropyl borate is added, and the reaction is carried out at a controlled temperature of 78° C. for 3 h. The pH is adjusted with dilute hydrochloric acid to 2~3, the liquid is separated. The aqueous phase is extracted with ethyl acetate, the organic phases are combined, washed with saturated NaCl aqueous solution to pH=7, dried over anhydrous Na₂SO₄, concentrated, slurried with dichloromethane, and suction filtered. The filter cake is dried to obtain 69 g of compound of formula B-9 (((4,6-difluoro-7-butoxydibenzo[b,d]thiophen-3-yl)boronic acid) as a white solid (yield: 75%).

Step 3. Preparation of Compound of Formula B-10

70 g of compound of formula B-9 is added in a 2 L reaction flask, fully dissolved with 700 mL of tetrahydrofuran, 80 g of 30% hydrogen peroxide is added at a controlled temperature of 10° C., the reaction is carried out at a controlled temperature of 10° C. for 9 h. The reaction is quenched with 500 mL of 5% sodium thiosulfate solution. The liquid is separated, and the aqueous phase is extracted with ethyl acetate. The organic phases are combined, washed with saturated NaCl aqueous solution to pH=7, dried over anhydrous Na₂SO₄, concentrated, slurried with 25 mL of dichloromethane, and suction filtered. The filter cake is dried to obtain 41.3 g of compound of formula B-10 (4,6-difluoro-7-butoxydibenzo[b,d]thiophene-3-ol) as a white solid (yield: 64.3%).

Step 4. Preparation of Compound of Formula B-11

70 g of compound of formula B-10 is added into a 2 L reaction flask, fully dissolved with 700 mL of tetrahydrofuran, and 68 g of trifluoroethanol is added at a controlled temperature of 10° C. The reaction is carried out at a controlled temperature of 10° C. for 9 h. The aqueous phase is extracted with ethyl acetate. The organic phases are combined, washed with saturated NaCl aqueous solution to pH=7, dried over anhydrous Na₂SO₄, concentrated, slurried with 25 mL dichloromethane, and suction filtered. The filter cake is dried to 56.7 g of compound of formula B-11 (4,6-difluoro-3-butoxy-7-(2,2,2-trifluoroethoxy)dibenzo[b,d]furan) as a white solid (yield: 64%).

Step 5. Preparation of Compound of Formula F-1-4

40 g of compound of formula B-11 is added into a 2 L reaction flask, fully dissolved with 700 mL of tetrahydrofuran, 40 g of 30% sodium hydroxide solution is added at controlled temperature of 10° C., the reaction is carried out at controlled temperature of 10° C. for 8 h. The reaction is quenched with 500 mL of 5% sodium thiosulfate, the liquid is separated, and the aqueous phase is extracted with ethyl acetate. The organic phases are combined, washed with saturated NaCl aqueous solution to pH=7, dried over anhydrous Na₂SO₄, concentrated, slurried with 25 mL of dichloromethane, and suction filtered. The filter cake is dried to give 30.4 g of compound of formula F-1-4 (3-((2,2-difluorovinyl)oxy)-4,6-difluoro-7-butoxydibenzo[b,d]furan) as a white solid (yield: 80%).

The mass spectrogram of compound F-1-4 is shown in FIG. 4.

The DSC cooling thermogram of compound F-1-4 is shown in FIG. 5.

The DSC heating thermogram of compound F-1-4 is shown in FIG. 6.

The compound of general formula F prepared in the above Examples and compounds DB-1

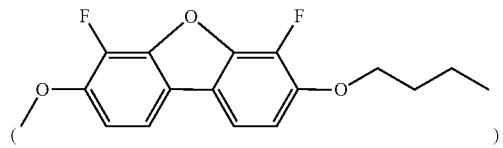

and DB-2

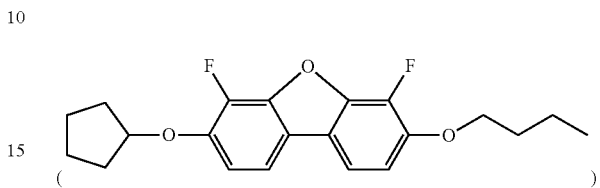

known in the prior art are mixed with a parent liquid crystal in the ratio of 10%:90% by weight, respectively, to form mixtures. The values of the performance parameters of the compounds to be tested are calculated using the extrapolation method, wherein the extrapolated values of Cp, Δn and Δε=((measured value of the mixture)−0.9×(measured value of the parent liquid crystal))/0.1 and the extrapolated value of $\gamma_1=10^{10(lgA-0.9lgB)}$ wherein A is $\gamma_1$ of the mixture and B is $\gamma_1$ of the parent liquid crystal. The derivations of the values of the performance parameters such as clear point Cp, optical anisotropy Δn, dielectric anisotropy Δε, and rotational viscosity $\gamma_1$ are carried out according to this method.

TABLE 3

Composition of the parent liquid crystal

| Code of component | Weight percent | Code of general formula | Test results for the performance parameters | |
|---|---|---|---|---|
| 3CCV | 21 | M-1 | Cp | 0.0896 |
| 3CWO2 | 20 | N-2 | Δn | 91.20 |
| 5CWO2 | 5 | N-2 | Δε | −3.4 |
| 3CPWO2 | 6 | N-21 | $\gamma_1$ | 120 |
| 3CPWO3 | 6 | N-21 | | |
| 3CCWO2 | 6 | N-9 | | |
| 5CCWO2 | 7 | N-9 | | |
| 4CCWO2 | 11 | N-9 | | |
| 3CCWO3 | 6 | N-9 | | |
| 5CC3 | 4 | M-1 | | |
| VCCP1 | 8 | M-11 | | |
| Total | 100 | | | |

The extrapolation results of liquid crystal performance parameters of the above compounds are shown in Table 4 below:

TABLE 2

| Compound | Code of general formula | Cp | Δn | $\gamma_1$ | Δε |
|---|---|---|---|---|---|
| 1OB(O)O4 | DB-1 | 26 | 0.1557 | 194 | −11 |
| C(5)OB(O)O4 | DB-2 | 50 | 0.1594 | 250 | −12 |
| 4OB(O)OV2F | F-2-4 | 84 | 0.1603 | 190 | −10.5 |
| 2OB(S)OV2F | F-1-2 | 76 | 0.1613 | 200 | −15.8 |
| 3L1OB(O)OV2F | F-9-3 | 120 | 0.1654 | 301 | −12 |
| 4OB(S)OV2F | F-1-4 | 82 | 0.1619 | 201 | −16.4 |

As can be seen from the comparison of the test results of the performance parameters of compounds DB-1, DB-2 and the compound of formula F of the present invention in Table 4, the compound of general formula F of the present invention has a larger clearing point, a larger optical anisotropy and a comparable or larger absolute value of the dielectric anisotropy while maintaining an appropriate rotational viscosity.

The components used in the following Examples can either be synthesized by methods known in the art or be obtained commercially. The synthetic techniques are conventional, and each of the obtained liquid crystal compounds is tested to meet the standards of electronic compound.

In the present invention, if not specified otherwise, content refers to weight percent.

The liquid crystal compositions are prepared in accordance with the ratios of each of the liquid crystal compositions specified in the following Examples. The preparation of the liquid crystal compositions is proceeded according to the conventional methods in the art, such as mixed and prepared according to the ratios via heating, ultrasonic processing, suspending processing and so forth.

Application Comparative Example 1

The liquid crystal composition of Application Comparative Example 1 is prepared according to each compound and weight percentage listed in Table 5 and the performance test is carried out by filling the same between two substrates of a liquid crystal display device.

TABLE 5

Formulation and test results for the performance parameters of the liquid crystal composition

| Code of component | Weight percent | Code of general formula | Test results for the performance parameters | |
|---|---|---|---|---|
| 3CCV | 37 | M-1 | Cp | 79 |
| 3CWO2 | 10 | N-2 | Δn | 0.1062 |
| 3CCWO1 | 6 | N-9 | Δε | −3.9 |
| 3CCWO2 | 10 | N-9 | γ₁ | 101 |
| 4CCWO2 | 7 | N-9 | VHR(initial) | 92 |
| 2CPWO2 | 3 | N-21 | VHR(UV) | 79 |
| 3CPWO2 | 10 | N-21 | t₋₃₀° C. | <7 |
| 2PWP3 | 4 | N-24 | | |
| 3PWO2 | 9 | N-19 | | |
| 2OB(S)O5 | 4 | | | |
| Total | 100 | | | |

Application Example 1

The liquid crystal composition of Application Example 1 is prepared according to each compound and weight percentage listed in Table 6 and the performance test is carried out by filling the same between two substrates of a liquid crystal display device.

TABLE 6

Formulation and test results for the performance parameters of the liquid crystal composition

| Code of component | Weight percent | Code of general formula | Test results for the performance parameters | |
|---|---|---|---|---|
| 3CCV | 37 | M-1 | Cp | 80.5 |
| 3CWO2 | 10 | N-2 | Δn | 0.109 |
| 3CCWO1 | 6 | N-9 | Δε | −4 |

TABLE 6-continued

Formulation and test results for the performance parameters of the liquid crystal composition

| Code of component | Weight percent | Code of general formula | Test results for the performance parameters | |
|---|---|---|---|---|
| 3CCWO2 | 10 | N-9 | γ₁ | 95 |
| 4CCWO2 | 7 | N-9 | VHR(initial) | 92.3 |
| 2CPWO2 | 3 | N-21 | VHR(UV) | 88 |
| 3CPWO2 | 10 | N-21 | t₋₃₀° C. | >7 |
| 2PWP3 | 4 | N-24 | | |
| 3PWO2 | 9 | N-19 | | |
| 4OB(S)OV(2F) | 4 | F-1-4 | | |
| Total | 100 | | | |

As can be seen from the comparison of the Application Comparative Example 1 and the Application Example 1, the liquid crystal composition of the present invention has a smaller rotational viscosity, a higher VHR(UV) and a longer low temperature storage time while maintaining an appropriate clearing point, an appropriate optical anisotropy, an appropriate absolute value of the dielectric anisotropy and an appropriate VHR(initial).

Application Comparative Example 2

The liquid crystal composition of Application Comparative Example 2 is prepared according to each compound and weight percentage listed in Table 7 and the performance test is carried out by filling the same between two substrates of a liquid crystal display device.

TABLE 7

Formulation and test results for the performance parameters of the liquid crystal composition

| Code of component | Weight percent | Code of general formula | Test results for the performance parameters | |
|---|---|---|---|---|
| 3CCV1 | 8 | M-1 | Cp | 75 |
| 2CC3 | 13.5 | M-1 | Δn | 0.1085 |
| 3CC4 | 6 | M-1 | Δε | −3.4 |
| 3CCP1 | 12 | M-11 | γ₁ | 102 |
| 3CCP3 | 7 | M-11 | VHR(initial) | 93 |
| 3CCWO2 | 8.5 | N-9 | VHR(UV) | 75 |
| 3CWO2 | 20.5 | N-2 | t₋₃₀° C. | <7 |
| 3PWO2 | 3.5 | N-19 | | |
| 2PWP3 | 8 | N-24 | | |
| 2OB(S)O5 | 4 | | | |
| 2OB(S)O4 | 3 | | | |
| 2OB(S)O6 | 3 | | | |
| 1PP2V1 | 3 | M-4 | | |
| Total | 100 | | | |

Application Example 2

The liquid crystal composition of Application Example 2 is prepared according to each compound and weight percentage listed in Table 8 and the performance test is carried out by filling the same between two substrates of a liquid crystal display device.

TABLE 8

Formulation and test results for the performance parameters of the liquid crystal composition

| Code of component | Weight percent | Code of general formula | Test results for the performance parameters | |
|---|---|---|---|---|
| 3CCV1 | 8 | M-1 | Cp | 78 |
| 2CC3 | 13.5 | M-1 | Δn | 0.114 |
| 3CC4 | 6 | M-1 | Δε | −3.6 |
| 3CCP1 | 12 | M-11 | $\gamma_1$ | 97 |
| 3CCP3 | 7 | M-11 | VHR(initial) | 92.8 |
| 3CCWO2 | 8.5 | N-9 | VHR(UV) | 85 |
| 3CWO2 | 20.5 | N-2 | $t_{-30°\ C.}$ | >7 |
| 3PWO2 | 3.5 | N-19 | | |
| 2PWP3 | 8 | N-24 | | |
| 2OB(S)OV(2F) | 4 | F-1-2 | | |
| 3OB(S)OV(2F) | 3 | F-1-3 | | |
| 4OB(S)OV(2F) | 3 | F-1-4 | | |
| 1PP2V1 | 3 | M-4 | | |
| Total | 100 | | | |

As can be seen from the comparison of the Application Comparative Example 2 and the Application Example 2, the liquid crystal composition of the present invention has a larger optical anisotropy, a smaller rotational viscosity, a higher VHR(UV) and a longer low temperature storage time while maintaining an appropriate clearing point, an appropriate absolute value of dielectric anisotropy and an appropriate VHR(initial).

Application Comparative Example 3

The liquid crystal composition of Application Comparative Example 3 is prepared according to each compound and weight percentage listed in Table 9 and the performance test is carried out by filling the same between two substrates of a liquid crystal display device.

TABLE 9

Formulation and test results for the performance parameters of the liquid crystal composition

| Code of component | Weight percent | Code of general formula | Test results for the performance parameters | |
|---|---|---|---|---|
| 3CCV | 38.5 | M-1 | Cp | 79.5 |
| 3CCWO1 | 4 | N-9 | Δn | 0.1034 |
| 3CCWO2 | 10 | N-9 | Δε | −4.4 |
| 3CLWO2 | 7 | N-12 | $\gamma_1$ | 102 |
| 3CLWO3 | 3 | N-12 | VHR(initial) | 90.3 |
| 2CPWO2 | 4 | N-21 | VHR(UV) | 79 |
| 3CPWO2 | 10 | N-21 | $t_{-30°\ C.}$ | <7 |
| 3CWO2 | 9.5 | N-2 | | |
| 3PWO2 | 6 | N-19 | | |
| 2OB(S)O5 | 4 | | | |
| 2OB(O)O5 | 4 | | | |
| Total | 100 | | | |

Application Example 3

The liquid crystal composition of Application Example 3 is prepared according to each compound and weight percentage listed in Table 10 and the performance test is carried out by filling the same between two substrates of a liquid crystal display device.

TABLE 10

Formulation and test results for the performance parameters of the liquid crystal composition

| Code of component | Weight percent | Code of general formula | Test results for the performance parameters | |
|---|---|---|---|---|
| 3CCV | 38.5 | M-1 | Cp | 82.3 |
| 3CCWO1 | 4 | N-9 | Δn | 0.106 |
| 3CCWO2 | 10 | N-9 | Δε | −4.5 |
| 3CLWO2 | 7 | N-12 | $\gamma_1$ | 93 |
| 3CLWO3 | 3 | N-12 | VHR(initial) | 91.3 |
| 2CPWO2 | 4 | N-21 | VHR(UV) | 84 |
| 3CPWO2 | 10 | N-21 | $t_{-30°\ C.}$ | >9 |
| 3CWO2 | 9.5 | N-2 | | |
| 3PWO2 | 6 | N-19 | | |
| 4OB(S)OV(2F) | 4 | F-1-4 | | |
| 2OB(O)OV(2F) | 4 | F-2-2 | | |
| Total | 100 | | | |

As can be seen from the comparison of the Application Comparative Example 3 and the Application Example 3, the liquid crystal composition of the present invention has a smaller rotational viscosity, a higher VHR(UV) and a longer low temperature storage time while maintaining an appropriate clearing point, an appropriate optical anisotropy, an appropriate absolute value of the dielectric anisotropy and an appropriate VHR(initial).

Application Example 4

The liquid crystal composition is prepared according to each compound and weight percentage listed in Table 11, 0.3 wt. %

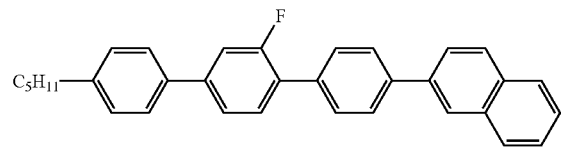

is added into the liquid crystal composition shown in Table 11 as Application Example 4 and the performance test is carried out by filling the same between two substrates of a liquid crystal display device.

TABLE 11

Formulation and test results for the performance parameters of the liquid crystal composition

| Code of component | Weight percent | Code of general formula | Test results for the performance parameters | |
|---|---|---|---|---|
| 2CLWO2 | 9 | N-12 | Cp | 80 |
| 3CLWO3 | 4 | N-12 | Δn | 0.11 |
| 5CLWO2 | 9 | N-12 | Δε | −3.8 |
| 3CCV | 37 | M-1 | $\gamma_1$ | 90 |
| 3CLWO2 | 26 | N-12 | VHR(initial) | 92.9 |
| 3PG'WO4 | 2 | N-30 | VHR(UV) | 88 |
| 3PG'WO2 | 2 | N-30 | $t_{-30°\ C.}$ | >7 |
| 5PG'WO2 | 2 | N-30 | | |
| 4PG'WO2 | 1 | N-30 | | |
| 1VCPWO2 | 3 | N-21 | | |
| 4OB(S)OV(2F) | 3 | F-1-4 | | |
| 2OB(S)OV(2F) | 2 | F-1-2 | | |
| Total | 100 | | | |

Application Example 5

Adding 0.3% polymerizable compound RM-1-1 into the liquid crystal composition of Example 1 can realize polymerization with a faster speed for forming an angle and a smaller pre-tilt angle is formed.

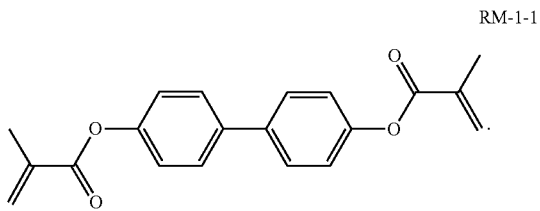 [SMILES: C=C(C)C(=O)Oc1ccc(-c2ccc(OC(=O)C(=C)C)cc2)cc1]

RM-1-1

Application Example 6

Adding 0.3% polymerizable compound RM-2-1 the liquid crystal composition of Example 2 can realize polymerization with a faster speed for forming an angle and a smaller pre-tilt angle is formed.

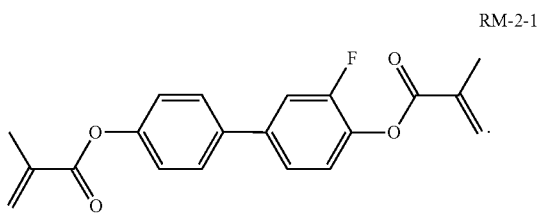 [SMILES: C=C(C)C(=O)Oc1ccc(-c2ccc(OC(=O)C(=C)C)c(F)c2)cc1]

RM-2-1

Application Example 7

The liquid crystal composition of Application Example 7 is prepared according to each compound and weight percentage listed in Table 12 and the performance test is carried out by filling the same between two substrates of a liquid crystal display device.

TABLE 12

Formulation and test results for the performance parameters of the liquid crystal composition

| Code of component | Weight percent | Code of general formula | Test results for the performance parameters | |
|---|---|---|---|---|
| 3CCV | 35.5 | M-1 | Cp | 75 |
| 3CCV1 | 10 | M-1 | $\Delta n$ | 0.11 |
| 3CCP1 | 2 | M-11 | $\Delta \varepsilon$ | -3.1 |
| 3CCWO1 | 2 | N-9 | $\gamma_1$ | 80 |
| 3CLWO2 | 9.5 | N-12 | VHR(initial) | 96.1 |
| 2CPWO2 | 10 | N-21 | VHR(UV) | 92 |
| 3CPWO2 | 10.5 | N-21 | $t_{-30°\,C.}$ | >7 |
| 3PWO2 | 16.5 | N-19 | | |
| 3PG'WO2 | 1 | N-30 | | |
| 2OB(O)OV(2F) | 3 | F-2-2 | | |
| Total | 100 | | | |

Application Example 8

The liquid crystal composition of Application Example 8 is prepared according to each compound and weight percentage listed in Table 13 and the performance test is carried out by filling the same between two substrates of a liquid crystal display device.

TABLE 13

Formulation and test results for the performance parameters of the liquid crystal composition

| Code of component | Weight percent | Code of general formula | Test results for the performance parameters | |
|---|---|---|---|---|
| 3CPP2 | 1 | M-13 | Cp | 75.7 |
| 2CPWO2 | 11.5 | N-21 | $\Delta n$ | 0.114 |
| 3CLWO2 | 4 | N-12 | $\Delta \varepsilon$ | -3 |
| 3CCP3 | 6.5 | M-11 | $\gamma_1$ | 65 |
| 3CCP1 | 12.5 | M-11 | VHR(initial) | 95.9 |
| 3PWO2 | 6 | N-19 | VHR(UV) | 91 |
| 3CCV | 25.5 | M-1 | $t_{-30°\,C.}$ | >7 |
| 3CCV1 | 9 | M-1 | | |
| 1OG'WO2 | 5 | N-27 | | |
| 2OPWO2 | 11 | N-19 | | |
| 2OB(O)OV(2F) | 3 | F-2-2 | | |
| 2OB(S)OV(2F) | 5 | F-1-2 | | |
| Total | 100 | | | |

Application Example 9

The liquid crystal composition is prepared according to each compound and weight percentage listed in Table 14, 0.3 wt. %

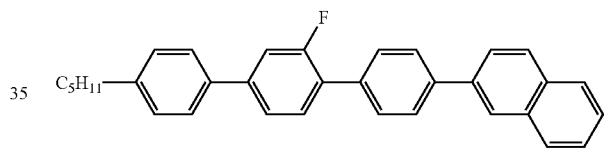

is added into the liquid crystal composition shown in Table 14 as Application Example 9 and the performance test is carried out by filling the same between two substrates of a liquid crystal display device.

TABLE 14

Formulation and test results for the performance parameters of the liquid crystal composition

| Code of component | Weight percent | Code of general formula | Test results for the performance parameters | |
|---|---|---|---|---|
| 3CLWO2 | 9.2 | N-12 | Cp | 75 |
| 3CLWO3 | 6.7 | N-12 | $\Delta n$ | 0.109 |
| 5CLWO2 | 9.2 | N-12 | $\Delta \varepsilon$ | -4 |
| 3PWO2 | 12.5 | N-19 | $\gamma_1$ | 85 |
| 3OG'WO2 | 5 | N-27 | VHR(initial) | 93.9 |
| 3CCV | 35.4 | M-1 | VHR(UV) | 90 |
| 3LWO2 | 9 | N-3 | $t_{-30°\,C.}$ | >7 |
| 1VCPWO2 | 5 | N-21 | | |
| 4OB(S)OV(2F) | 4 | F-1-4 | | |
| 2OB(S)OV(2F) | 4 | F-1-2 | | |
| Total | 100 | | | |

Application Example 10

The liquid crystal composition is prepared according to each compound and weight percentage listed in Table 15, 0.3 wt. %

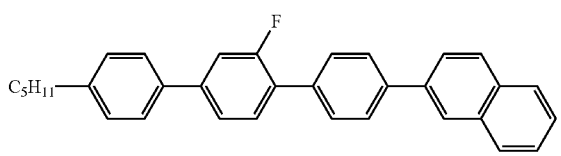

is added into the liquid crystal composition shown in Table 15 as Application Example 10 and the performance test is carried out by filling the same between two substrates of a liquid crystal display device.

TABLE 15

Formulation and test results for the performance parameters of the liquid crystal composition

| Code of component | Weight percent | Code of general formula | Test results for the performance parameters | |
|---|---|---|---|---|
| 3CLWO2 | 9.2 | N-12 | Cp | 76 |
| 3CLWO3 | 6 | N-12 | $\Delta n$ | 0.106 |
| 5CLWO2 | 9.2 | N-12 | $\Delta \varepsilon$ | −4 |
| 3PWO2 | 5 | N-19 | $\gamma_1$ | 90 |
| 3OG'WO2 | 4 | N-27 | VHR(initial) | 93.9 |
| 3CCV | 30.4 | M-1 | VHR(UV) | 88 |
| 3LWO2 | 9 | N-3 | $t_{-30°\ C.}$ | >7 |
| 3CWO2 | 14.2 | N-2 | | |
| 1VCPWO2 | 5 | N-21 | | |
| 4OB(S)OV(2F) | 4 | F-1-4 | | |
| 2OB(S)OV(2F) | 4 | F-1-2 | | |
| Total | 100 | | | |

Application Example 11

The liquid crystal composition is prepared according to each compound and weight percentage listed in Table 16, 0.3 wt. %

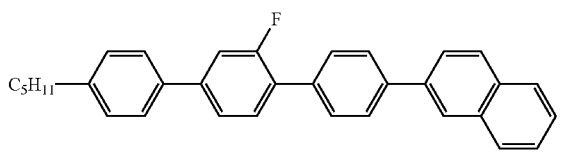

is added into the liquid crystal composition shown in Table 16 as Application Example 11 and the performance test is carried out by filling the same between two substrates of a liquid crystal display device.

TABLE 16

Formulation and test results for the performance parameters of the liquid crystal composition

| Code of component | Weight percent | Code of general formula | Test results for the performance parameters | |
|---|---|---|---|---|
| 3CLWO2 | 9.2 | N-12 | Cp | 85 |
| 3CLWO3 | 6.7 | N-12 | $\Delta n$ | 0.114 |
| 5CLWO2 | 9.2 | N-12 | $\Delta \varepsilon$ | −4.2 |
| 3PWO2 | 12.5 | N-19 | $\gamma_1$ | 99 |
| 3OG'WO2 | 5 | N-27 | VHR(initial) | 92.9 |
| 3CCV | 35.4 | M-1 | VHR(UV) | 88 |
| 3LWO2 | 9 | N-3 | $t_{-30°\ C.}$ | >7 |
| 1VCPWO2 | 5 | N-21 | | |

TABLE 16-continued

Formulation and test results for the performance parameters of the liquid crystal composition

| Code of component | Weight percent | Code of general formula | Test results for the performance parameters | |
|---|---|---|---|---|
| 4C1OB(S)OV(2F) | 4 | F-6-4 | | |
| 2L1OB(S)OV(2F) | 4 | F-5-2 | | |
| Total | 100 | | | |

Application Example 12

The liquid crystal composition is prepared according to each compound and weight percentage listed in Table 17, 0.3 wt. %

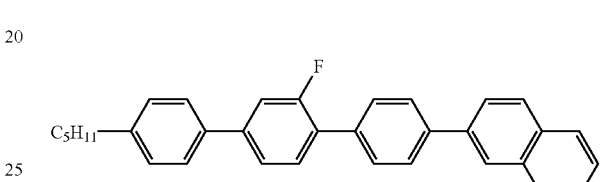

is added into the liquid crystal composition shown in Table 17 as Application Example 12 and the performance test is carried out by filling the same between two substrates of a liquid crystal display device.

TABLE 17

Formulation and test results for the performance parameters of the liquid crystal composition

| Code of component | Weight percent | Code of general formula | Test results for the performance parameters | |
|---|---|---|---|---|
| 3CLWO2 | 9.2 | N-12 | Cp | 78.7 |
| 4CLWO2 | 9.2 | N-12 | $\Delta n$ | 0.111 |
| 3OG'WO2 | 3.8 | N-27 | $\Delta \varepsilon$ | −4.5 |
| 5CLWO2 | 9.2 | N-12 | $\gamma_1$ | 98 |
| 2OPWO2 | 7 | N-19 | VHR(initial) | 92.9 |
| 3PWO2 | 3 | N-19 | VHR(UV) | 86 |
| 3CCV | 34.7 | M-1 | $t_{-30°\ C.}$ | >7 |
| 3LWO2 | 18.5 | N-3 | | |
| 2OB(O)OV(2F) | 2 | F-2-2 | | |
| 4OB(S)OV(2F) | 2 | F-1-4 | | |
| 2OB(S)OV(2F) | 1.4 | F-1-2 | | |
| Total | 100 | | | |

Application Example 13

The liquid crystal composition is prepared according to each compound and weight percentage listed in Table 18, 0.3 wt. %

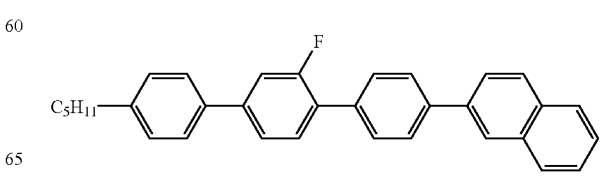

is added into the liquid crystal composition shown in Table 18 as Application Example 13 and the performance test is carried out by filling the same between two substrates of a liquid crystal display device.

TABLE 18

Formulation and test results for the performance parameters of the liquid crystal composition

| Code of component | Weight percent | Code of general formula | Test results for the performance parameters | |
|---|---|---|---|---|
| 3CCWO2 | 9.2 | N-9 | Cp | 73 |
| 4CCWO2 | 9.2 | N-9 | Δn | 0.108 |
| 3OG'WO2 | 3.8 | N-27 | Δε | −4.3 |
| 5CLWO2 | 9.2 | N-12 | γ$_1$ | 105 |
| 2OPWO2 | 7 | N-19 | VHR(initial) | 92.9 |
| 3PWO2 | 3 | N-19 | VHR(UV) | 86 |
| 3CCV | 34.7 | M-1 | t$_{-30°C}$ | >7 |
| 3CWO2 | 18.5 | N-2 | | |
| 2OB(O)OV(2F) | 2 | F-2-2 | | |
| 4OB(S)OV(2F) | 2 | F-1-4 | | |
| 2OB(S)OV(2F) | 1.4 | F-1-2 | | |
| Total | 100 | | | |

In conclusion, the liquid crystal compound of general formula F provided by the present invention has a larger clearing point, a larger optical anisotropy, and a comparable or larger absolute value of dielectric anisotropy while maintaining an appropriate rotational viscosity; the liquid crystal composition of the present invention has a larger optical anisotropy, a smaller rotational viscosity, a higher VHR (UV), and a longer low temperature storage time while maintaining an appropriate clearing point, an appropriate absolute value of dielectric anisotropy and an appropriate VHR(initial), such that the liquid crystal display device comprising the same has a better contrast, a faster response speed, a higher reliability and a better low-temperature storage stability.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

INDUSTRIAL APPLICABILITY

The liquid crystal compound, the liquid crystal composition thereof, and the liquid crystal display device involved in the present invention can be applied to the field of liquid crystal.

The invention claimed is:

1. A liquid crystal compound of general formula F:

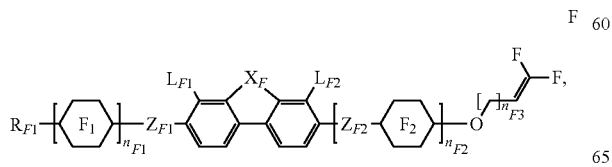

wherein,

R$_{F1}$ represents —H, halogen, C$_{1-12}$ linear alkyl or C$_{3-12}$ branched alkyl,

wherein one or more nonadjacent —CH$_2$— in the C$_{1-12}$ linear alkyl or the C$_{3-12}$ branched alkyl can each be independently replaced by —C≡C—, —O—, —CO—, —CO—O— or —O—CO—, and one or more —H in the C$_{1-12}$ linear alkyl or the C$_{3-12}$ branched alkyl can each be independently substituted by —F or —Cl;

ring

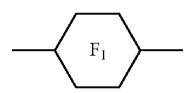

and ring

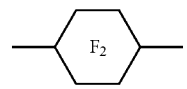

each independently represents

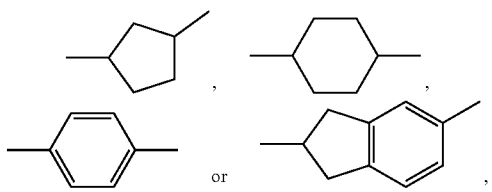

wherein one or more —CH$_2$— in

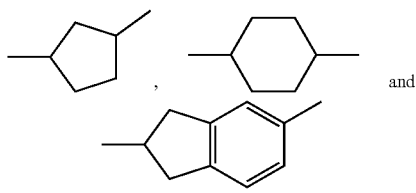

can be replaced by —O—, one or more single bond in the rings can be replaced by double bond, wherein one or more —H on

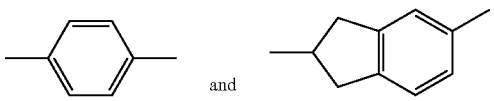

can each be independently substituted by —CN, —F or —Cl, and one or more —CH═ in the rings can be replaced by —N═;

$X_F$ represents —O—, —S— or —CO—;

$L_{F1}$ and $L_{F2}$ each independently represents —H, —F, —Cl, —CF$_3$ or —OCF$_3$;

$Z_{F1}$ and $Z_{F2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;

$n_{F1}$ and $n_{F2}$ each independently represents 0, 1 or 2, wherein, when $n_{F1}$ represents 2, ring

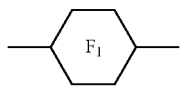

can be the same or different, wherein when $n_{F2}$ represents 2, ring

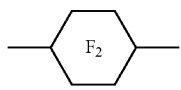

can be the same or different, and $Z_{F2}$ can be the same or different; and $n_{F3}$ represents an integer of 0-4.

2. The liquid crystal compound according to claim 1, wherein the compound of general formula F is selected from a group consisting of the following compounds:

F-1
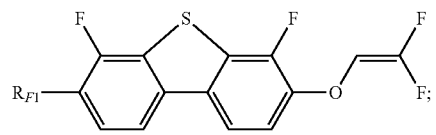

F-2
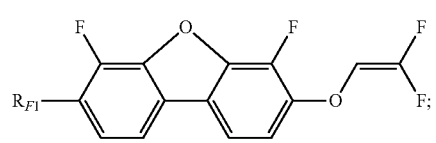

F-3
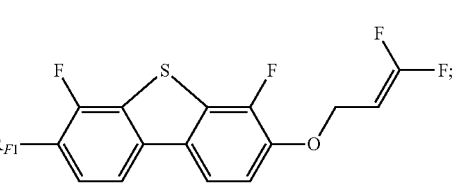

F-4
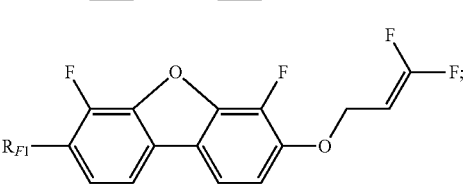

F-5
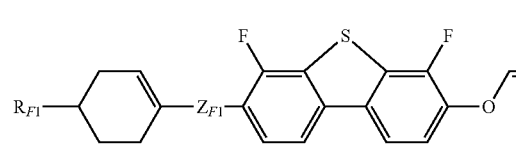

F-6
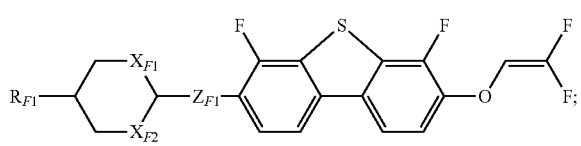

F-7
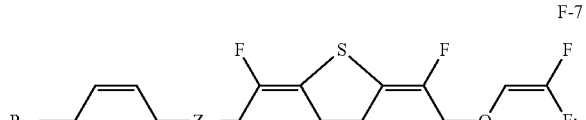

F-8
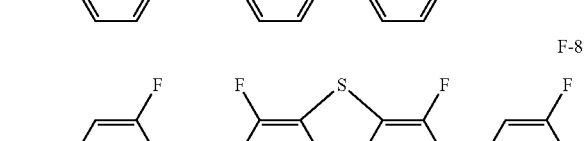

F-9
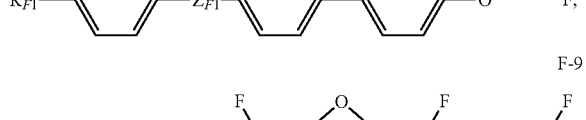

F-10
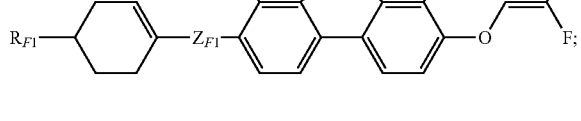

F-11
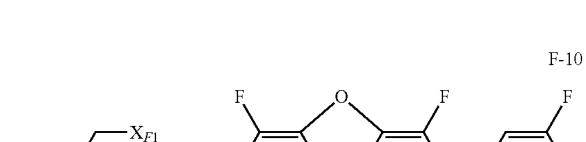

F-12
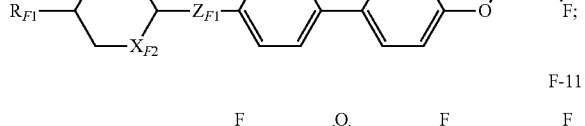

F-13
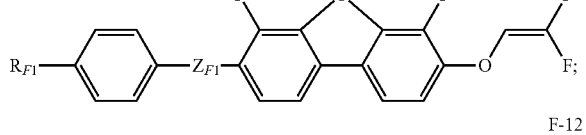

F-14
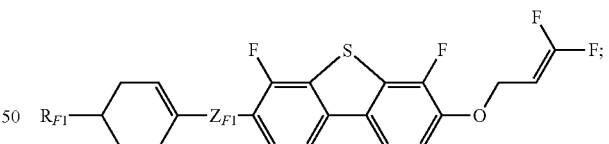

-continued

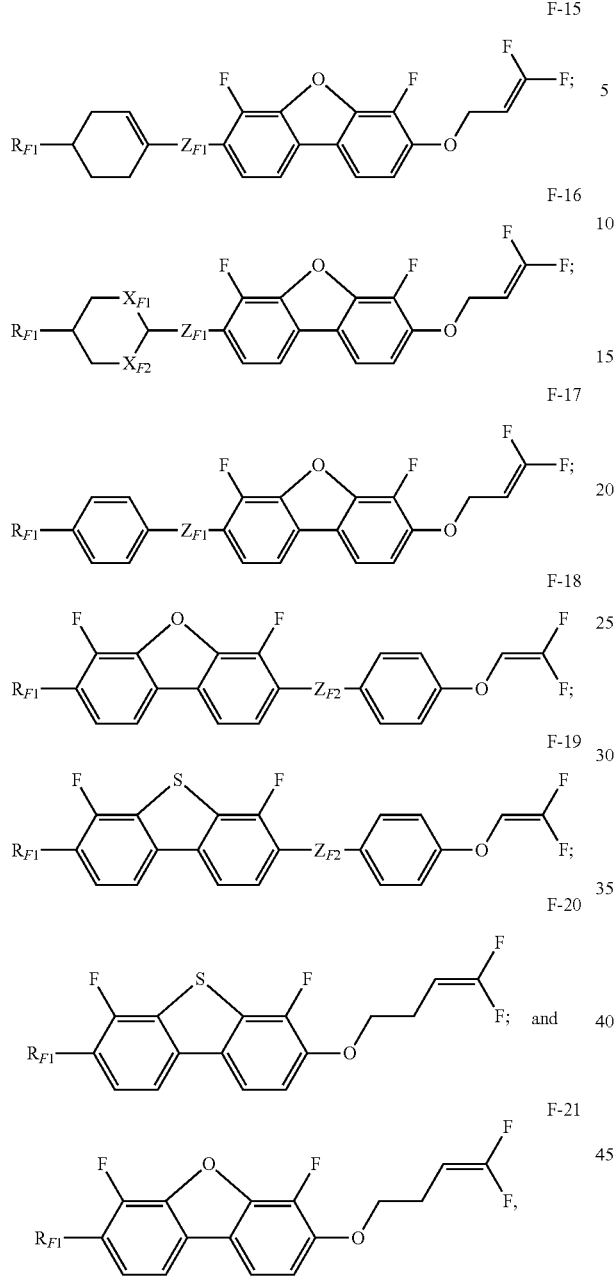

wherein, $R_{F1}$ represents —H, halogen, $C_{1-12}$ linear alkyl or $C_{3-12}$ branched alkyl,

wherein one or more nonadjacent —CH$_2$— in the $C_{1-12}$ linear alkyl or the $C_{3-12}$ branched alkyl can each be independently replaced by —C≡C—, —O—, —CO—, —CO—O— or —O—CO—, and one or more —H in the $C_{1-12}$ linear alkyl or the $C_{3-12}$ branched alkyl can each be independently substituted by —F or —Cl;

$Z_{F1}$ and $Z_{F2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—; and $X_{F1}$ and $X_{F2}$ each independently represents —CH$_2$— or —O—.

3. The liquid crystal compound according to claim 1, wherein both of $n_{F1}$ and $n_{F2}$ represent 0.

4. The liquid crystal compound according to claim 1, wherein the compound of general formula F-1 is selected from a group consisting of the following compounds:

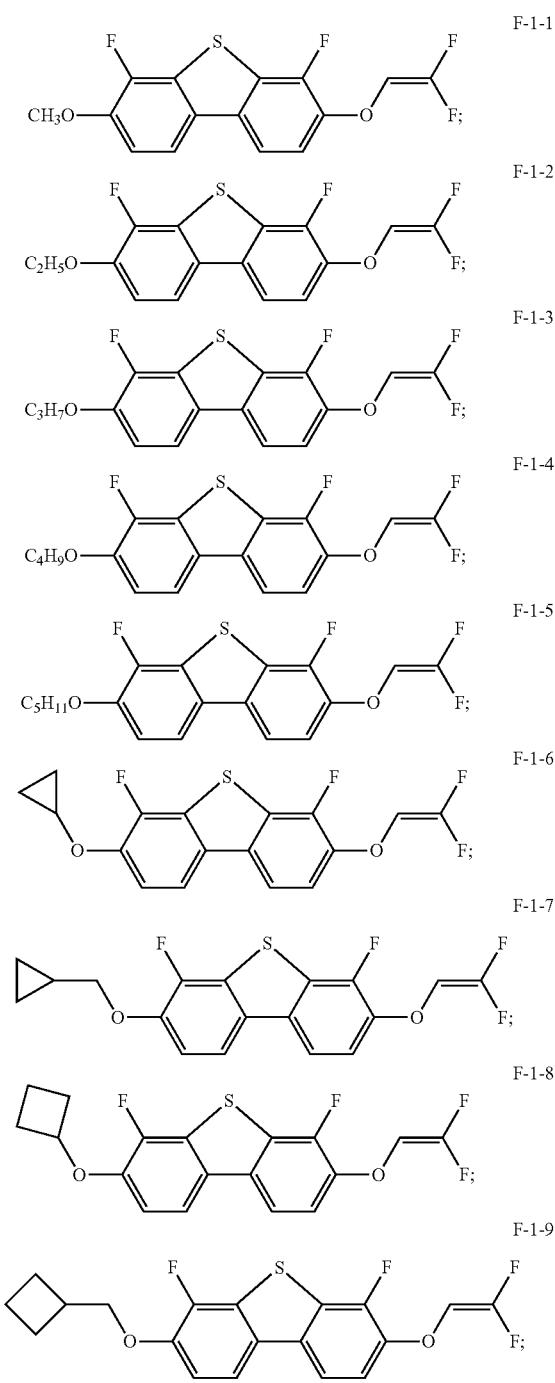

79
-continued
F-1-10
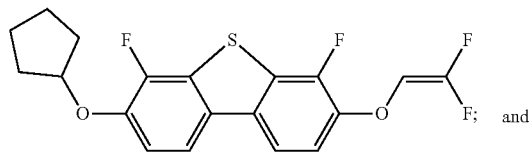
and
F-1-11
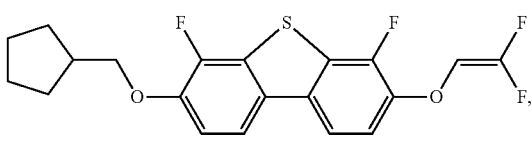
the compound of general formula F-2 is selected from a group consisting of the following compounds:
F-2-1
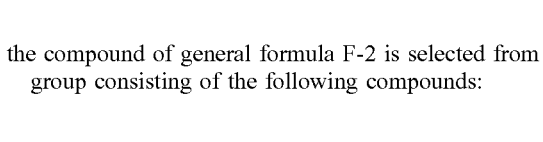
F-2-2
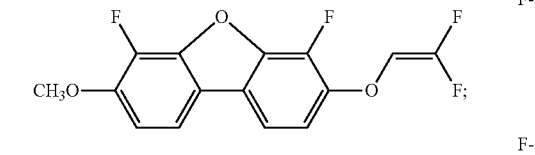
F-2-3
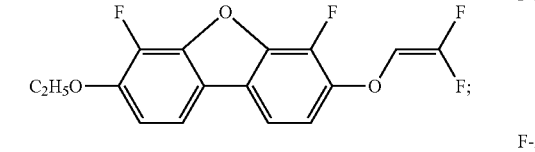
F-2-4
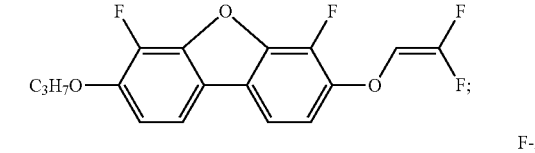
F-2-5
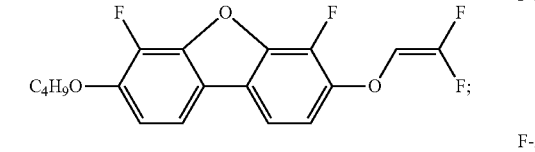
F-2-6
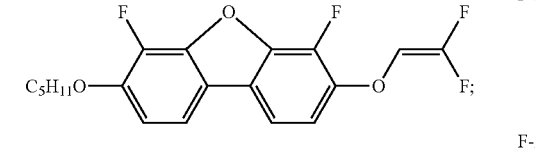
F-2-7
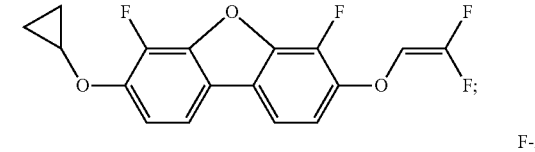
F-2-8
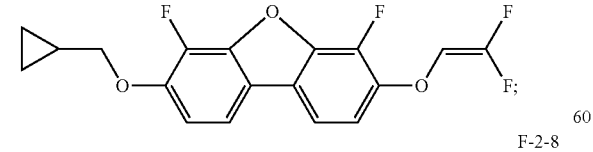
80
-continued
F-2-9
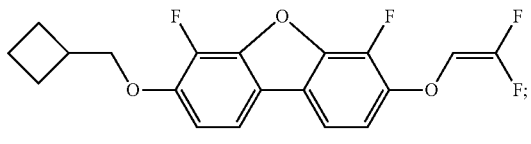
F-2-10
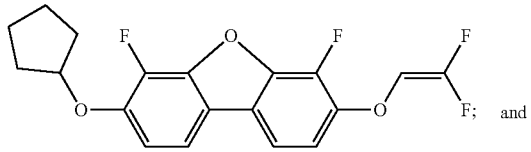
and
F-2-11
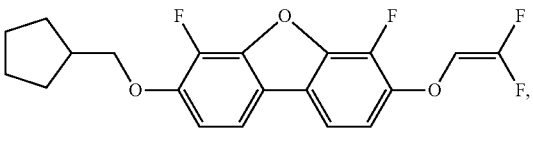
the compound of general formula F-5 is selected from a group consisting of the following compounds:
F-5-1
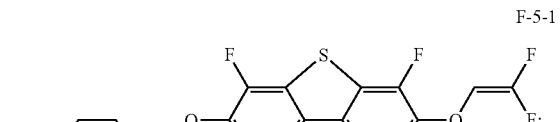
F-5-2
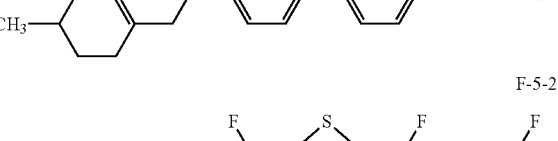
F-5-3
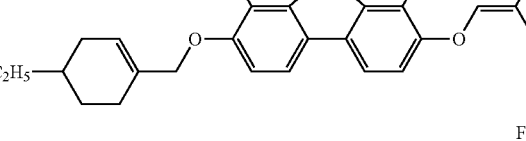
F-5-4
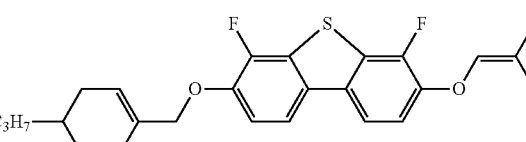
and
F-5-5
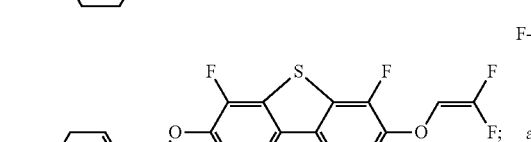

the compound of general formula F-6 is selected from a group consisting of the following compounds:

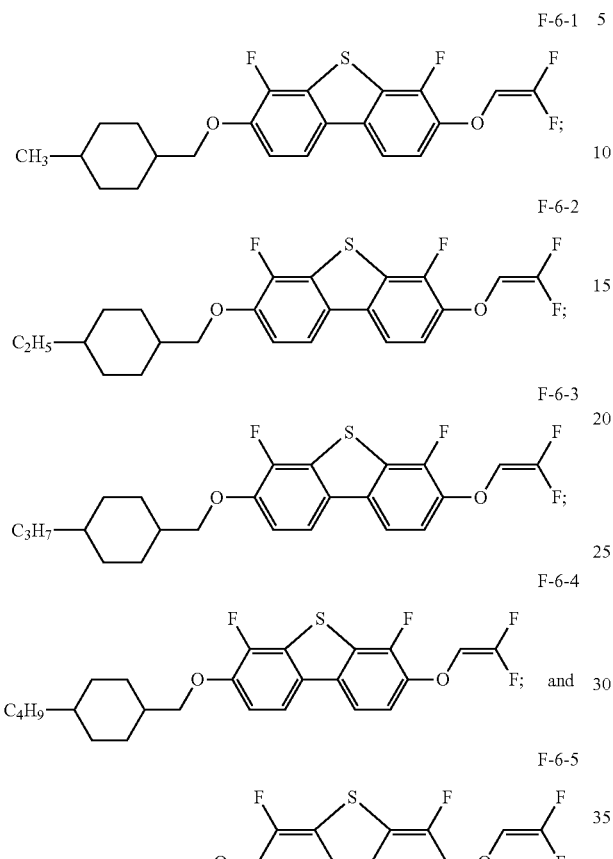

the compound of general formula F-9 is selected from a group consisting of the following compounds:

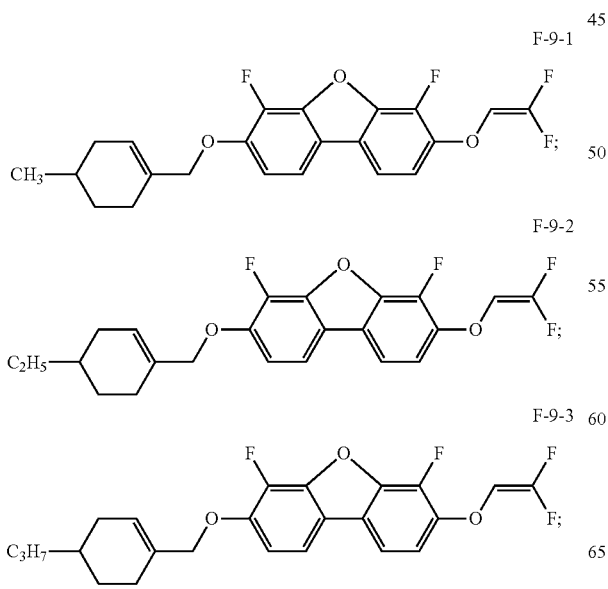

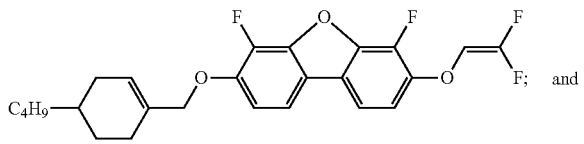

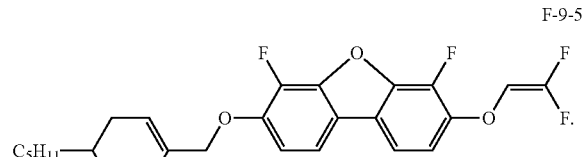

5. A liquid crystal composition comprising at least one liquid crystal compound of general formula F according to claim 1.

6. The liquid crystal composition according to claim 5, wherein the liquid crystal composition comprises at least one compound of general formula N:

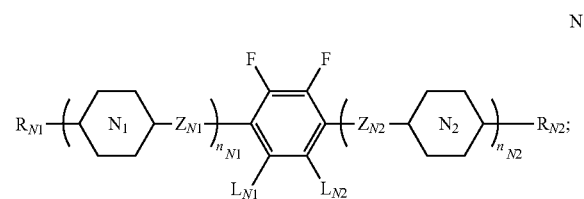

wherein, $R_{N1}$ and $R_{N2}$ each independently represents $C_{1-12}$ linear alkyl or $C_{3-12}$ branched alkyl,

wherein one or more nonadjacent —$CH_2$— in the $C_{1-12}$ linear or the $C_{3-12}$ branched alkyl can each be independently replaced by —CH=CH—, —C≡C—, —O—, —CO—, —CO—O— or —O—CO—;

ring

and ring

each independently represents

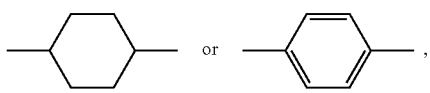

wherein one or more —CH$_2$— in

can be replaced by —O—, one or more single bond in the rings can be replaced by double bond, wherein one or more —H on

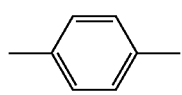

can each be independently substituted by —F, —Cl or —CN, and one or more —CH= in the rings can be replaced by —N=;
$Z_{N1}$ and $Z_{N2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;
$L_{N1}$ and $L_{N2}$ each independently represents —H, C$_{1-3}$ alkyl, or halogen;
$n_{N1}$ represents 0, 1, 2 or 3, $n_{N2}$ represents 0 or 1, and $0 \leq n_{N1} + n_{N2} \leq 3$, when $n_{N1}$=2 or 3, ring

can be the same or different, and $Z_{N1}$ can be the same or different.

7. The liquid crystal composition according to claim 6, wherein the compound of general formula N is selected from a group consisting of the following compounds:

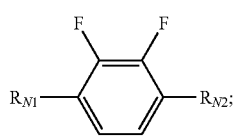
N-1

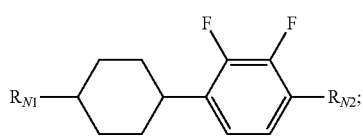
N-2

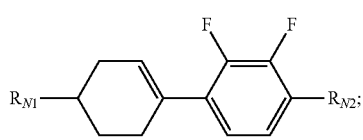
N-3

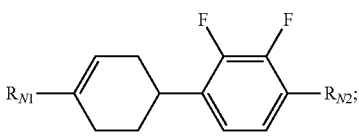
N-4

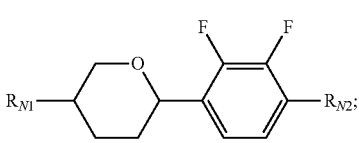
N-5

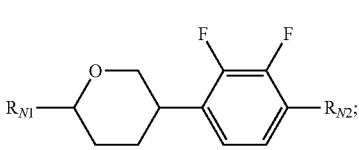
N-6

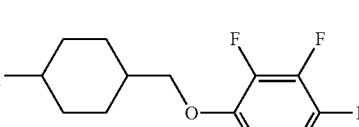
N-7

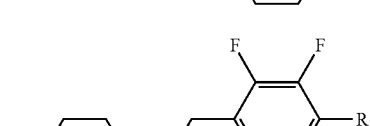
N-8

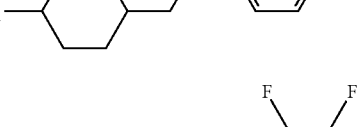
N-9

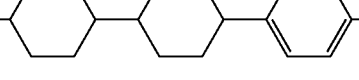
N-10

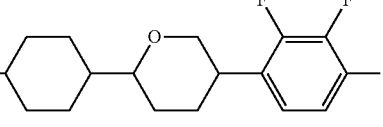
N-11

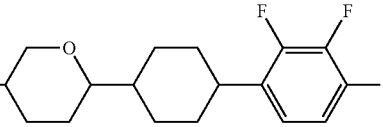
N-12

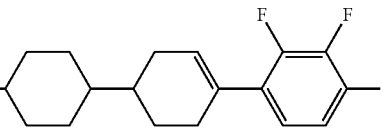
N-13

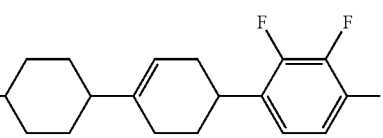
N-14

N-15
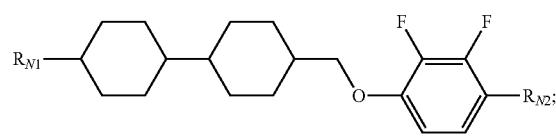
N-16
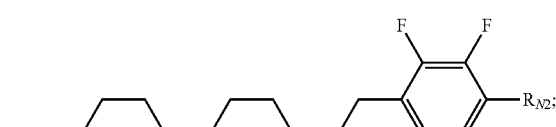
N-17
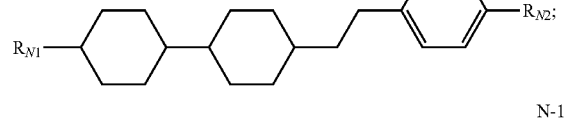
N-18
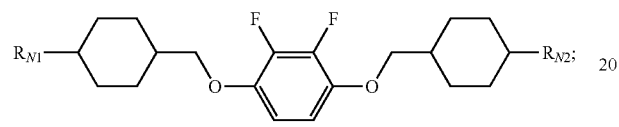
N-19
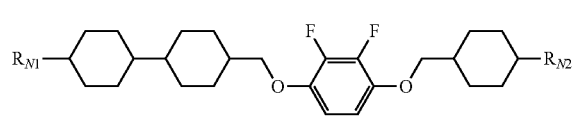
N-20
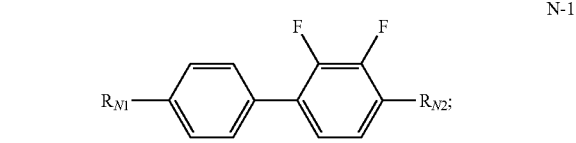
N-21
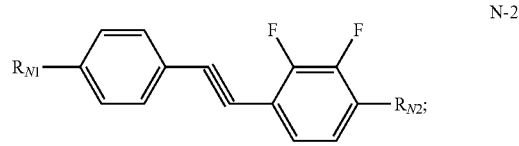
N-22
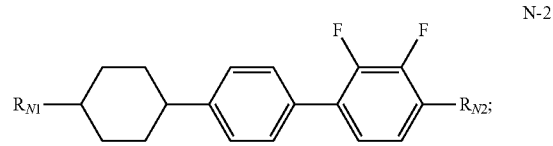
N-23
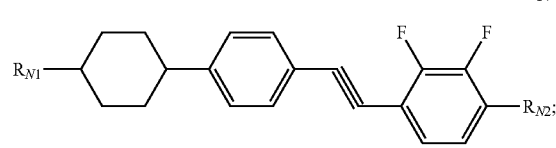
N-24
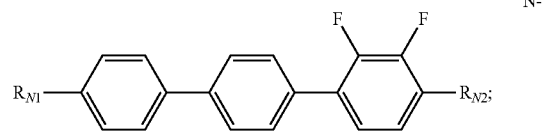
N-25
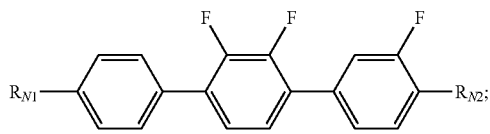
N-26
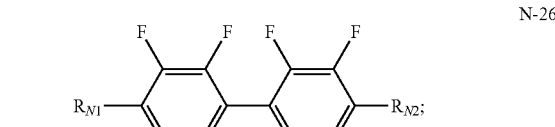
N-27
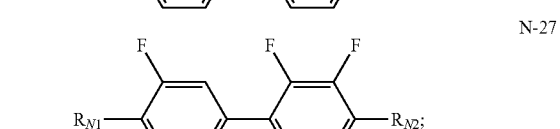
N-28
N-29
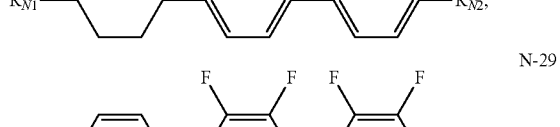
N-30
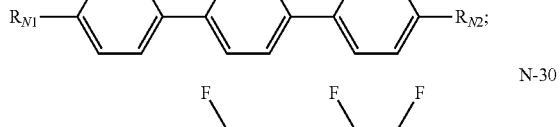
N-31
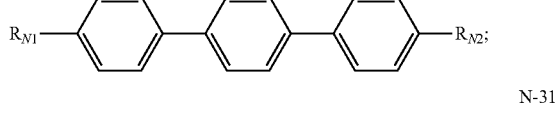
N-32
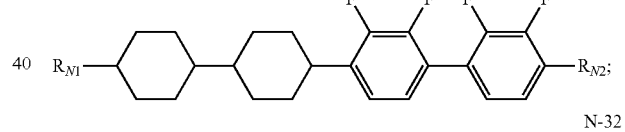
N-33
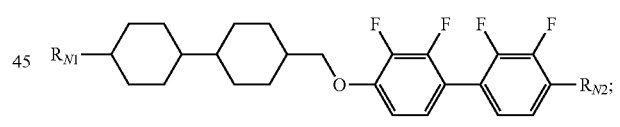
N-34
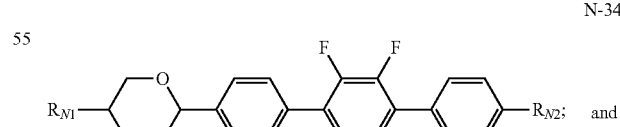
and
N-35
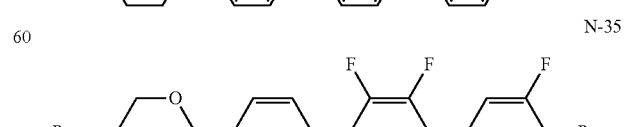

wherein $R_{N1}$ and $R_{N2}$ each independently represents $C_{1-12}$ linear alkyl or $C_{3-12}$ branched alkyl,

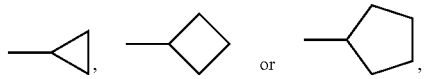

wherein one or more nonadjacent —CH$_2$— in the $C_{1-12}$ linear or the $C_{3-12}$ branched alkyl can each be independently replaced by —CH=CH—, —C≡C—, —O—, —CO—, —CO—O— or —O—CO—.

8. The liquid crystal composition according to claim 6, wherein the liquid crystal composition further comprises at least one compound of general formula M:

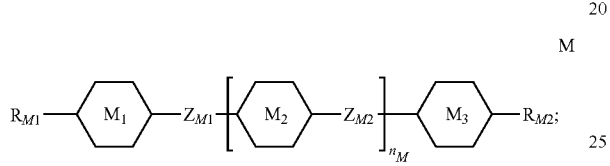

M wherein, $R_{M1}$ and $R_{M2}$ each independently represents $C_{1-12}$ linear alkyl or $C_{3-12}$ branched alkyl,

wherein one or more nonadjacent —CH$_2$— in the $C_{1-12}$ linear alkyl or the $C_{3-12}$ branched alkyl can each be independently replaced by —CH=CH—, —C≡C—, —O—, —CO—, —CO—O— or —O—CO—;

ring

ring

and ring

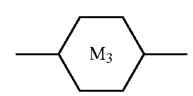

each independently represents

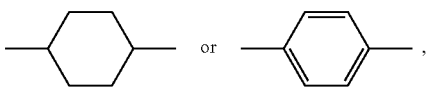

wherein one or more —CH$_2$— in

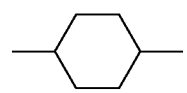

can be replaced by —O—, one or more single bond in the rings can be replaced by double bond, wherein at most one —H on

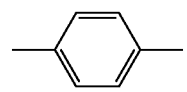

can be substituted by halogen;

$Z_{M1}$ and $Z_{M2}$ each independently represents single bond, —CO—O—, —O—CO—, —CH$_2$O—, —OCH$_2$—, —C≡C—, —CH=CH—, —CH$_2$CH$_2$— or —(CH$_2$)$_4$—; and $n_M$ represents 0, 1 or 2, wherein when $n_M$=2, ring

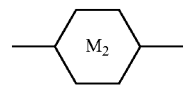

different, and $Z_{M2}$ can be the same or different.

9. The liquid crystal composition according to claim 8, wherein the compound of general formula M is selected from a group consisting of the following compounds:

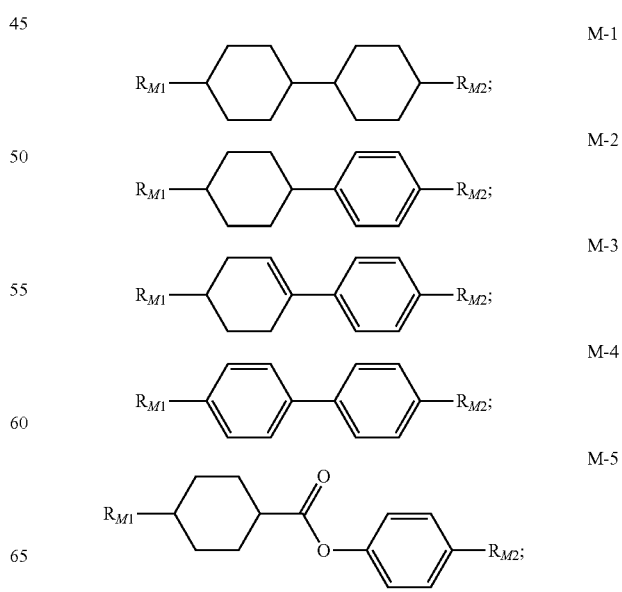

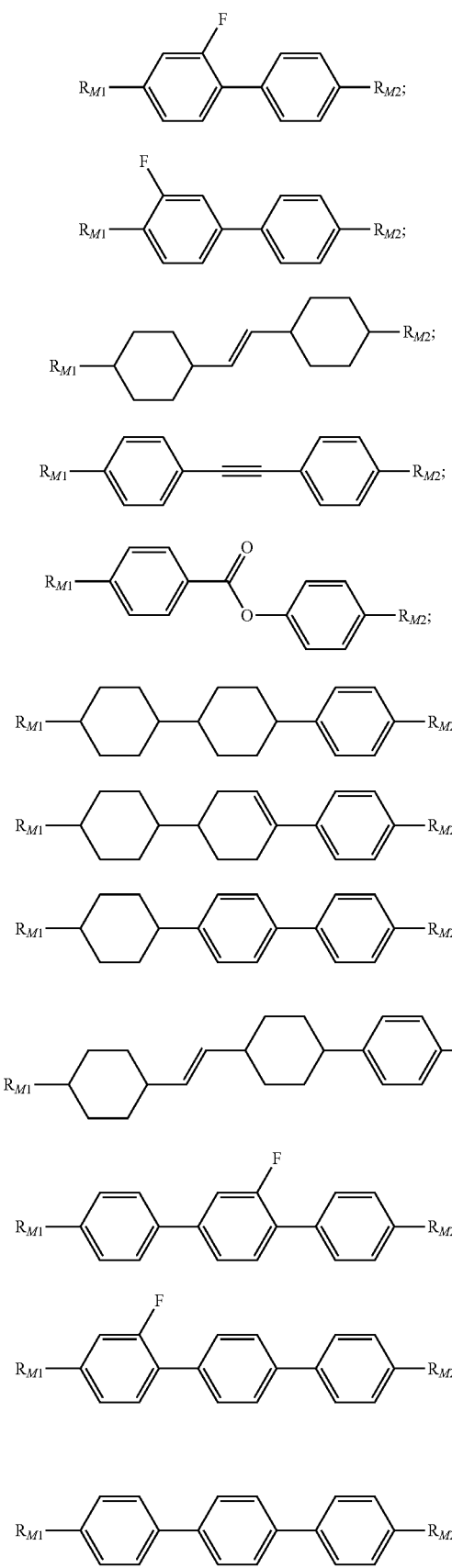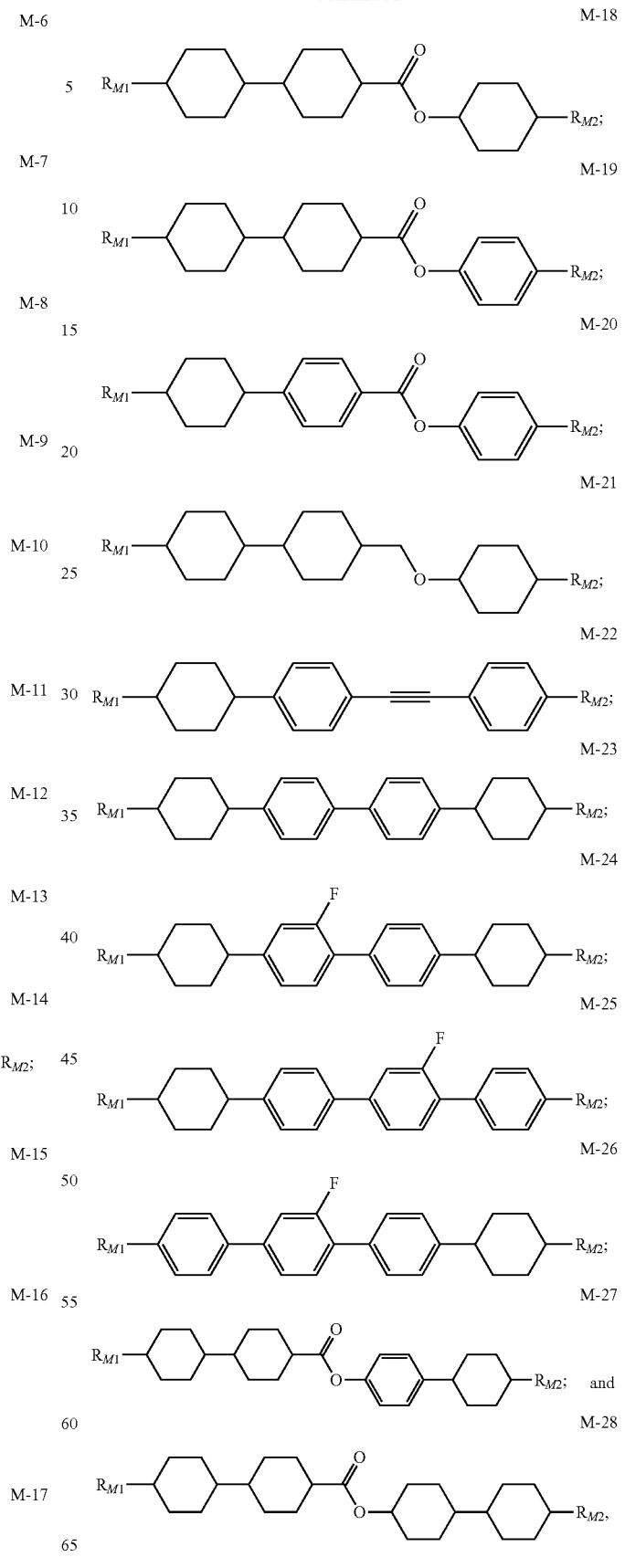

wherein $R_{M1}$ and $R_{M2}$ each independently represents $C_{1-12}$ linear alkyl or $C_{3-12}$ branched alkyl,

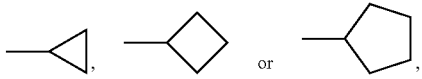

wherein one or more nonadjacent —CH$_2$— in the $C_{1-12}$ linear alkyl or the $C_{3-12}$ branched alkyl can each be independently replaced by —CH=CH—, —C≡C—, —O—, —CO—, —CO—O— or —O—CO—.

10. The liquid crystal composition according to claim 8, wherein the liquid crystal composition further comprises at least one polymerizable compound of general formula RM:

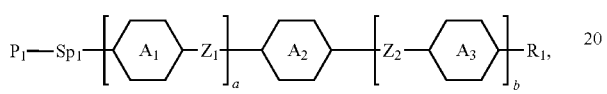

wherein,
R$_1$ represents —H, halogen, —CN, -Sp$_2$-P$_2$, $C_{1-12}$ linear alkyl or $C_{3-12}$ branched alkyl,

wherein one or more nonadjacent —CH$_2$— in the $C_{1-12}$ linear or the $C_{3-12}$ branched alkyl,

can each be independently replaced by —CH=CH—, —C≡C—, —O—, —CO—, —CO—O— or —O—CO—, and one or more —H can each be independently substituted by —F or —Cl;
ring

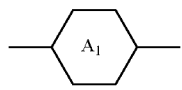

and ring

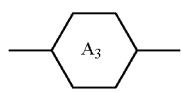

each independently represents

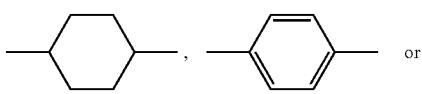

-continued

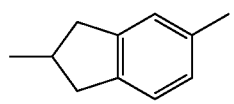

wherein one or more —CH$_2$— in

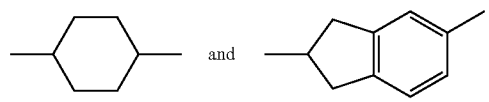

can be replaced by —O—, and one or more single bond in the rings can be replaced by double bond, wherein one or more —H on

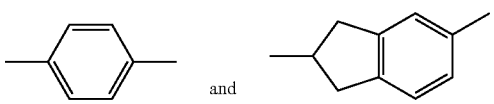

can each be independently substituted by —F, —Cl, —CN, -Sp$_3$-P$_3$, $C_{1-12}$ halogenated or unhalogenated linear alkyl, $C_{1-11}$ halogenated or unhalogenated linear alkoxy,

more —CH= in the rings can be replaced by —N=;
ring

represents

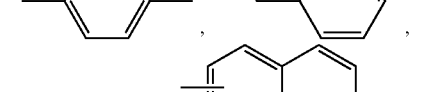

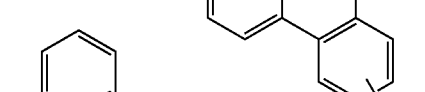

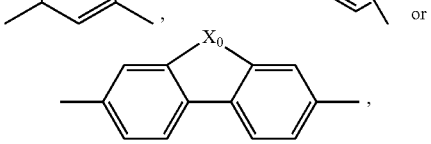

wherein one or more —H on

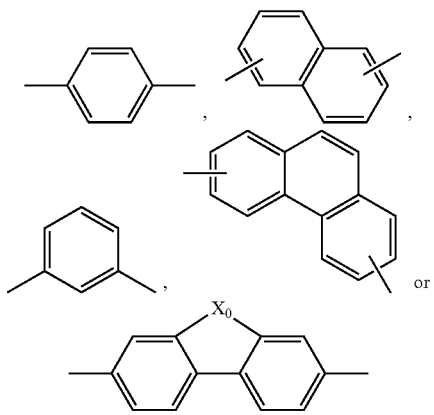

can each be independently substituted by —F, —Cl, —CN, -Sp$_3$-P$_3$, C$_{1-12}$ halogenated or unhalogenated linear alkyl, C$_{1-11}$ halogenated or unhalogenated linear alkoxy,

and one or more —CH= in the rings can be replaced by —N=;

P$_1$, P$_2$ and P$_3$ each independently represents a polymerizable group;

Sp$_1$, Sp$_2$ and Sp$_3$ each independently represents a spacer group or single bond;

Z$_1$ and Z$_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_d$—, —CF$_2$CH$_2$—, —CH$_2$CF$_2$—, —(CF$_2$)$_d$—, —CH=CH—, —CF=CF—, —CH=CF—, —CF=CH—, —C≡C—, —CH=CH—CO—O—, —O—CO—CH=CH—, —CH$_2$CH$_2$—CO—O—, —O—CO—CH$_2$CH$_2$—, —CHR$^1$—, —CR$^1$R$^2$— or single bond, wherein R$^1$ and R$^2$ each independently represents C$_{1-12}$ linear alkyl or C$_{3-12}$ branched alkyl, and d represents an integer of 1-4;

X$_0$ represents —O—, —S—, —CO— —CF$_2$—, —NH— or —NF—;

a represents 0, 1 or 2, b represents 0 or 1, wherein when a represents 2, ring

can be the same or different, and Z$_1$ can be the same or different.

11. The liquid crystal composition according to claim 10, wherein the compound of general formula RM is selected from a group consisting of the following compounds:

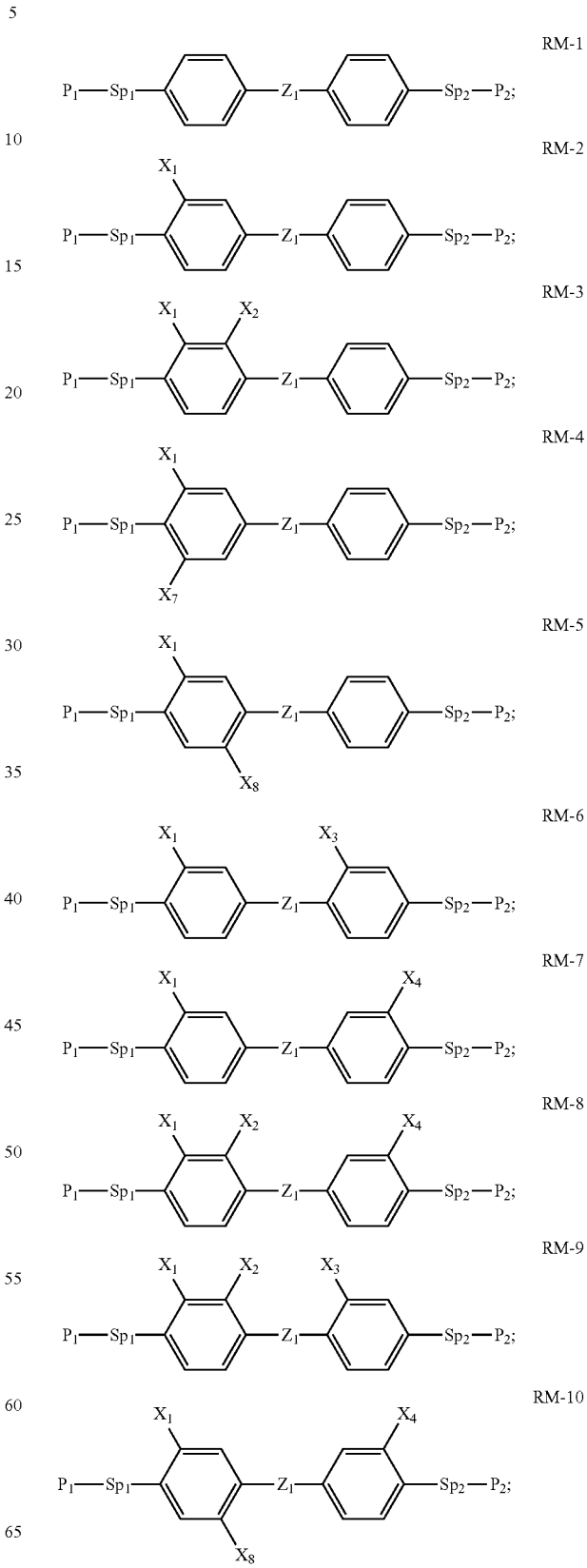

RM-11
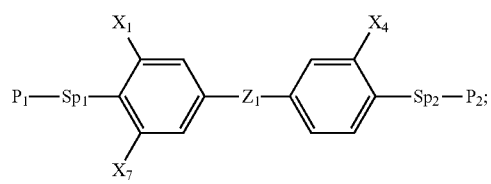
RM-12
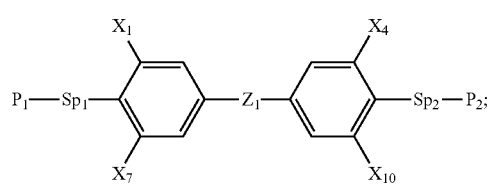
RM-13
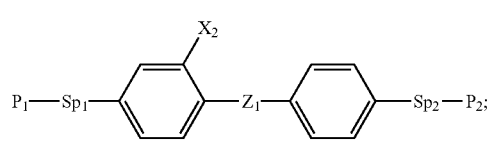
RM-14
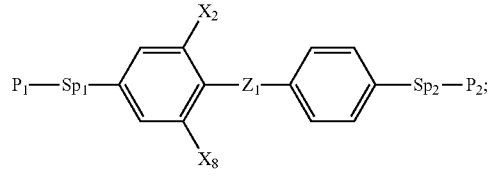
RM-15
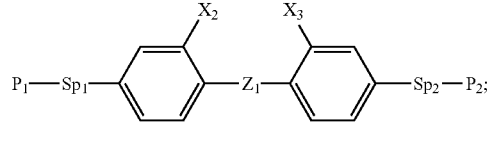
RM-16
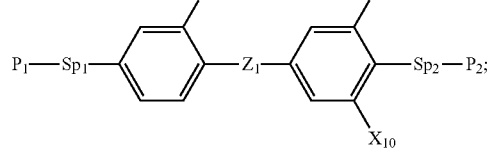
RM-17
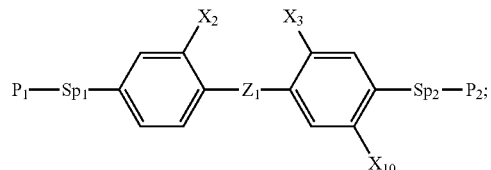
RM-18
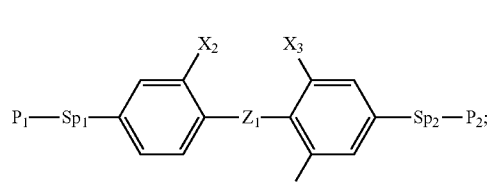
RM-19
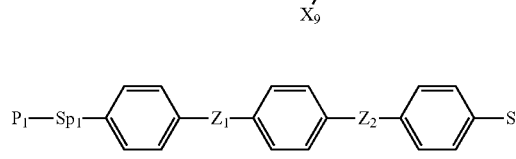
RM-20
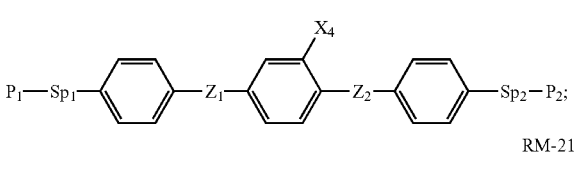
RM-21
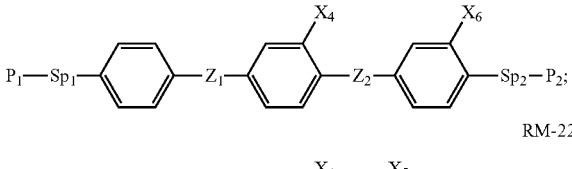
RM-22
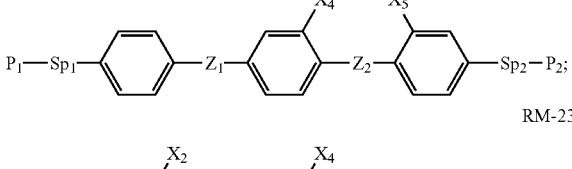
RM-23
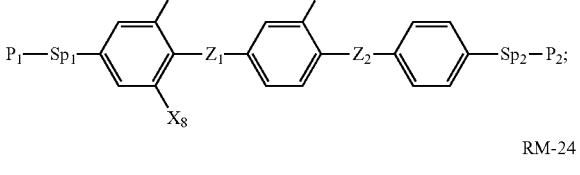
RM-24
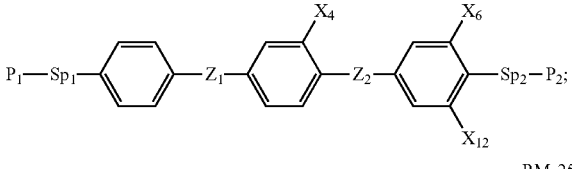
RM-25
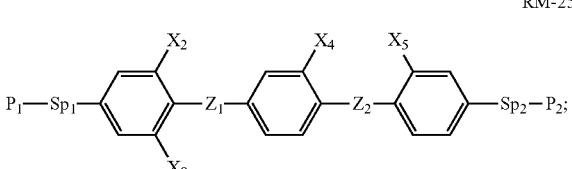
RM-26
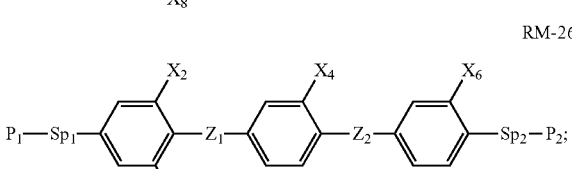
RM-27
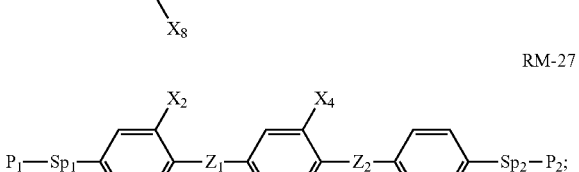
RM-28
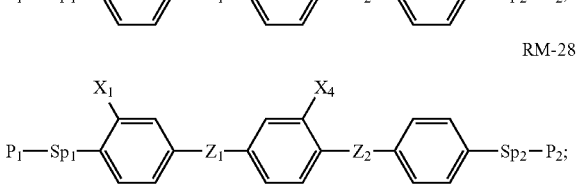
RM-29

-continued

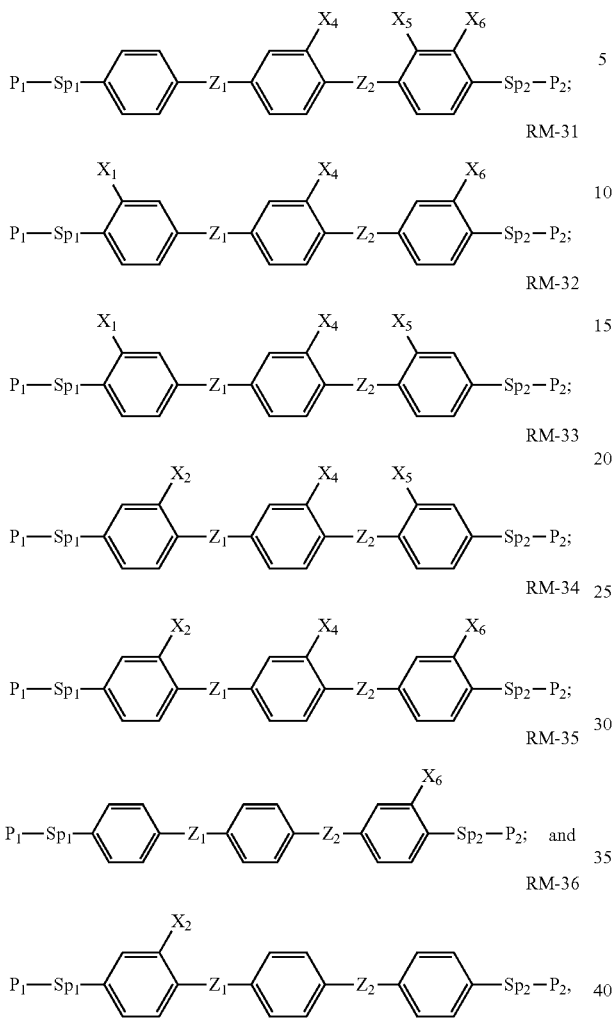

wherein,
$P_1$ and $P_2$ each independently represents a polymerizable group;
$Sp_1$ and $Sp_2$ each independently represents a spacer group or single bond;

$Z_1$ and $Z_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_d$—, —CF$_2$CH$_2$—, —CH$_2$CF$_2$—, —(CF$_2$)$_d$—, —CH=CH—, —CF=CF—, —CH=CF—, —CF=CH—, —C≡C—, —CH=CH—CO—O—, —O—CO—CH=CH—, —CH$_2$CH$_2$—CO—O—, —O—CO—CH$_2$CH$_2$—, —CHR$^1$—, —CR$^1$R$^2$— or single bond, wherein $R^1$ and $R^2$ each independently represents $C_{1-12}$ linear alkyl or $C_{3-12}$ branched alkyl, and d represents an integer of 1-4; and $X_1$-$X_{10}$ and $X_{12}$ each independently represents —F, —Cl, -Sp$_3$-P$_3$, $C_{1-5}$ linear alkyl or alkoxy,

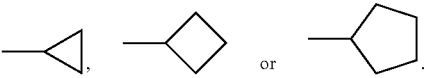

12. The liquid crystal composition according to claim 10, wherein the compound of general formula F provides 0.1-30 wt. % of the total weight of the liquid crystal composition; the compound of general formula N provides 0.1-70 wt. % of the total weight of the liquid crystal composition; the compound of general formula M provides 0.1-70 wt. % of the total weight of the liquid crystal composition; the polymerizable compound of general formula RM provides 0.001-5 wt. % of the total weight of the liquid crystal composition.

13. The liquid crystal composition according to claim 5, wherein the liquid crystal composition further comprises at least one additive, the structure of the additive is

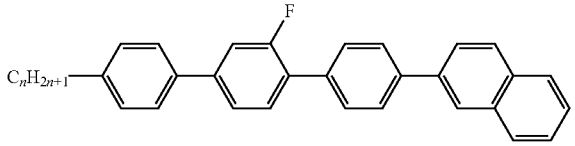

wherein, n represents a positive integer of 1-12.

14. A liquid crystal display device comprising the liquid crystal composition according to claim 5.

* * * * *